US011308033B2

(12) United States Patent
Maybee et al.

(10) Patent No.: US 11,308,033 B2
(45) Date of Patent: *Apr. 19, 2022

(54) FILE SYSTEM HIERARCHY MIRRORING ACROSS CLOUD DATA STORES

(71) Applicant: Oracle International Corporation, Redwood Shores, CA (US)

(72) Inventors: Mark Maybee, Boulder, CO (US); James Kremer, Longmont, CO (US); Pascal Ledru, Broomfield, CO (US); Gavin Gibson, Westminster, CO (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/748,420

(22) Filed: Jan. 21, 2020

(65) Prior Publication Data
US 2020/0159760 A1    May 21, 2020

Related U.S. Application Data

(63) Continuation of application No. 15/610,424, filed on May 31, 2017, now Pat. No. 10,552,469.

(Continued)

(51) Int. Cl.
*G06F 16/172* (2019.01)
*G06F 16/182* (2019.01)
(Continued)

(52) U.S. Cl.
CPC .............. *G06F 16/172* (2019.01); *G06F 1/28* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS 6,732,237 B1    5/2004  Jacobs et al.
7,761,432 B2    7/2010  Ahrens et al.
(Continued)

FOREIGN PATENT DOCUMENTS

EP         2615566         7/2013
JP       2011003187 A      1/2011
(Continued)

OTHER PUBLICATIONS

U.S. Appl. No. 15/610,361 received a Non-Final Office Action dated Jun. 1, 2020, 13 pages.

(Continued)

*Primary Examiner* — Tarek Chbouki
*Assistant Examiner* — Eddy Cheung
(74) *Attorney, Agent, or Firm* — Kilpatrick Townsend & Stockton LLP

(57) ABSTRACT

Techniques described herein relate to systems and methods of data storage, and more particularly to providing layering of file system functionality on an object interface. In certain embodiments, file system functionality may be layered on cloud object interfaces to provide cloud-based storage while allowing for functionality expected from a legacy applications. For instance, POSIX interfaces and semantics may be layered on cloud-based storage, while providing access to data in a manner consistent with file-based access with data organization in name hierarchies. Various embodiments also may provide for memory mapping of data so that memory map changes are reflected in persistent storage while ensuring consistency between memory map changes and writes. For example, by transforming a ZFS file system disk-based (Continued)

storage into ZFS cloud-based storage, the ZFS file system gains the elastic nature of cloud storage.

20 Claims, 22 Drawing Sheets

Related U.S. Application Data

(60) Provisional application No. 62/443,391, filed on Jan. 6, 2017.

(51) Int. Cl.

| | | |
|---|---|---|
| G06F 16/185 | (2019.01) | |
| G06F 3/06 | (2006.01) | |
| G06F 11/14 | (2006.01) | |
| G06F 12/0868 | (2016.01) | |
| G06F 12/128 | (2016.01) | |
| H04L 67/1095 | (2022.01) | |
| G06F 11/10 | (2006.01) | |
| G06F 12/0897 | (2016.01) | |
| G06F 16/23 | (2019.01) | |
| G06F 16/901 | (2019.01) | |
| G06F 9/50 | (2006.01) | |
| G06F 11/30 | (2006.01) | |
| G06F 12/0804 | (2016.01) | |
| G06F 12/0813 | (2016.01) | |
| G06F 12/123 | (2016.01) | |
| H04L 29/06 | (2006.01) | |
| G06F 16/432 | (2019.01) | |
| G06F 16/11 | (2019.01) | |
| G06F 1/28 | (2006.01) | |
| G06F 9/455 | (2018.01) | |
| G06F 11/07 | (2006.01) | |
| G06F 11/32 | (2006.01) | |
| G06F 11/34 | (2006.01) | |
| G06F 21/60 | (2013.01) | |
| H04L 9/06 | (2006.01) | |
| H04L 9/08 | (2006.01) | |
| H04L 9/14 | (2006.01) | |
| H04L 67/1097 | (2022.01) | |
| G06F 12/14 | (2006.01) | |
| H03M 7/30 | (2006.01) | |
| H03M 7/40 | (2006.01) | |

(52) U.S. Cl.
CPC ............ *G06F 3/065* (2013.01); *G06F 3/0605* (2013.01); *G06F 3/0607* (2013.01); *G06F 3/067* (2013.01); *G06F 3/0608* (2013.01); *G06F 3/0617* (2013.01); *G06F 3/0623* (2013.01); *G06F 3/0641* (2013.01); *G06F 3/0643* (2013.01); *G06F 3/0665* (2013.01); *G06F 3/0667* (2013.01); *G06F 9/45558* (2013.01); *G06F 9/5077* (2013.01); *G06F 11/07* (2013.01); *G06F 11/1004* (2013.01); *G06F 11/14* (2013.01); *G06F 11/1446* (2013.01); *G06F 11/1464* (2013.01); *G06F 11/3006* (2013.01); *G06F 11/3034* (2013.01); *G06F 11/3037* (2013.01); *G06F 11/328* (2013.01); *G06F 11/3495* (2013.01); *G06F 12/0804* (2013.01); *G06F 12/0813* (2013.01); *G06F 12/0868* (2013.01); *G06F 12/0897* (2013.01); *G06F 12/123* (2013.01); *G06F 12/128* (2013.01); *G06F 16/128* (2019.01); *G06F 16/182* (2019.01); *G06F 16/184* (2019.01); *G06F 16/185* (2019.01); *G06F 16/1844* (2019.01); *G06F 16/2365* (2019.01); *G06F 16/434* (2019.01); *G06F 16/9027* (2019.01); *G06F 21/602* (2013.01); *H04L 9/0637* (2013.01); *H04L 9/0822* (2013.01); *H04L 9/14* (2013.01); *H04L 63/0428* (2013.01); *H04L 67/1095* (2013.01); *H04L 67/1097* (2013.01); *G06F 12/1408* (2013.01); *G06F 2009/4557* (2013.01); *G06F 2009/45583* (2013.01); *G06F 2009/45595* (2013.01); *G06F 2201/80* (2013.01); *G06F 2201/81* (2013.01); *G06F 2201/84* (2013.01); *G06F 2212/154* (2013.01); *G06F 2212/225* (2013.01); *G06F 2212/262* (2013.01); *G06F 2212/284* (2013.01); *G06F 2212/313* (2013.01); *G06F 2212/401* (2013.01); *G06F 2212/502* (2013.01); *H03M 7/30* (2013.01); *H03M 7/3086* (2013.01); *H03M 7/40* (2013.01)

(56) References Cited

U.S. PATENT DOCUMENTS

| | | |
|---|---|---|
| 7,873,601 B1 | 1/2011 | Kushwah |
| 8,504,529 B1 | 8/2013 | Zheng et al. |
| 8,706,701 B1 | 4/2014 | Stefanov et al. |
| 8,805,967 B2 | 8/2014 | Taylor et al. |
| 9,462,055 B1 | 10/2016 | Herrin et al. |
| 9,659,047 B2 | 5/2017 | Sharma et al. |
| 9,836,244 B2 | 12/2017 | Bates |
| 10,049,121 B2 | 8/2018 | Bender et al. |
| 10,140,139 B1 | 11/2018 | Pratt |
| 10,146,694 B1 | 12/2018 | Laier et al. |
| 10,235,064 B1 | 3/2019 | Natanzon et al. |
| 10,503,771 B2 | 12/2019 | Maybee et al. |
| 10,540,384 B2 | 1/2020 | Maybee et al. |
| 10,552,469 B2 | 2/2020 | Maybee et al. |
| 10,558,699 B2 | 2/2020 | Maybee et al. |
| 10,642,878 B2 | 5/2020 | Kremer et al. |
| 10,642,879 B2 | 5/2020 | Maybee et al. |
| 10,650,035 B2 | 5/2020 | Maybee et al. |
| 10,657,167 B2 | 5/2020 | Maybee et al. |
| 10,698,941 B2 | 6/2020 | Maybee et al. |
| 10,884,984 B2 | 1/2021 | Maybee et al. |
| 11,074,220 B2 | 7/2021 | Maybee et al. |
| 11,074,221 B2 | 7/2021 | Maybee et al. |
| 2007/0186128 A1 | 8/2007 | Rambo et al. |
| 2008/0147974 A1 | 6/2008 | Madison et al. |
| 2010/0250700 A1 | 9/2010 | O'Brien et al. |
| 2010/0325199 A1 | 12/2010 | Park et al. |
| 2010/0332456 A1 | 12/2010 | Prahlad et al. |
| 2011/0022566 A1 | 1/2011 | Beaverson et al. |
| 2011/0066668 A1 | 3/2011 | Guarraci |
| 2011/0283085 A1 | 11/2011 | Dilger et al. |
| 2011/0283113 A1 | 11/2011 | Moffat et al. |
| 2011/0295929 A1 | 12/2011 | Sagar et al. |
| 2011/0307529 A1 | 12/2011 | Mukherjee et al. |
| 2011/0320865 A1 | 12/2011 | Jain et al. |
| 2012/0011337 A1 | 1/2012 | Aizman |
| 2012/0233228 A1 | 9/2012 | Barton et al. |
| 2012/0254116 A1 | 10/2012 | Thereska et al. |
| 2013/0041872 A1 | 2/2013 | Aizman et al. |
| 2013/0110779 A1 | 5/2013 | Taylor et al. |
| 2013/0111262 A1 | 5/2013 | Taylor et al. |
| 2013/0185258 A1 | 7/2013 | Bestler et al. |
| 2014/0006354 A1 | 1/2014 | Parkison et al. |
| 2014/0006465 A1 | 1/2014 | Davis et al. |
| 2014/0164449 A1 | 6/2014 | Kim et al. |
| 2014/0201145 A1 | 7/2014 | Dorman et al. |
| 2014/0279896 A1 | 9/2014 | Branton et al. |
| 2015/0186287 A1 | 7/2015 | Kass |
| 2015/0227600 A1 | 8/2015 | Ramu et al. |
| 2015/0227602 A1 | 8/2015 | Ramu et al. |
| 2015/0261798 A1 | 9/2015 | Serlet |
| 2015/0288758 A1 | 10/2015 | Ori |
| 2016/0110261 A1 | 4/2016 | Parab et al. |
| 2016/0191250 A1 | 6/2016 | Bestler et al. |

(56) References Cited

U.S. PATENT DOCUMENTS

| | | | |
|---|---|---|---|
| 2016/0191509 | A1 | 6/2016 | Bestler et al. |
| 2016/0192178 | A1 | 6/2016 | Blong et al. |
| 2016/0292178 | A1 | 10/2016 | Manville et al. |
| 2016/0337473 | A1 | 11/2016 | Rao |
| 2016/0350551 | A1 | 12/2016 | Chang et al. |
| 2016/0357443 | A1 | 12/2016 | Li et al. |
| 2017/0075781 | A1 | 3/2017 | Bennett, Jr. et al. |
| 2017/0262465 | A1 | 9/2017 | Goggin et al. |
| 2017/0371889 | A1 | 12/2017 | Golander et al. |
| 2018/0159929 | A1 | 6/2018 | Heckle |

FOREIGN PATENT DOCUMENTS

| | | | |
|---|---|---|---|
| JP | 2014010465 | A | 1/2014 |
| JP | 2014178734 | A | 9/2014 |
| JP | 2016206952 | A | 12/2016 |
| WO | 2012055966 | | 5/2012 |
| WO | 2016115219 | A1 | 7/2016 |
| WO | 2018128825 | | 7/2018 |
| WO | 2018128850 | | 7/2018 |
| WO | 2018128864 | | 7/2018 |
| WO | 2018128915 | | 7/2018 |
| WO | 2018128916 | | 7/2018 |
| WO | 2018128917 | | 7/2018 |
| WO | 2018128918 | | 7/2018 |
| WO | 2018128919 | | 7/2018 |

OTHER PUBLICATIONS

European Application No. 17832886.0, Office Action dated Feb. 10, 2021, 8 pages.
European Application No. 18701390.9, Office Action dated Feb. 26, 2021, 6 pages.
European Application No. 17829857.6, Office Action dated Feb. 22, 2021, 12 pages.
U.S. Appl. No. 15/610,361, Notice of Allowance dated Mar. 8, 2021, 5 pages.
U.S. Appl. No. 16/568,672, Notice of Allowance dated Apr. 5, 2021, 8 pages.
European Application No. EP17832850.6, Office Action dated Mar. 23, 2021, 16 pages.
U.S. Appl. No. 15/610,361, Final Office Action dated Nov. 13, 2020, 14 pages.
"Cloud-Converged Storage", Oracle ZFS Storage Appliance, Available Online at: https://www.oracle.com/storage/nas/index.html, Accessed from Internet on: Jul. 21, 2017, 3 pages.
"Oracle Solaris ZFS Administration Guide", Available Online at: http://docs.oracle.com/cd/E19253-01/819-5461/idx/indes.html, Accessed from Internet on: Jul. 18, 2017, 219 pages.
"Using the Oracle ZFS Storage Appliance as Storage Back End for OpenStack Cinder", Oracle White Paper, Oracle ZFD Storage Appliance, Dec. 1, 2015, 54 pages.
Rodeh et al., "BTRFS: The Linux B-Tree File System", ACM Transactions on Storage, Association for Computing Machinery, vol. 9, No. 3, Aug. 1, 2013, pp. 1-32.
Winter; Cornelia, "INFORMATIK 2006 in Dresden", Informatik-Spektrum, vol. 29, No. 6, Nov. 3, 2006, pp. 447-471.
International Application No. PCT/US2017/067708, International Preliminary Report on Patentability dated Jul. 18, 2019, 15 pages.
International Application No. PCT/US2017/067708, International Search Report and Written Opinion dated Apr. 6, 2018, 19 pages.
International Application No. PCT/US2017/067962, International Preliminary Report on Patentability dated Jul. 18, 2019, 8 pages.
International Application No. PCT/US2017/067962, International Search Report and Written Opinion dated Apr. 6, 2018, 12 pages.
International Application No. PCT/US2017/068292, International Preliminary Report on Patentability dated Jul. 18, 2019, 9 pages.
International Application No. PCT/US2017/068292, International Search Report and Written Opinion dated Apr. 6, 2018, 13 pages.
International Application No. PCT/US2017/068857, International Preliminary Report on Patentability dated Jul. 18, 2019, 9 pages.
International Application No. PCT/US2017/068857, International Search Report and Written Opinion dated Apr. 6, 2018, 13 pages.
International Application No. PCT/US2017/068861, International Preliminary Report on Patentability dated Jul. 18, 2019, 7 pages.
International Application No. PCT/US2017/068861, International Search Report and Written Opinion dated Apr. 6, 2018, 10 pages.
International Application No. PCT/US2017/068863, International Preliminary Report on Patentability dated Jul. 18, 2019, 10 pages.
International Application No. PCT/US2017/068863, International Search Report and Written Opinion dated Apr. 4, 2018, 13 pages.
International Application No. PCT/US2017/068864, International Preliminary Report on Patentability dated Jul. 18, 2019, 9 pages.
International Application No. PCT/US2017/068864, International Search Report and Written Opinion dated Apr. 6, 2018, 13 pages.
International Application No. PCT/US2017/068866, International Preliminary Report on Patentability dated Jul. 18, 2019, 12 pages.
International Application No. PCT/US2017/068866, International Search Report and Written Opinion dated Apr. 6, 2018, 16 pages.
International Application No. PCT/US2017/068867, International Preliminary Report on Patentability dated Jul. 18, 2019, 7 pages.
International Application No. PCT/US2017/068867, International Search Report and Written Opinion dated Apr. 6, 2018, 10 pages.
International Application No. PCT/US2018/012254, International Preliminary Report on Patentability dated Jul. 18, 2019, 10 pages.
International Application No. PCT/US2018/012254, International Search Report and Written Opinion dated Apr. 3, 2018, 13 pages.
International Application No. PCT/US2018/012313, International Preliminary Report on Patentability dated Jul. 18, 2019, 10 pages.
International Application No. PCT/US2018/012313, International Search Report and Written Opinion dated Apr. 6, 2018, 13 pages.
U.S. Appl. No. 15/610,349, Final Office Action dated Sep. 25, 2019, 7 pages.
U.S. Appl. No. 15/610,349, Non-Final Office Action dated Mar. 18, 2019, 11 pages.
U.S. Appl. No. 15/610,365, Non-Final Office Action dated Jul. 27, 2018, 8 pages.
U.S. Appl. No. 15/610,370, Final Office Action dated Oct. 29, 2019, 7 pages.
U.S. Appl. No. 15/610,370, Non-Final Office Action dated Apr. 15, 2019, 13 pages.
U.S. Appl. No. 15/610,380, Non-Final Office Action dated May 2, 2019, 6 pages.
U.S. Appl. No. 15/610,400, Final Office Action dated Oct. 17, 2019, 8 pages.
U.S. Appl. No. 15/610,400, Non-Final Office Action dated Mar. 29, 2019, 13 pages.
U.S. Appl. No. 15/610,416, Non-Final Office Action dated Sep. 26, 2019, 13 pages.
U.S. Appl. No. 15/610,424, Non-Final Office Action dated Mar. 7, 2019, 25 pages.
U.S. Appl. No. 15/610,444, Non-Final Office Action dated Apr. 11, 2019, 9 pages.
U.S. Appl. No. 15/610,456, Non-Final Office Action dated Mar. 7, 2019, 26 pages.
U.S. Appl. No. 15/610,467, Final Office Action dated Oct. 3, 2019, 25 pages.
U.S. Appl. No. 15/610,467, Non-Final Office Action dated Mar. 7, 2019, 22 pages.
U.S. Appl. No. 15/610,467, Non-Final Office Action dated Jan. 30, 2020, 24 pages.
U.S. Appl. No. 16/568,672, Non-Final Office Action dated Dec. 22, 2020, 5 pages.
European Application No. EP17832716.9, Office Action, dated May 11, 2021, 16 pages.
European Application No. 17832883.7, Summons to Attend Oral Proceedings mailed on Jul. 26, 2021, 10 pages.
European Application No. 18701834.6, Office Action dated Sep. 8, 2021, 7 pages.
U.S. Appl. No. 16/822,406, First Action Interview Pilot Program Pre-Interview Communication dated Sep. 23, 2021, 7 pages.

(56) References Cited

OTHER PUBLICATIONS

U.S. Appl. No. 16/829,958, First Action Interview Pilot Program Pre-Interview Communication dated Oct. 26, 2021, 5 pages.
U.S. Appl. No. 16/829,979, First Action Interview Pilot Program Pre-Interview Communication dated Nov. 8, 2021, 5 pages.
U.S. Appl. No. 16/881,638, Non-Final Office Action dated Nov. 9, 2021, 7 pages.
European Application No. 17832885.2, Office Action dated Oct. 22, 2021, 9 pages.
U.S. Appl. No. 16/829,958, First Action Interview Office Action Summary dated Dec. 24, 2021, 7 pages.
U.S. Appl. No. 16/822,406, First Action Interview Office Action Summary dated Dec. 24, 2021, 7 pages.
U.S. Appl. No. 16/829,979, First Action Interview Office Action Summary dated Dec. 24, 2021, 5 pages.

FILE SYSTEM HIERARCHY MIRRORING ACROSS CLOUD DATA STORES

CROSS-REFERENCE TO RELATED APPLICATIONS

This application is a continuation of U.S. patent application Ser. No. 15/610,424, filed May 31, 2017, entitled "FILE SYSTEM HIERARCHY MIRRORING ACROSS CLOUD DATA STORES", which claims the benefit and priority under 35 U.S.C. 119(e) of U.S. Provisional Application No. 62/443,391, filed Jan. 6, 2017, entitled "FILE SYSTEM HIERARCHIES AND FUNCTIONALITY WITH CLOUD OBJECT STORAGE," the entire contents of which are incorporated herein by reference for all purposes.

TECHNICAL FIELD OF THE INVENTION

This disclosure generally relates to systems and methods of data storage, and more particularly to layering file system functionality on an object interface.

BACKGROUND

The continuous expansion of the Internet, along with the expansion and sophistication of computing networks and systems, has led to the proliferation of content being stored and accessible over the Internet. This, in turn, has driven the need for large and sophisticated data storage systems. As the demand for data storage continues to increase, larger and more sophisticated storage systems are being designed and deployed. Many large-scale data storage systems utilize storage appliances that include arrays of physical storage media. These storage appliances are capable of storing incredible amounts of data. For example, at this time, Oracle's SUN ZFS Storage ZS5-4 appliance can store up to 6.9 petabytes of data. Moreover, multiple storage appliances may be networked together to form a storage pool, which can further increase the volume of stored data.

Typically, large storage systems such as these may include a file system for storing and accessing files. In addition to storing system files (operating system files, device driver files, etc.), the file system provides storage and access of user data files. If any of these files (system files and/or user files) contain critical data, then it becomes advantageous to employ a backup storage scheme to ensure that critical data is not lost if a file storage device fails.

Conventionally, cloud-based storage is object-based and offers elasticity and scale. However, cloud object storage presents a number of problems. Cloud object storage offers interfaces that are based on getting and putting whole objects. Cloud object storage provides a limited ability to search, and typically has high latency. The limited cloud-based interfaces do not align with needs of local file system applications. Converting legacy applications to use an object interface would be expensive and may not be practical or even possible.

Thus, there is a need for systems and methods that address the foregoing problems in order to provide layering of file system functionality on an object interface. This and other needs are addressed by the present disclosure.

BRIEF SUMMARY

Certain embodiments of the present disclosure relate generally to systems and methods of data storage, and more particularly to systems and methods for layering file system functionality on an object interface.

Various techniques (e.g., systems, methods, computer-program products tangibly embodied in a non-transitory machine-readable storage medium, etc.) are described herein for providing layering of file system functionality on an object interface. In certain embodiments, file system functionality may be layered on cloud object interfaces to provide cloud-based storage while allowing for functionality expected from a legacy applications. For instance, POSIX interfaces and semantics may be layered on cloud-based storage, while providing access to data in a manner consistent with file-based access with data organization in name hierarchies. Various embodiments also may provide for memory mapping of data so that memory map changes are reflected in persistent storage while ensuring consistency between memory map changes and writes. For example, by transforming a ZFS file system disk-based storage into ZFS cloud-based storage, the ZFS file system gains the elastic nature of cloud storage.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of embodiments according to the present disclosure may be realized by reference to the remaining portions of the specification in conjunction with the following appended figures.

Figure 1:
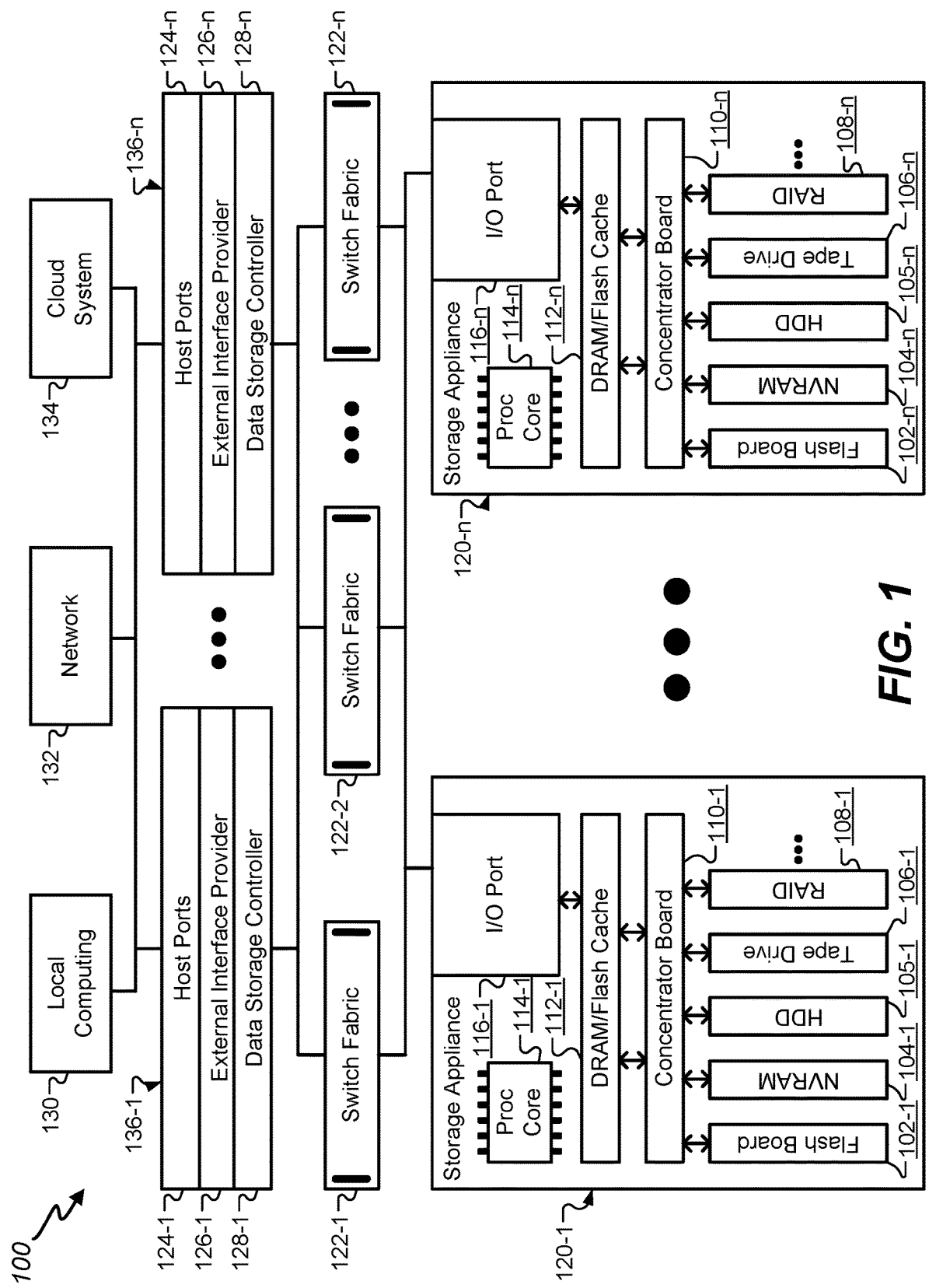
FIG. 1 illustrates one example storage network that may be used in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

As noted above, cloud-based storage offers elasticity and scale, but presents a number of problems. Cloud object storage offers interfaces that are based on getting and putting whole objects. Cloud object storage provides a limited ability to search, and typically has high latency. The limited cloud-based interfaces do not align with needs of local file system applications. Converting legacy applications to use an object interface would be expensive and may not be practical or even possible. Hence, solutions are needed so that is not necessary to change file system applications to directly access cloud object storage because promises to be complex and expensive.

The solutions should allow native application interfaces to be preserved without introducing various types of adaptation layers to map the data of a local storage system to object storage in the cloud. Accordingly, certain embodiments according to the present disclosure may layer file system functionality on cloud object interfaces to provide cloud-based storage while allowing for functionality expected from a legacy applications. For example, legacy applications, which are not cloud-based, may access data primarily as files and may be configured for POSIX interfaces and semantics. From the legacy application perspective, being able to modify content of a file without rewriting the file is expected. Likewise, being to be able to organize data in name hierarchies is expected.

To accommodate such expectations, certain embodiments may layer POSIX interfaces and semantics on cloud-based storage, while providing access to data in a manner that, from a user perspective, is consistent with file-based access with data organization in name hierarchies. Further, certain embodiments may provide for memory mapping of data so that memory map changes are reflected in persistent storage while ensuring consistency between memory map changes and writes. By transforming a ZFS file system disk-based storage into ZFS cloud-based storage, the ZFS file system gains the elastic nature of cloud storage. By mapping "disk blocks" to cloud objects, the storage requirements for the ZFS file system are only the "blocks" actually in use. The system may always be thinly provisioned with no risk of running out of backing storage. Conversely, the cloud storage gains ZFS file system semantics and services. Full POSIX semantics may be provided to cloud clients, as well as any additional data services (such as compression, encryption, snapshots, etc.) provided by the ZFS file system.

Certain embodiments may provide the ability to migrate data to-and-from the cloud and may provide for local data to co-exist with data in the cloud by way of a hybrid cloud storage system, which provides for storage elasticity and scale while layering ZFS file system functionality on the cloud storage. By extending the ZFS file system to allow storing of objects in cloud object stores, a bridge may be provided to traditional object storage while preserving ZFS file system functionality in addition to all ZFS file system data services. The bridging of the gap between traditional local file systems and the ability to store data in various clouds object stores redounds to significant performance improvements.

Furthermore, embodiments of the present invention enable the use of traditional ZFS data services in conjunction with the hybrid cloud storage. As an example, compression, encryption, deduplication, snapshots, and clones are each available in certain embodiments of the present invention and are described in short detail immediately below. In the present invention users can continue to use all of the data services provided by the ZFS file system seamlessly when extending storage to the cloud. For instance, the Oracle Key Manager or equivalent manages the key local to a user allowing end-to-end secure encryption with locally managed keys when storing to the cloud. The same commands used to compress, encrypt, deduplicate, take snapshots, and make clones on disk storage are used for storage to the cloud. As a result, users continue to benefit from the efficiencies and the security provided by ZFS compression, encryption, deduplication, snapshots, and clones.

Compression is typically turned on because it reduces the resources required to store and transmit data. Computational resources are consumed in the compression process and, usually, in the reversal of the process (decompression). Data compression is subject to a space-time complexity trade-off. For instance, a compression scheme may require intensive processing decompression fast enough to be consumed as it is being decompressed. The design of data compression schemes involves trade-offs among various factors, including the degree of compression and the computational resources required to compress and decompress the data.

ZFS encryption enables an end-to-end secure data block system with locally saved encryption keys providing an additional layer of security. ZFS encryption does not of itself prevent the data blocks from being misappropriated, but denies the message content to the interceptor. In an encryption scheme, the intended data block, is encrypted using an encryption algorithm, generating cipher text that can only be read if decrypted. For technical reasons, an encryption scheme usually uses a pseudo-random encryption key generated by an algorithm. It is in principle possible to decrypt the message without possessing the key, but, for a well-designed encryption scheme, large computational resources and skill are required. ZFS Data blocks are encrypted using AES (Advanced Encryption Standard) with key lengths of 128, 192, and 256.

Data block duplication is a specialized data compression technique for eliminating duplicate copies of repeating data blocks. Data block deduplication is used to improve storage utilization and can also be applied to network data transfers to reduce the number of data blocks that must be sent to store to memory. In the deduplication process, unique data blocks are identified and stored during a process of analysis. As the analysis continues, other data blocks are compared to the stored copy and whenever a match occurs, the redundant data block is replaced with a small reference that points to the stored data block. Given that the same data block pattern may occur dozens, hundreds, or even thousands of times the number of data blocks that must be stored or transferred is reduced substantially using deduplication.

Snapshots for ZFS storage to the cloud object store are created seamlessly in the ZFS system. Snapshots freeze certain data and metadata blocks so that they may not be written over in case a backup to the snapshot is needed. A tree hierarchy can have many snapshots, and each snapshot will be saved until deleted. Snapshots can be stored locally or in the cloud object store. And snapshots are "free" in the ZFS system as they don't require any extra storage capability than creating the root block the snapshot points to. The root block and all subsequent blocks from the root block are not available for copy on write operation when accessed from the snapshot reference to the root block. At the next progression after the snap shot is taken—a new root block becomes the active root block.

Clones are created from snapshots and, unlike snapshot, blocks accessed using the clone reference to the root block are available for copy on write operation. Clones allow development and trouble shooting on a system without corrupting the active root block and tree. Clones are linked to snapshots and snapshots cannot be deleted if a clone linking to a snapshot block persists. Clones, in some cases, can be promoted to the active hierarchical tree.

Various embodiments will now be discussed in greater detail with reference to the accompanying figures, beginning with FIG. 1.

FIG. 1 illustrates one example storage network 100 that may be used to implement certain embodiments according to the present disclosure. The selection and/or arrangement of hardware devices depicted in FIG. 1 are shown only by way of example, and are not meant to be limiting. FIG. 1 provides a plurality of storage appliances 120 connected through one or more switch circuits 122. The switch circuits 122 may connect the plurality of storage appliances 120 to a plurality of I/O servers 136, which in turn may provide access to the plurality of storage appliances 120 for client devices, such as local computer systems 130, computer systems available over a network 132, and/or cloud computing systems 134.

Each I/O server 136 may execute multiple independent file system instances, each of which may be responsible for the management of a portion of the overall storage capacity. As will be described in greater detail below, these file system instances may include the Oracle ZFS file system. The I/O servers 136 may comprise blade and/or standalone servers that include host ports 124 to communicate with the client devices by receiving read and/or write data access requests. The host ports 124 may communicate with an external interface provider 126 that identifies a correct data storage controller 128 to service each I/O request. The data storage controllers 128 can each exclusively manage a portion of data content in one or more of the storage appliances 120 described below. Thus, each data storage controller 128 can access a logical portion of the storage pool and satisfy data requests received from the external interface providers 126 by accessing their own data content. Redirection through the data storage controllers 128 may include redirection of each I/O request from the host ports 124 to a file system instance (e.g., a ZFS instance) executing on the I/O servers 136 and responsible for the blocks requested. For example, this may include a redirection from a host port 124-1 on one I/O server 136-1 to a ZFS instance on another I/O server 136-n. This redirection may allow any part of the available storage capacity to be reached from any host port 124. The ZFS instance may then issue the necessary direct I/O transactions to any storage device in the storage pool to complete the request. Acknowledgements and/or data may then be forwarded back to the client device through the originating host port 124.

A low-latency, memory-mapped network may tie together the host ports 124, any file system instances, and the storage appliances 120. This network may be implemented using one or more switch circuits 122, such as Oracle's Sun Data Center InfiniBand Switch 36 to provide a scalable, high-performance cluster. A bus protocol, such as the PCI Express bus, may route signals within the storage network. The I/O servers 136 and the storage appliances 120 may communicate as peers. The redirection traffic and ZFS memory traffic may both use the same switch fabric.

In various embodiments, many different configurations of the storage appliances 120 may be used in the network of FIG. 1. In some embodiments, the Oracle ZFS Storage Appliance series may be used. The ZFS Storage Appliance provides storage based on the Oracle Solaris kernel with Oracle's ZFS file system ("ZFS") described below. The processing core 114 handles any operations required to implement any selected data protection (e.g., mirroring, RAID-Z, etc.), data reduction (e.g., inline compression, duplication, etc.), and any other implemented data services (e.g., remote replication, etc.). In some embodiments, the processing core may comprise an 8×15 core of 2.8 GHz Intel® Xeon® processors. The processing core also handles the caching of stored data in both DRAM and Flash 112. In some embodiments, the DRAM/Flash cache may comprise a 3 TB DRAM cache.

In some configurations, the storage appliances 120 may comprise an I/O port 116 to receive I/O requests from the data storage controllers 128. Each of the storage appliances 120 may include an integral rack-mounted unit with its own internally redundant power supply and cooling system. A concentrator board 110 or other similar hardware device may be used to interconnect a plurality of storage devices. Active components such as memory boards, concentrator boards 110, power supplies, and cooling devices may be hot swappable. For example, the storage appliance 120 may include flash memory 102, nonvolatile RAM (NVRAM) 104, various configurations of hard disk drives 105, tape drives, RAID arrays 108 of disk drives, and so forth. These storage units may be designed for high availability with hot swapping and internal redundancy of memory cards, power, cooling, and interconnect. In some embodiments the RAM may be made non-volatile by backing it up to dedicated Flash on loss of power. The mix of Flash and NVRAM cards may be configurable, and both may use the same connector and board profile.

Although not shown explicitly, each of the I/O servers 136 may execute a global management process, or data storage system manager, that may supervise the operation of the storage system in a pseudo-static, "low touch" approach, intervening when capacity must be reallocated between ZFS instances, for global Flash wear leveling, for configuration changes, and/or for failure recovery. The "divide and conquer" strategy of dividing the capacity among individual ZFS instances may enable a high degree of scalability of performance, connectivity, and capacity. Additional performance may be achieved by horizontally adding more I/O servers 136, and then assigning less capacity per ZFS instance and/or fewer ZFS instances per I/O server 136. Performance may also be scaled vertically by using faster servers. Additional host ports may be added by filling available slots in the I/O servers 136 and then adding additional servers. Additional capacity may also be achieved by adding additional storage appliances 120, and allocating the new capacity to new or existing ZFS instances.

Figure 2:
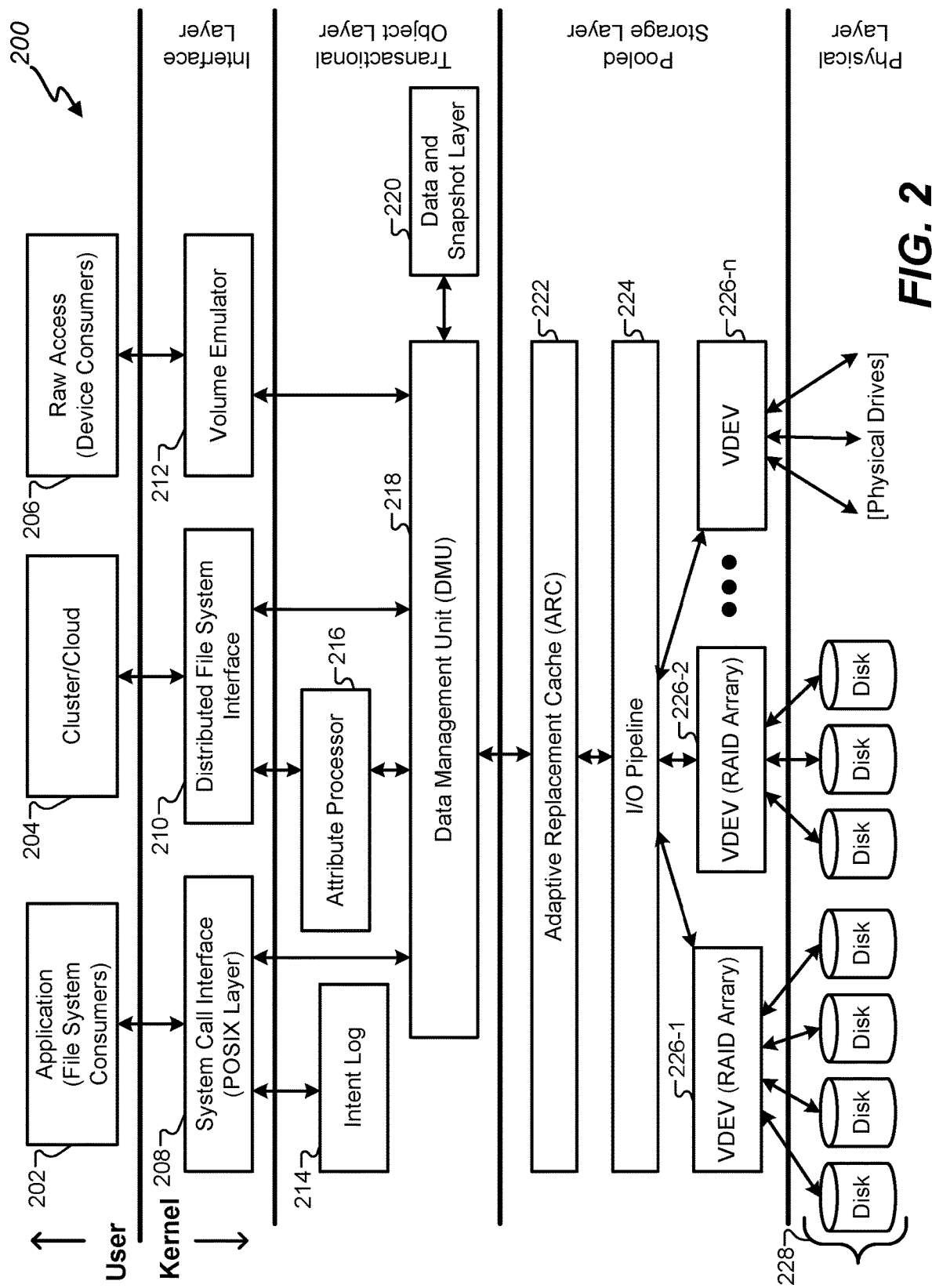
FIG. 2 illustrates an instance of a file system that may be executed in a storage environment, in accordance with certain embodiments of the present disclosure.

FIG. 2 illustrates an instance of an example network file system 200 that may be executed in a storage environment, including the storage environment of FIG. 1, in accordance with certain embodiments of the present disclosure. For example, the file system 200 may include the Oracle ZFS file system ("ZFS"), which provides very large capacity (128-bit), data integrity, an always-consistent, on-disk format, self-optimizing performance, and real-time remote replication. Among other ways, ZFS departs from traditional file systems at least by eliminating the need for a separate volume manager. Instead, a ZFS file system shares a common storage pool of storage devices and acts as both the volume manager and the file system. Therefore, ZFS has complete knowledge of both the physical disks and volumes (including their condition, status, and logical arrangement into volumes, along with all the files stored on them). Devices can be added or removed from the pool as file system capacity requirements change over time to dynamically grow and shrink as needed without needing to repartition the underlying storage pool.

In certain embodiments, the system 200 may interact with an application 202 through an operating system. The operating system may include functionality to interact with a file system, which in turn interfaces with a storage pool. The operating system typically interfaces with the file system 200 via a system call interface 208. The system call interface 208 provides traditional file read, write, open, close, etc., operations, as well as VNODE operations and VFS operations that are specific to the VFS architecture. The system call interface 208 may act as a primary interface for interacting with the ZFS as a file system. This layer resides between a data management unit (DMU) 218 and presents a file system abstraction of the files and directories stored therein. The system call interface 208 may be responsible for bridging the gap between the file system interfaces and the underlying DMU 218 interfaces.

In addition to the POSIX layer of the system call interface 208, the interface layer of the file system 200 may also provide a distributed file system interface 210 for interacting with cluster/cloud computing devices 204. For example, a Lustre® interface may be provided to provide a file system for computer clusters ranging in size from small workgroup clusters to large-scale, multi-site clusters. A volume emulator 212 may also provide a mechanism for creating logical volumes which can be used as block/character devices. The volume emulator 212 not only allows a client system to distinguish between blocks and characters, but also allows the client system to specify the desired block size and thereby create smaller, sparse volumes in a process known as "thin provisioning." The volume emulator 212 provides raw access 206 to external devices.

Underneath the interface layer lies a transactional object layer. This layer provides an intent log 214 configured to record a per-dataset transactional history which can be replayed upon a system crash. In ZFS, the intent log 214 saves transaction records of system calls that change the file system in memory with sufficient information to be able to replay the system calls. These are stored in memory until the DMU 218 commits them to the storage pool and they can be discarded or they are flushed. In the event of a power failure and/or disk failure, the intent log 214 transactions can be replayed to keep the storage pool up-to-date and consistent.

The transactional object layer also provides an attribute processor 216 that may be used to implement directories within the POSIX layer of the system call interface 208 by making arbitrary {key, value} associations within an object. The attribute processor 216 may include a module that sits on top of the DMU 218 and may operate on objects referred to in the ZFS as "ZAP objects." ZAP objects may be used to store properties for a dataset, navigate file system objects, and/or store storage pool properties. ZAP objects may come in two forms: "microzap" objects and "fatzap" objects. Microzap objects may be a lightweight version of the fatzap objects and may provide a simple and fast lookup mechanism for a small number of attribute entries. Fatzap objects may be better suited for ZAP objects containing large numbers of attributes, such as larger directories, longer keys, longer values, etc.

The transactional object layer also provides a data set and snapshot layer 220 that aggregates DMU objects in a hierarchical namespace, and provides a mechanism for describing and managing relationships between properties of object sets. This allows for the inheritance of properties, as well as quota and reservation enforcement in the storage pool. DMU objects may include ZFS file system objects, clone objects, CFS volume objects, and snapshot objects. The data and snapshot layer 220 can therefore manage snapshot and clone object sets. A snapshot may correspond to a read-only version of a file system, clone, and/or volume at a particular point in time. Clones originate from snapshots, and their initial contents are identical to that of the snapshot from which they originated. Clones may be identical to the file system with the exception of its origin. In ZFS, snapshots persist across system reboots and do not need to use a separate storage pool. Instead, snapshots consume disk space directly from the same storage pool as the file system or volume from which they were created. Snapshots can be recursively created quickly as one atomic expression. Snapshots can be cloned, backed up, rolled back to, and so forth. Typically, snapshots provide a fast and efficient way to back up the current stable file system before risky actions, such as a software installation or system upgrade, are performed.

The DMU 218 presents a transactional object model built on top of a flat address space presented by the storage pool. The modules described above interact with the DMU 218 via object sets, objects, and transactions, where objects are pieces of storage from the storage pool, such as a collection of data blocks. Each transaction through the DMU 218 comprises a series of operations that are committed to the storage pool as a group. This is the mechanism whereby on-disk consistency is maintained within the file system. Stated another way, the DMU 218 takes instructions from the interface layer and translates those into transaction batches. Rather than requesting data blocks and sending single read/write requests, the DMU 218 can combine these into batches of object-based transactions that can be optimized before any disk activity occurs. Once this is done, the batches of transactions are handed off to the storage pool layer to schedule and aggregate the raw I/O transactions required to retrieve/write the requested data blocks. As will be described below, these transactions are written on a copy-on-write (COW) basis, which eliminates the need for transaction j ournaling.

The storage pool layer, or simply the "storage pool," may be referred to as a storage pool allocator (SPA). The SPA provides public interfaces to manipulate storage pool configuration. These interfaces can create, destroy, import, export, and pool various storage media and manage the namespace of the storage pool. In some embodiments, the SPA may include an adaptive replacement cache (ARC) 222 that acts as a central point for memory management for the SPA. Traditionally, an ARC provides a basic least-recently-used (LRU) object replacement algorithm for cache management. In ZFS, the ARC 222 comprises a self-tuning cache that can adjust based on the I/O workload. Additionally, the ARC 222 defines a data virtual address (DVA) that is used by the DMU 218. In some embodiments, the ARC 222 has the ability to evict memory buffers from the cache as a result of memory pressure to maintain a high throughput.

The SPA may also include an I/O pipeline 224, or "I/O manager," that translates the DVAs from the ARC 222 into logical locations in each of the virtual devices (VDEVs) 226 described below. The I/O pipeline 224 drives the dynamic striping, compression, checksum capabilities, and data redundancy across the active VDEVs. Although not shown explicitly in FIG. 2, the I/O pipeline 224 may include other modules that may be used by the SPA to read data from and/or write data to the storage pool. For example, the I/O pipeline 224 may include, without limitation, a compression module, an encryption module, a checksum module, and a metaslab allocator. The compression module may compress larger logical blocks into smaller segments, where a segment is a region of physical disk space. The encryption module may provide various data encryption algorithms that may be used to prevent unauthorized access. The checksum module can calculate a checksum for data and metadata within the storage pool hierarchy as described in more detail below. The checksum may be used, for example, to ensure data has not been corrupted. In some embodiments, the SPA may use the metaslab allocator to manage the allocation of storage space in the storage pool.

In ZFS, the storage pools may be made up of a collection of VDEVs. In certain embodiments, at least a portion of the storage pools may be represented as a self-described Merkle tree, a logical tree where both data and metadata are stored by VDEVs of the logical tree. There are two types of virtual devices: physical virtual devices called leaf VDEVs, and logical virtual devices called interior VDEVs. A physical VDEV may include a writeable media block device, such as a hard disk or Flash drive. A logical VDEV is a conceptual grouping of physical VDEVs. VDEVs can be arranged in a tree with physical VDEVs existing as leaves of the tree. The storage pool may have a special logical VDEV called a "root VDEV" which roots the tree. All direct children of the root VDEV (physical or logical) are called "top-level" VDEVs. In general, VDEVs implement data replication, mirroring, and architectures such as RAID-Z and RAID-Z2. Each leaf VDEV represents one or more physical storage devices 228 that actually store the data provided by the file system.

In some embodiments, the file system 200 may include an object-based file system where both data and metadata are stored as objects. More specifically, the file system 200 may include functionality to store both data and corresponding metadata in the storage pool. A request to perform a particular operation (i.e., a transaction) is forwarded from the operating system, via the system call interface 208, to the DMU 218, which translates the request to perform an operation on an object directly to a request to perform a read or write operation (i.e., an I/O request) at a physical location within the storage pool. The SPA receives the request from the DMU 218 and writes the blocks into the storage pool using a COW procedure. COW transactions may be performed for a data write request to a file. Instead of overwriting existing blocks on a write operation, write requests cause new segments to be allocated for the modified data. Thus, retrieved data blocks and corresponding metadata are never overwritten until a modified version of the data block and metadata are committed. Thus, the DMU 218 writes all the modified data blocks to unused segments within the storage pool and subsequently writes corresponding block pointers to unused segments within the storage pool. To complete a COW transaction, the SPA issues an I/O request to reference the modified data block.

FIGS. 3A-3D illustrate a COW process for a file system, such as the file system 200, in accordance with certain embodiments of the present disclosure. For example, the ZFS system described above uses a COW transactional model where all block pointers within the file system may contain 256-bit checksum of a target block which is verified when the block is read. As described above, blocks containing active data are not overwritten in place. Instead the new block is allocated, modified data is written to it, and then any metadata blocks referencing it are simply read, reallocated, and rewritten. When new data is written, the blocks containing the old data may be retained, allowing a snapshot version of the file system to be maintained. Snapshots may be created quickly, since all the data in the snapshot is already stored. Snapshots are also very space efficient, since any unchanged data is shared among the file system and its snapshots.

Figure 3A:
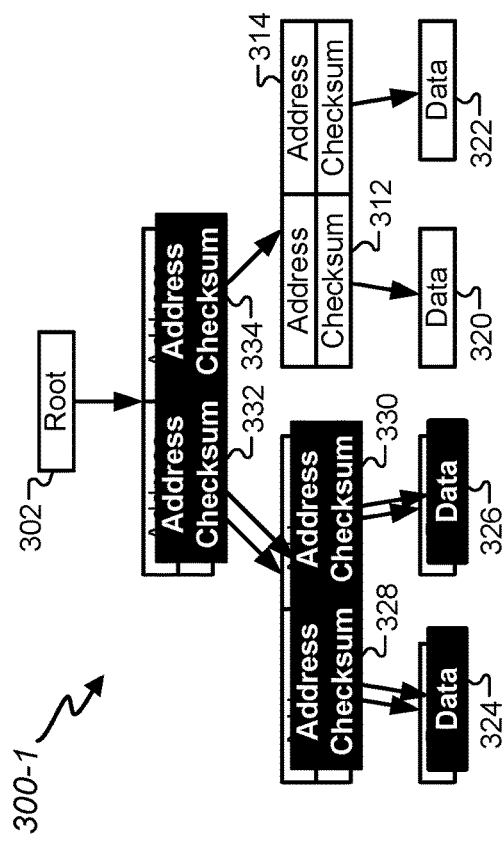
FIGS. 3A-3D illustrate a copy-on-write process for a file system, in accordance with certain embodiments of the present disclosure.

FIG. 3A illustrates a simplified snapshot of a file system storage of data and metadata corresponding to one or more files as a logical tree 300, according to some embodiments. The logical tree 300, as well as other logical trees described herein, may be a self-described Merkle tree where the data and metadata are stored as blocks of the logical tree 300. A root block 302 may represent the root of the logical tree 300, or "uberblock." The logical tree 300 can be traversed through files and directories by navigating through each child node 304, 306 of the root 302. Each non-leaf node represents a directory or file, such as nodes 308, 310, 312, and 314. In some embodiments, each non-leaf node may be assigned a hash of values of its child nodes. Each leaf node 316, 318, 320, 322 represents a data block of a file.

Figure 3B:
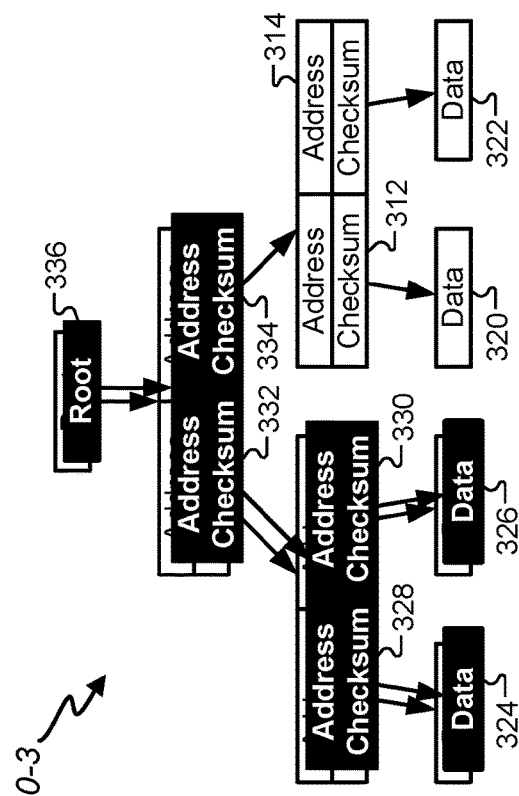

FIG. 3B illustrates a snapshot of the logical tree 300-1 after an initial stage of a write operation. In this example, the data blocks represented by nodes 324 and 326 have been written by the file system 200. Instead of overwriting the data in nodes 316 and 318, new data blocks are allocated for nodes 324 and 326. Thus, after this operation, the old data in nodes 316 and 318 persist in the memory along with the new data in nodes 324 and 326.

Figure 3C:
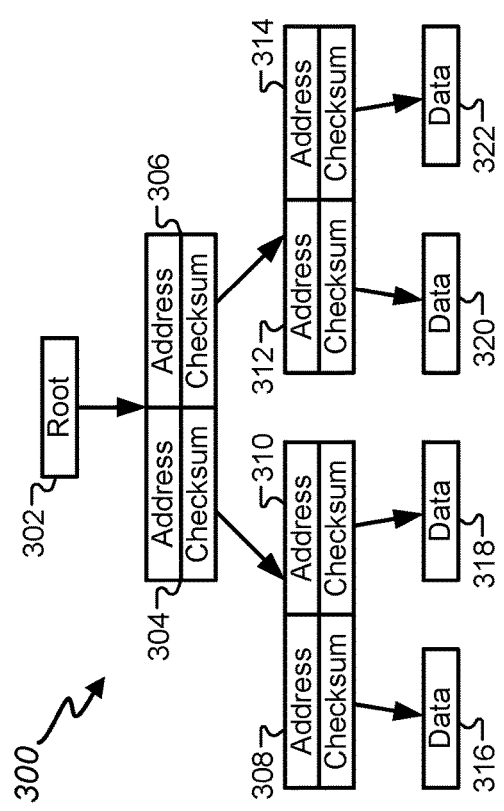

FIG. 3C illustrates a snapshot of the logical tree 300-2 as the write operation continues. In order to reference the newly written data blocks in nodes 324 and 326, the file system 200 determines nodes 308 and 310 that reference the old nodes 316 and 318. New nodes 328 and 330 are allocated to reference the new data blocks in nodes 324 326. The same process is repeated recursively upwards through the file system hierarchy until each node referencing a changed node is reallocated to point to the new nodes.

When the pointer blocks are allocated in new nodes in the hierarchy, the address pointer in each node is updated to point to the new location of the allocated child in memory. Additionally, each data block includes a checksum that is calculated by the data block referenced by the address pointer. For example, the checksum in node 328 is calculated using the data block in node 324. This arrangement means that the checksum is stored separately from the data block from which it is calculated. This prevents so-called "ghost writes" where new data is never written, but a checksum stored with the data block would indicate that the block was correct. The integrity of the logical tree 300 can be quickly checked by traversing the logical tree 300 and calculating checksums at each level based on child nodes.

Figure 3D:
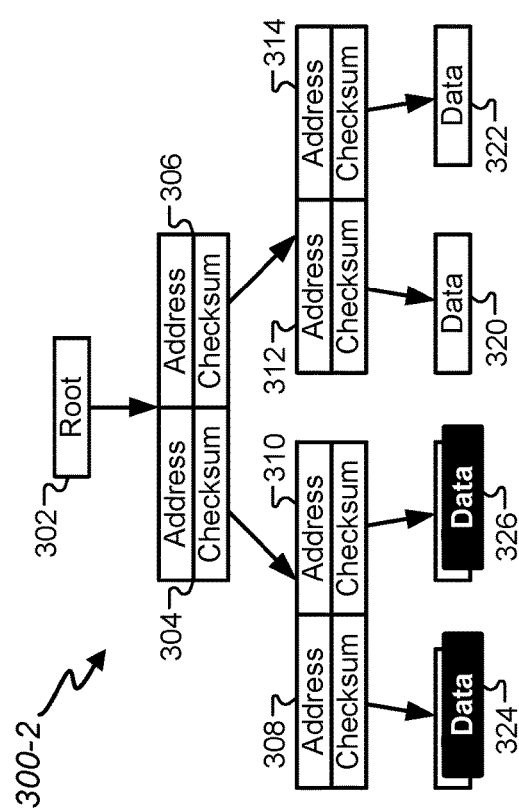

In order to finalize the write operation, the root 302 can be reallocated and updated. FIG. 3D illustrates a snapshot of the logical tree 300-3 at the conclusion of the write operation. When the root 302 is ready to be updated, a new uberblock root 336 can be allocated and initialized to point to the newly allocated child nodes 332 and 334. The root 336 can then be made the root of the logical tree 300-3 in an atomic operation to finalize the state of the logical tree 300-3.

The embodiments described herein may be implemented in the system described above in FIGS. 1-3. For example, the system may comprise one or more processors of the various servers, storage appliances, and/or switching circuits of FIG. 1. Instructions may be stored in one or more memory devices of the system that cause the one or more processors to perform various operations that affect the functioning of the file system. Steps of various methods may be performed by the processors, memory devices, interfaces, and/or circuitry of the system in FIGS. 1-2.

Figure 4:
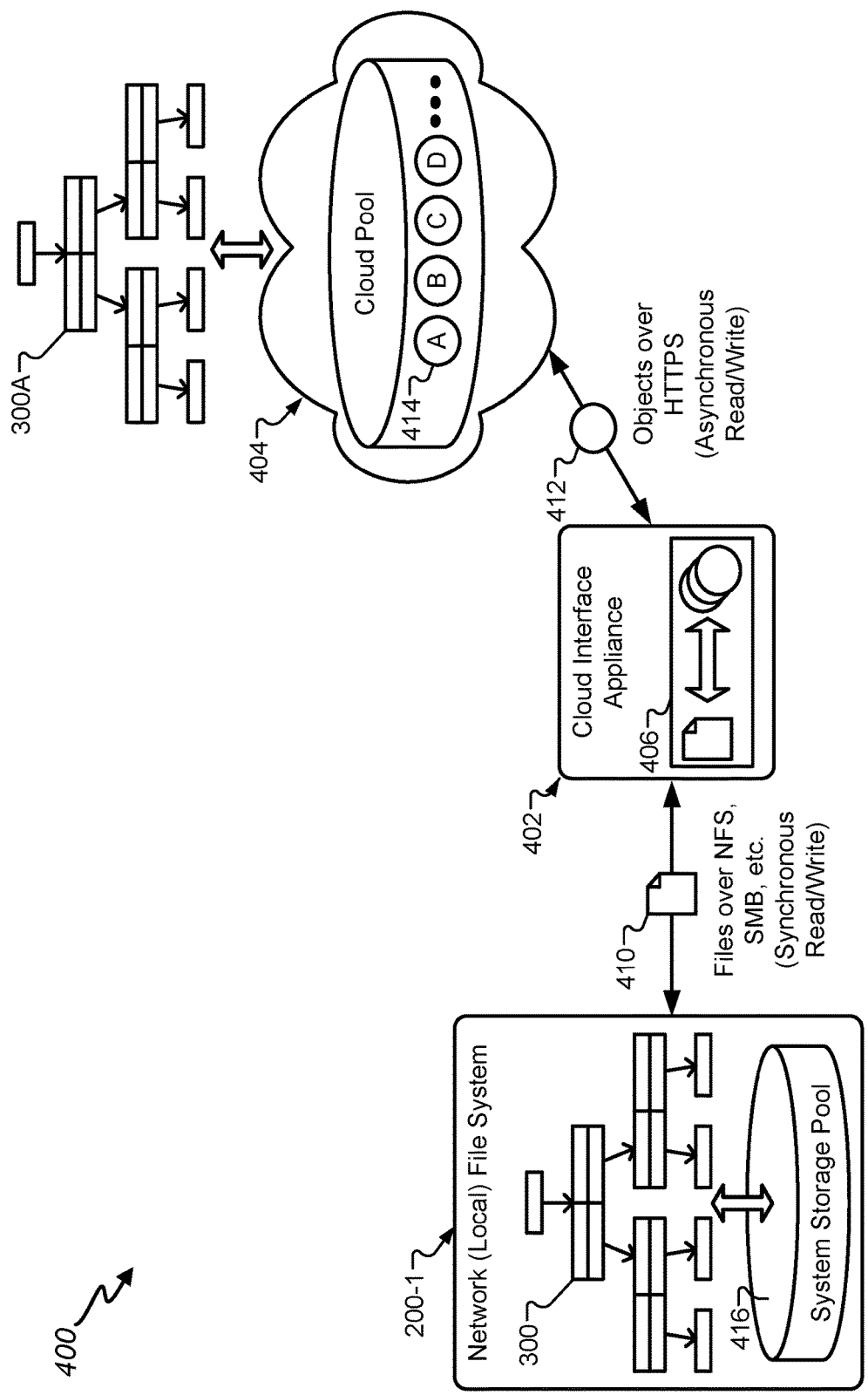
FIG. 4 is a high-level diagram illustrating an example of a hybrid cloud storage system, in accordance with certain embodiments of the present disclosure.

Turning now to FIG. 4, FIG. 4 is a high-level diagram illustrating an example of a hybrid cloud storage system 400, in accordance with certain embodiments of the present disclosure. The hybrid cloud storage system 400 may transform a network file system, such as a ZFS file system, into a cloud-capable file system where functionality of the file system, including file system data services, is layered on a cloud object store that is remote from the file system. As in the depicted diagram, the hybrid cloud storage system 400 may include the network file system 200 (also referenced herein as the "local file system 200"). The local file system 200 may be communicatively coupled to a cloud object storage 404. In some embodiments, the cloud object storage 404 may correspond to the cluster/cloud 204 indicated in FIG. 2. The local file system 200 may be communicatively coupled to the cloud object storage 404 by way of a cloud interface appliance 402. The cloud interface appliance 402 may be used by the local file system 200 as an access point for the cloud object store 404.

The hybrid cloud storage system 400 provides solution to overcome traditional limitations of cloud object storage. Traditional cloud object protocols are limited to restricted data/object access semantics. Cloud object stores traditionally have limited interfaces and primitives, and are not POSIX compliant. For example, once an object is written, it cannot be thereafter modified; it may only be deleted and replaced with a newly created object. As another example, traditional cloud object storage has namespace limitations such that the namespace is simplified and limited to only top-level containers. However, not only may the hybrid cloud storage system 400 migrate data to and from the cloud object store 404, but also the hybrid cloud storage system 400 may layer file system functionality of the local file system 200 on cloud object interfaces to the cloud object storage 404 to provide the cloud-based storage.

The local file system 200 may be configured for POSIX interfaces and semantics. For example, the local file system 200 may provide a user with access to data as files, allowing for modification of content of a file without rewriting the file. The local file system 200 may also provide for the organization of data in name hierarchies as is typical for ZFS file systems. All the functionalities of a ZFS file system may be available to a user of the local file system 200. The cloud interface appliance 402 may allow for layering of filesystem semantics on top of a cloud object protocol—for example, to provide the abilities to construct a namespace, create files, create directories, etc.—and extend such abilities with respect to data migrated to and from the cloud object storage 404. The cloud interface appliance 402 may facilitate a plug-n-play object storage solution to improve the local file system 200 while supporting ZFS file system data services.

The cloud interface appliance 402 may be configured to provide an object API (application programming interface). In some embodiments, the cloud interface appliance 402 may be configured to use a number of API translation profiles. According to certain embodiments, the API translation profiles may integrate modules and functions (e.g., the data services and modules), POSIX interfaces and semantics, and other components which may not be natively designed to interact with cloud storage. The API translation profiles, in some embodiments, may translate protocols, formats, and routines of the file system 200 (e.g., by way of API calls) to allow interaction with the cloud data store 404. Information for such integration may be stored in an API translation data store, which could be co-located with the cloud interface appliance 402 or otherwise communicatively coupled to the cloud interface appliance 402. The cloud interface appliance 402 may utilize the information to cohesively integrate POSIX interfaces and semantics to interface with the cloud data store 404 while preserving the semantics.

The hybrid cloud storage system 400 may allow the local file system 200 to use the cloud object storage 404 as a "drive." In various instances, the files 410 may be stored as data objects with metadata objects, and/or as data blocks with associated metadata. The cloud interface appliance 402 may receive and transfer files 410 from and to the local file system 200. In various embodiments, the local file system 200 may receive and/or transmit the files 410 via the NFS (Network File System) protocol, SMB (Server Message Block Protocol), and/or the like. In some embodiments, the cloud interface appliance 402 may translate the files 410 into objects 412. The translation of the files 410 may include translating data blocks and associated metadata and/or data objects associated with metadata objects, any of which may correspond to the files 410. In some embodiments, the translation may include the cloud interface appliance 402 performing API translation with a number of the API translation profiles. The translation, according to some embodiments, may include the cloud interface appliance 402 extracting data and/or metadata from the files 410, objects, and/or blocks. The cloud interface appliance 402 may convert the files 410, objects, and/or blocks to cloud storage objects at least in part by using the extracted data. In some embodiments, the cloud interface appliance 402 may create corresponding cloud storage objects with extracted data embedded in put requests directed to the cloud object store 404. Likewise, with any of the translations effected by the cloud interface appliance 402 to interface out to the cloud data store 404, the cloud interface appliance 402 may, in some embodiments, reverse the translation processes to interface with local components of the local file system 200.

The cloud interface appliance 402 may transfer and receive objects 412 to and from the cloud object storage 404. In some embodiments, the cloud interface appliance 402 may receive and/or transmit the objects 412 via HTTPS and/or the like. In some embodiments, the cloud interface appliance 402 may be co-located with the local file system 200. In other embodiments, the cloud interface appliance 402 may be located remotely from local file system 200, such as with at least some equipment facilitating the cloud object store 404 or at some other communicatively coupled site.

As disclosed further herein, files in the local file system 200 may be stored as "disk blocks," virtual storage blocks where data objects and metadata corresponding to a file are stored as a logical tree 300 (e.g., a self-described Merkle tree where data and metadata are stored as blocks). The cloud interface appliance 402 may create a mapping 406 of each logical block in the tree 300 of data directly to cloud objects 414 in the cloud object store 404. Some embodiments may employ a one-to-one block-to-object mapping. Other embodiments, additionally or alternatively, may employ any other suitable ratio of blocks to cloud objects, for example, to map multiple blocks to one cloud object. In some instances of such embodiments, an entire logical tree of blocks may be mapped to a single cloud object. In other instances, only part of a logical tree of blocks may be mapped to a single cloud object.

In some embodiments, address pointers are updated when the blocks are converted into cloud objects. When blocks are converted into cloud objects with a one-to-one block-to-object conversion scheme, the address pointers may be updated so that non-leaf cloud objects in the hierarchy point to child cloud objects in the cloud object store 404. By way of example, an address pointer could correspond to an object name of child cloud object and path specification, which may include parameters such as the object name, a bucket specification, etc. Accordingly, some embodiments may translate the blocks of the logical tree 300 to cloud objects of the logical tree 300A. With some embodiments, such translation may enable the cloud interface appliance 402 to traverse the logical tree 300A of cloud objects utilizing the address pointers of the cloud objects.

In some embodiments, when blocks are converted into cloud objects with a multiple-to-one block-to-object conversion scheme such that part of the logical tree 300 is converted to one cloud object, the address pointers the cloud objects comprising the logical 300A may be similarly updated, but to a less granular extent, so that non-leaf cloud objects in the hierarchy point to child cloud objects in the cloud object store 404. Such translation may enable the cloud interface appliance 402 to traverse the logical tree 300A of cloud objects utilizing the address pointers of the cloud objects, in a less granular but faster manner than traversal facilitated by the one-to-one block-to-object conversion scheme. Additionally, in some embodiments, checksums may be updated with conversion process. Checksums for individual cloud objects could be updated and stored separately in parent cloud objects. In conversions employing the multiple-to-one block-to-object conversion scheme, a single checksum could be calculated for a cloud object that corresponds to a set of blocks.

The realization of the mapping 406 accordingly allows for communications over one or more networks to the cloud object store 404, and the interface with the cloud object store 404 may be object-based as opposed to block-based. As disclosed further herein, with the cloud interface appliance 402 between the local file system 200 and the cloud object store 404, the hybrid cloud storage system 400 may possess different characteristics and failure modes than traditional ZFS file systems. The cloud interface appliance 402 may translate file system interfaces of the local file system 202 on the client side and may be capable of coordination via object protocol out to the cloud object store 404 to read and write data. Through the cloud interface appliance 402, the cloud objects 414 may remain accessible by the local file system 200 over NF S, SMB, and/or the like.

With the mapping 406 of cloud objects 414 as logical blocks, collections of the cloud objects 414 may be grouped to form a drive that hosts ZFS storage pools as self-contained collections. The drive content may be elastic such that cloud objects may only be created for logical blocks that have been allocated. In some embodiments, the cloud interface appliance 402 may have the capability to assign variable object sizes (e.g., for different data types) to allow for greater storage flexibility. The data need not be limited to a specific byte size. Storage size may be expanded as needed by modifying the metadata. In some embodiments, cloud-based pools may be imported on any server. Once imported, cloud-based pools may appear as local storage with all ZFS services supported for the cloud-based pools. A cloud-based pool may be indicated as a new type of storage pool. Yet, from a user perspective, the data from the cloud-based pools may appear indistinguishable from native pools.

Figure 5:
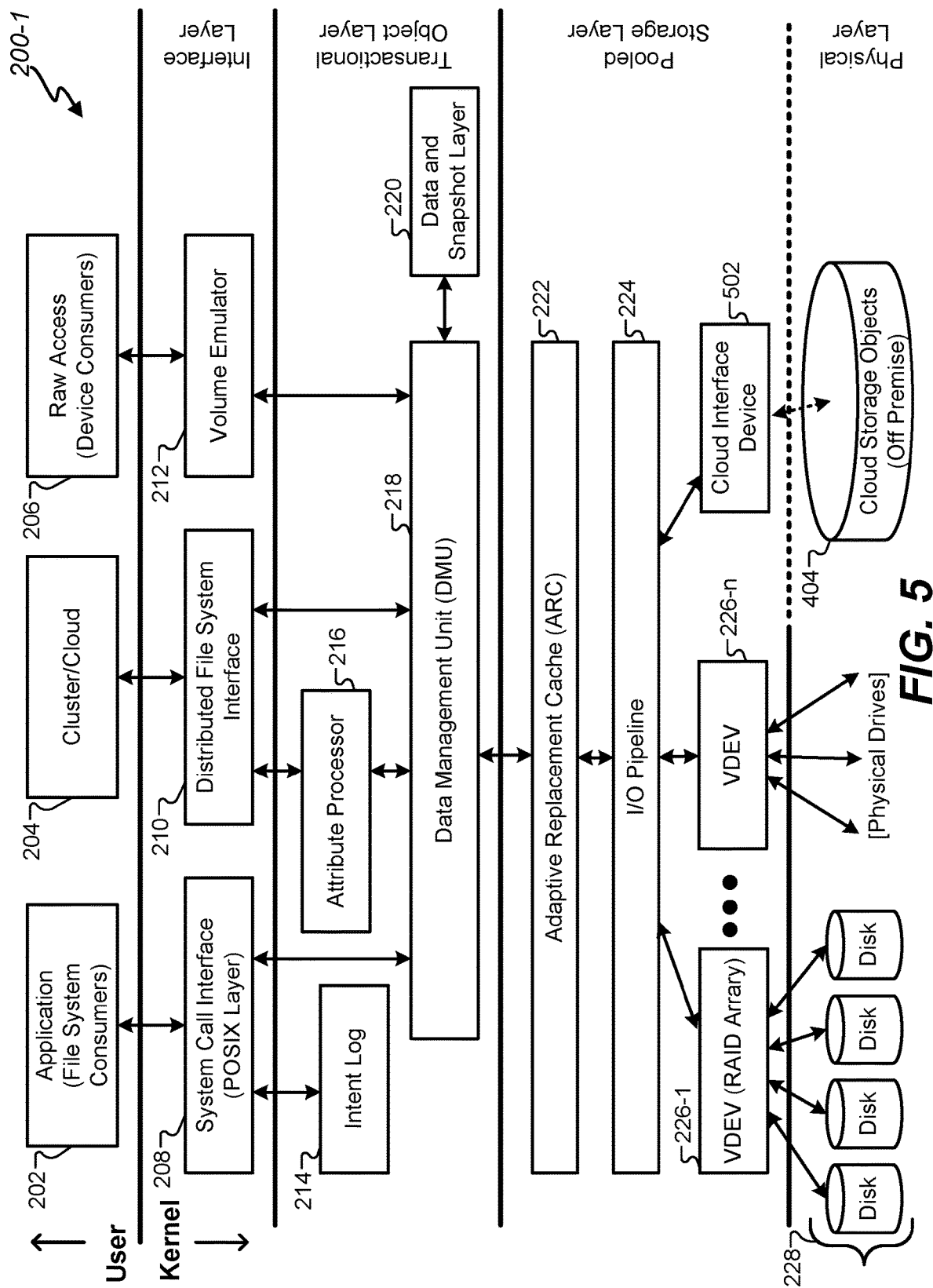
FIG. 5 illustrates an instance of an example network file system of the hybrid cloud storage system, in accordance with certain embodiments of the present disclosure.

FIG. 5 illustrates an instance of an example network file system 200-1 of the hybrid cloud storage system 400, in accordance with certain embodiments of the present disclosure. The file system 200-1 may correspond to the file system 200, but with cloud device management integrated directly into a ZFS control stack. Beyond that which is disclosed with respect to the file system 200, the file system 200-1 may include a cloud interface device 502 that facilitates leveraging of the cloud object store 404 as a storage medium for the file system 200-1. The cloud interface device 502 may facilitate a cloud drive at least in part by mapping a cloud storage into a device abstraction.

In some embodiments, the cloud interface device 502 may correspond to one or more VDEVs of another VDEV type of a device driver interface inside a ZFS file system architecture. The ZFS may communicate directly with the cloud interface device 502. The cloud interface device 502 may be at a virtual device layer directly above a driver layer of the file system 200-1. Some embodiments of the cloud interface device 502 may correspond to an abstraction of the device driver interface inside the ZFS architecture. Other components of the file system 200-1 may communicate with the cloud interface device 502 as though it was another VDEV of another device type, such as the VDEVs 226. To enable passage of a greater amount of information through the cloud interface device 502 relative to through other VDEVs 226, interfaces associated with the cloud interface device 502 may be wider to pass more information through the I/O pipeline 224 and the cloud interface device 502, out to the cloud object data store 404.

In some embodiments, the cloud interface device 502 may translate file system interfaces on the client end. In some embodiments, in order to provide complete POSIX file system semantics, the cloud interface device 502 may convert file system interface requests into object interface requests directed toward the cloud object store 404. In some embodiments, the cloud interface device 502 may be capable of communicating via object protocol out to the cloud object store 404 to read and write data.

Figure 6:
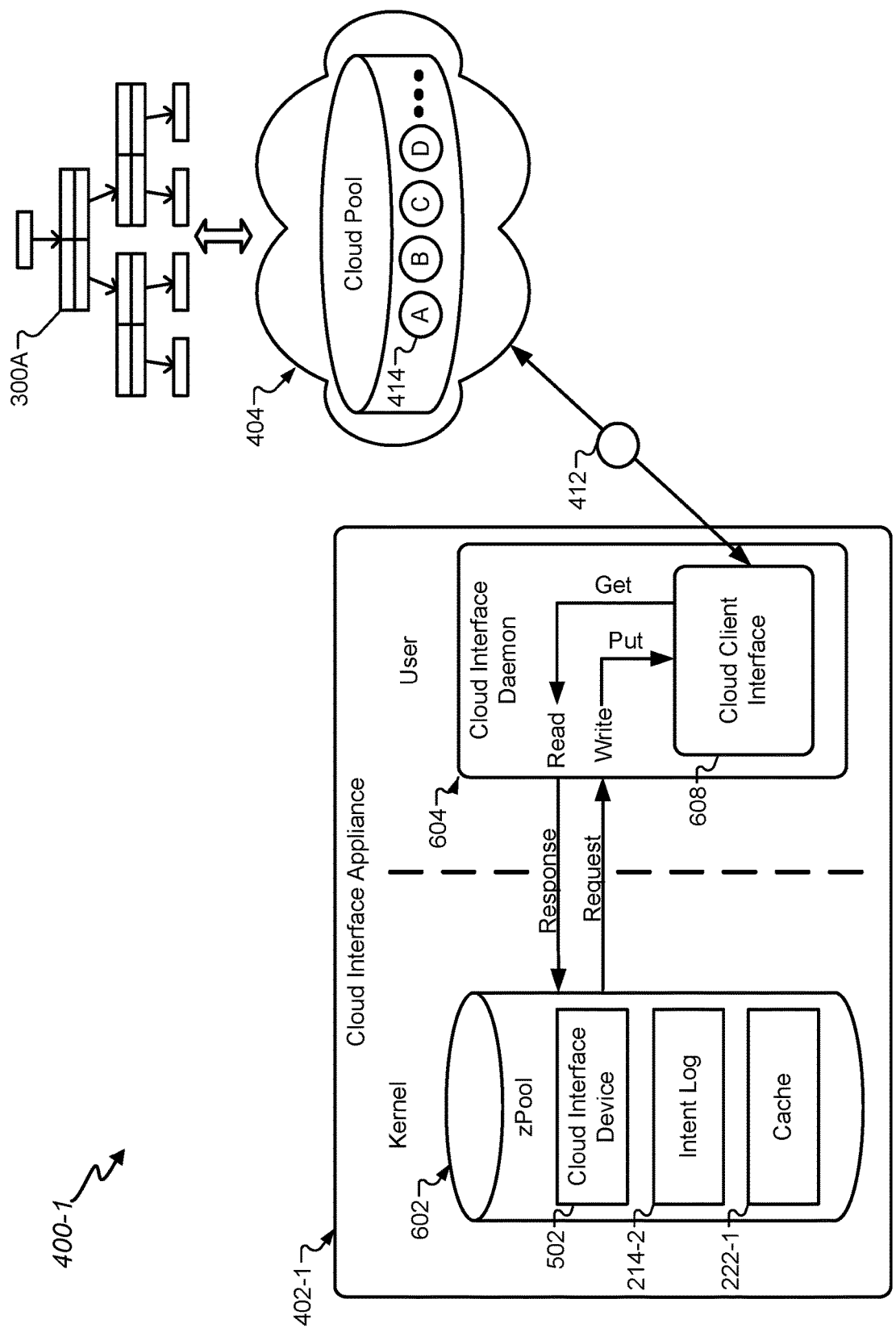
FIG. 6 is a diagram illustrating additional aspects of a cloud interface appliance of a hybrid cloud storage system, in accordance with certain embodiments of the present disclosure.

FIG. 6 is a diagram illustrating additional aspects of a cloud interface appliance 402-1 of a hybrid cloud storage system 400-1, in accordance with certain embodiments of the present disclosure. As indicated in the example depicted, some embodiments of the cloud interface appliance 402 may include a virtual storage pool 602 and a cloud interface daemon 604. The virtual storage pool 602 may be at the kernel of the file system 200-1, and the cloud interface daemon 604 may be on the user space of the file system 200-1. In various embodiments, the cloud interface daemon 604 may correspond to a cloud interface component of the application 202 and/or the cluster/cloud 204 indicated in FIG. 5.

In some embodiments, the virtual storage pool 602 may include at least one cloud interface device 502, intent log 214-2, and cache 222-1. The intent log 214-2 and the cache 222-1 described above with respect to FIGS. 1-2 and below with respect to FIG. 7. The cloud interface device 502 may interact with the cloud interface daemon 604 to coordinate operations with respect to the cloud object data store 404 based at least in part on the mapping 406. The cloud interface daemon 604 may include a cloud client interface 608 to interface with the cloud object data store 404. In some implementations, the cloud client interface 608 may include an endpoint providing Swift/S3 compatibility with the cloud object data store 404. Operations of the cloud client interface 608 may be based at least in part on getting and putting whole data objects 412 in order to facilitate read and write access to the cloud object data store 404.

Referring back to FIGS. 4 and 5, in operation according to some embodiments, requests to perform one or more transactions with respect to one or more files may be received from the application 202 at an application layer of the file system 200-1, and through the system call interface 208 of the interface layer of the file system 200-1. The requests may be POSIX-compliant and may be converted by one or more components of the file system 200-1 into one or more object interface requests to perform one or more operations with respect to a cloud-based instantiation 300A of the logical tree 300 stored in the cloud object store 404. For example, in some embodiments, the cloud interface appliance 402 may convert the POSIX-compliant requests, or intermediary requested caused by the POSIX-compliant requests, into corresponding object interface requests. In some embodiments, the DMU 218 may translate the POSIX-compliant requests into I/O requests to perform I/O operations, and the cloud interface appliance 402 may translate the I/O requests into corresponding object interface requests, coordinating the object interface requests using the mapping 406.

In some instances, the transactions could correspond to operations to cause storage of the files locally. In some instances, the file system 200-1 may store data objects and corresponding metadata in a system storage pool 416 provided by the one or more of the VDEVs 226 and the one or more physical storage devices 228. The data objects may correspond to the one or more files. As disclosed above, the data objects and metadata corresponding to the one or more files may be stored as a logical tree 300. Hence, the storage of the logical tree 300 may be stored locally in the system storage pool 416.

In further operation according to some embodiments, the file system 200-1 may cause storage of the data objects and the corresponding metadata of the logical tree 300 in the cloud object store 404. While the logical tree 300 may first be stored in the local storage pool before being migrated to cloud storage in some embodiments, in other embodiments the logical tree 300 may not be stored in the local storage pool before being stored in the cloud object store 404. For example, some embodiments may create at least part of the logical tree 300 in cache and then migrate it to the cloud object store 404. Thus, it should be appreciated that various embodiments are possible.

In order to store the data objects and the corresponding metadata of the logical tree 300 in the cloud object store 404, the cloud interface device 502 may create a mapping 406 of each logical block in the logical tree 300 to a respective cloud object 414 in the cloud object store 404. In some embodiments, the DMU 218 may read data from the system storage pool 416 (e.g., from a RAIDZ or a RAIDZ2 of the local pool) to provide the data to the cloud interface device 502 as a basis for creating the mapping 406. In some embodiments, the cloud interface device 502 may communicate directly or indirectly with another VDEV 226 to read data as a basis for the mapping 406. In some embodiments, the mapping 406 may map objects directly to blocks represented in a physical drive. The mapping 406 may be more refined than mapping file parts to objects; it may map at a lower level. Accordingly, the mapping 406 may be a per-object mapping 406. The mapping 406 may map virtual storage blocks onto objects in the cloud object store 404 so that the logical tree 300 is represented in the cloud object store 404, as is illustrated by the logical tree 300A. When the local file system 200-1 interfaces with the data objects 416 in the cloud object store 404, the logical tree 300A conforms to a new device type with which the local file system 200-1 is able to communicate.

The mapping 406 may be updated with every I/O operation or only with write operations to the cloud object store 404. In some embodiments, the mapping 406 may include an object directory that indexes all the cloud objects 414. Cloud object states may be kept in an index, a table, an index-organized table, and/or the like which may be indexed on a per-object basis. In some embodiments, the mapping 406 may include an object directory that indexes only some of the cloud objects 414. For example, such embodiments may index only cloud objects 414 that correspond to uberblocks. In some embodiments, cloud object states for each object relative to each leaf path may be indexed. In some embodiments, the object directory may reference the cloud objects 414 by address pointers that could correspond to object names and path specifications. In some embodiments, the object directory may reference the cloud objects 414 by URLs.

The cloud object states indexed in the mapping 406 may be used to route object requests. Utilizing the index, the cloud interface device 502 may request cloud objects based at least in part on the uberblocks. According to a first method, such requests may entail requesting a set of cloud objects associated with a particular uberblock so that the entire logical tree 300A is represented by the set of cloud objects transferred in response to the request. According to a second method, such requests may entail iterative requests for subsets of cloud objects associated with a particular uberblock in order to iteratively traverse the entire logical tree 300A until the desired one or more cloud objects are read from the cloud object store 404. With certain embodiments, the cloud interface device 502 may selectively used one of the two methods based at least in part on the size of the cloud objects representing various logical trees 300A. For example, the cloud interface device 502 could utilize one method when the size of the cloud objects is less than an aggregate size threshold, and tranisition to the other method when the size of the cloud objects meets or exceeds the aggregate size threshold.

Some embodiments may employ another method where the object directory may index the cloud objects on a per-object basis and may be used to request cloud objects directly without tree traversal at the cloud level. Some embodiments may retain a local snapshot of metadata of the logical tree 300A. Such embodiments may utilize the local snapshot to request cloud objects directly or indirectly. Additionally, some embodiments may retain checksums for the logical tree 300A in the object directory or a local snapshots, which checksums may be used to validate cloud objects retrieved from the cloud data store 404.

Thus, the file system 200-1 may maintain a tree of data and map that tree onto the cloud object store 404. The namespace of the tree 300A may correspond to metadata stored within nodes of the tree 300A. The file system 200-1 may continue to use a hierarchical tree representation, but map the hierarchical tree representation into a cloud object store as a way to store the data.

Referring again to FIG. 6, to effect I/O operations with respect to the cloud object store 404, the cloud interface device 502 may send requests to the cloud interface daemon 604. For example, in some implementations, the cloud interface device 502 may send requests through the transactional object layer and the interface layer of the file system 200-1 to the cloud interface daemon 604. The requests sent by the cloud interface device 502 may be based at least in part on POSIX-compliant requests received via the application 202 and/or based at least in part on I/O requests created by the DMU 218 (e.g., responsive to POSIX-compliant requests), which the cloud interface device 502 may convert into the requests for the cloud interface daemon 604.

In some embodiments, the requests sent by the cloud interface device 502 to the cloud interface daemon 604 may be translated into get requests and put requests for the cloud client interface 608. The requests sent by the cloud interface device 502 may be get requests and put requests in some embodiments; in other embodiments, the cloud interface daemon 604 may translate the requests sent by the cloud interface device 502 into get requests and put requests. In any case, responsive to the requests sent by the cloud interface device 502, the cloud interface daemon 604 may communicate, via the object protocol over the one or more networks, with the cloud object store 404 to perform corresponding I/O operations with respect to the data objects 414.

For example, the communications to the cloud object store 404 may include specifying, based at least in part on the mapping 406, storage of the data objects and the corresponding metadata of the logical tree 300A in the cloud object store 404. In some embodiments, the communications may specify different object sizes, for example, for different data types. Thus, the cloud interface appliance 402 may specify a certain object size to store certain data objects that are identified as being of one data type, and may specify a different object size to store other data objects that are identified as being of a different data type.

Figure 7:
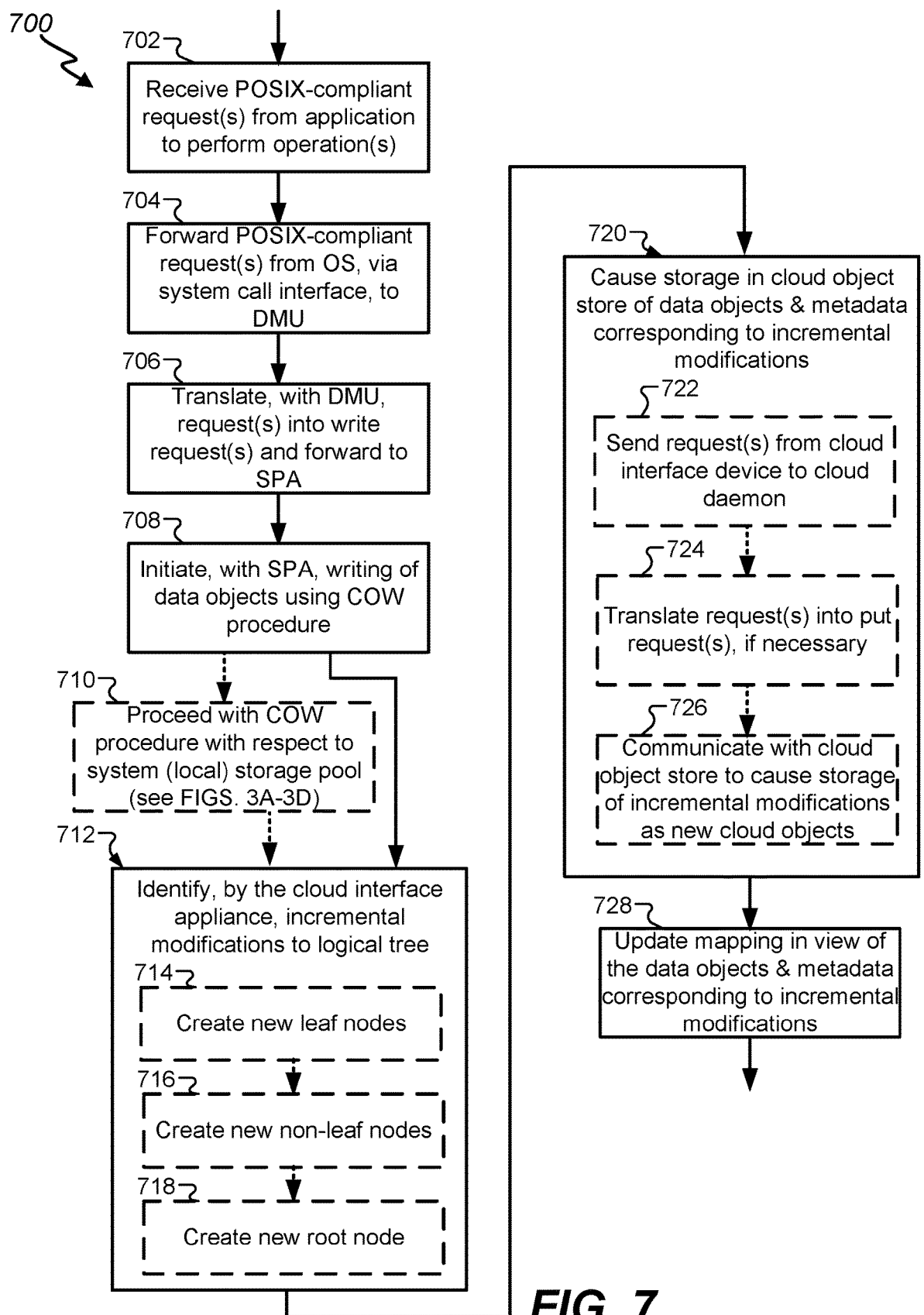
FIG. 7 is a block diagram that illustrates an example method directed to certain features of a COW process for the hybrid cloud storage system, in accordance with certain embodiments of the present disclosure.

FIG. 7 is a block diagram that illustrates an example method 700 directed to certain features of a COW process for the hybrid cloud storage system 400, in accordance with certain embodiments of the present disclosure. According to certain embodiments, the method 700 may begin as indicated by block 702. However, teachings of the present disclosure may be implemented in a variety of configurations. As such, the order of certain steps comprising the method 700 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 702, POSIX-compliant request(s) to perform particular operation(s) (i.e., a transaction(s)) may be received from the application 202. Such an operation may correspond to writing and/or modifying data. As indicated by block 704, the POSIX-compliant request(s) may be forwarded from the operating system, via the system call interface 208, to the DMU 218. In various embodiments, transactions effected through the DMU 218 may include a series of operations that are committed to one or both of the system storage pool 416 and the cloud object store 404 as a group. These transactions may be written on a COW basis.

As indicated by block 706, the DMU 218 may translate requests to perform operations on data objects directly to requests to perform write operations (i.e., I/O requests) directed to a physical location within the system storage pool 416 and/or the cloud object store 404. In some modes, the operations may be performed on locally stored data objects first, then changes to the data objects may be propagated to corresponding cloud-stored data objects, by the DMU 218 directing the specific changes or by the DMU 218 directed the cloud interface appliance 402 to read the changes directly or indirectly with another VDEV 226. In other modes, the operations may be performed on locally stored data objects and corresponding cloud-stored data objects simultaneously or substantially simultaneously. In still other modes, the operations may be performed on cloud-stored data objects only. For example, some implementations may not have local tree 300, and may only have a cloud-based version of a logical tree 300A. Various embodiments may be configured to allow user selection of one or more modes.

As indicated by block 708, the SPA may receive the I/O requests from the DMU 218. And, responsive to the requests, the SPA may initiate writing of data objects into the system storage pool 416 and/or the cloud object store 404 using a COW procedure. As indicated by block 710, in modes where writing of data objects is performed on locally stored data objects before, or concurrently with, writing of data objects to the cloud object store 404, the COW procedure disclosed above (e.g., in view of FIGS. 3A-3D) may proceed with respect to the system storage pool 416.

As indicated by block 712, the cloud interface appliance 402 may receive the I/O requests and identify incremental modifications to the logical tree 300A. The incremental modifications may correspond to new tree portions resulting from COW processes to effect the write requests. The cloud interface appliance 402 may translate the I/O requests into corresponding object interface requests. Having the modified data either from I/O requests or from reading changes to locally stored data objects, the cloud interface device 502 may coordinate the object interface requests using the mapping 406 of cloud storage objects 414 in the cloud object store 404.

For example, in some embodiments, the incremental modifications may be determined based at least in part on changes to the data objects stored locally to reflect changes to the logical tree 300. In some instances, the cloud interface appliance 402 may read the logical tree 300 or at least the changes thereto in order to determine the incremental modifications. Such data may be passed to the cloud interface appliance 402 by another component of the file system such as the DMU 218 or a mirror VDEV. With some embodiments, the incremental modifications may be transferred to the cloud interface appliance 402.

However, in some embodiments, the cloud interface appliance 402 may determine the incremental modifications based at least in part on applying the COW methodology to a copy or snapshot of the logical tree 300 and/or a snapshot of the logical tree 300A. With embodiments where the cloud interface appliance 402 uses a snapshot of the logical tree 300A, the snapshot may be retained in the mapping 406 or otherwise be stored in memory and/or the physical layer. As disclosed herein, a snapshot may correspond to a tree image at a time of snapshot capture. The snapshot may include metadata that can be retained inside the data instance which tree traversal of data. To retain point-in-time images of the tree, snapshots may only store minimal amounts of data. A snapshot may be a condensed representation of data that retains data of blocks referenced that are specified/requested as to be retained in by the snapshot. Thus, given the write requests and the snapshot, the incremental modifications may be determined in view of the COW methodology described herein.

Figure 8:
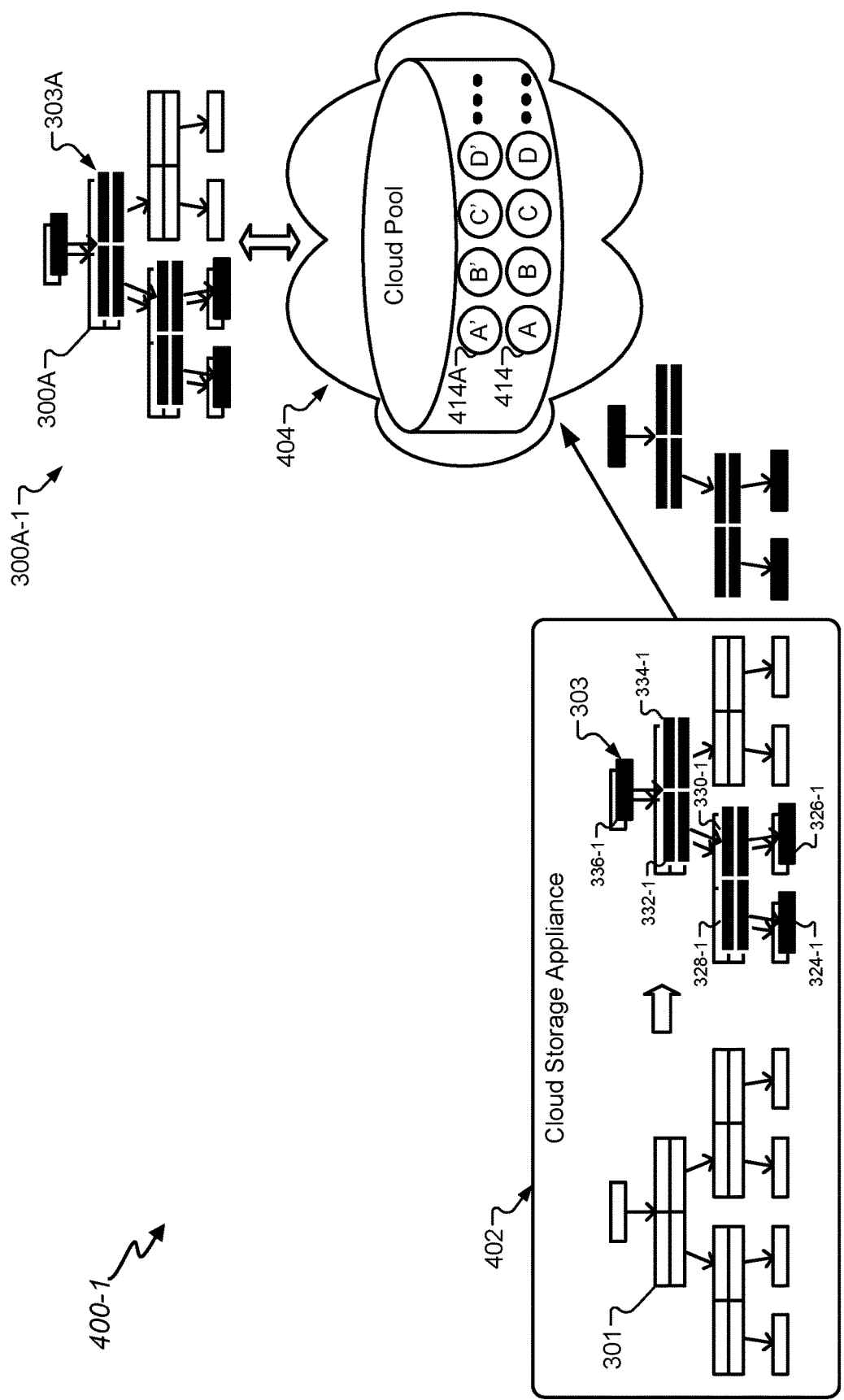
FIG. 8 is a high-level diagram illustrating an example of the cloud interface appliance handling incremental modifications, in accordance with certain embodiments of the present disclosure.

FIG. 8 is a high-level diagram illustrating an example of the cloud interface appliance handling incremental modifications, in accordance with certain embodiments of the present disclosure. As depicted, the cloud interface appliance 402 may use a snapshot 301 of the logical tree 300A stored in the cloud object store 404 to create an incremental modification 303. By way of example, the incremental modification 303 is depicted with new leaf nodes 324, 326; new non-leaf nodes 328, 330, 332, 334; and a new root node 336.

Referring again more particularly to FIG. 7, as indicated by block 714, the determination of the incremental modifications may include creating new leaf nodes (e.g., leaf nodes 324, 326). After an initial stage of a write operation, new data blocks (i.e., leaf nodes) have been allocated in memory and data per the write operation has been written by the cloud interface appliance 402 to the new data blocks, while the previous data and data blocks likewise persist in memory.

As indicated by block 716, new non-leaf nodes may be created (e.g., non-leaf nodes 326, 330). As the write operation continues, the cloud interface appliance 402 may determine non-leaf nodes that reference previous versions of nodes. In order to reference the newly written data, new non-leaf nodes are allocated to reference the new data blocks in the leaf nodes. The same process may be repeated recursively upwards through the hierarchy of the logical tree 300A, reflected by the snapshot 301, until each non-leaf node referencing a changed node is reallocated to point to new nodes. When the pointer blocks are allocated in new nodes in the hierarchy, the address pointer in each node may be updated to point to the new location of the allocated child in memory. As indicated by block 718, in order to finalize the write operation, the root node can be reallocated and updated (e.g., root node 336). When the root node is ready to be updated, a new root node (uberblock) can be allocated and initialized to point to the newly allocated child nodes below the new root node.

As part of the writing operation, the metadata of all portions of the tree involved in transactional write operations is updated with check summing. Each node created includes a checksum that is calculated using the node referenced by the address pointer. This arrangement means that the checksum is stored separately from the node from which it is calculated. By storing the checksum of each node in its parent node pointer and not in the node itself, every node in the tree contains the checksums for all its children. This is illustrated in further detail with respect to the examples of FIGS. 3A-3D. By doing this, each tree is automatically self-validating, and it is always possible to detect inconsistencies with read operations.

As indicated by block 720, data objects and metadata corresponding to the incremental modifications may be stored in the cloud object store 404. In various embodiments, the cloud interface appliance 402 may create, read, forward, define, and/or otherwise specify data objects and metadata corresponding to the incremental modifications. As indicated by block 722, in some embodiments, the storage of the data objects and metadata may be caused at least in part by the cloud interface device 502 sending requests to the cloud interface daemon 604. As indicated by block 724, the requests sent by the cloud interface device 502 to the cloud interface daemon 604 may be translated into put requests for the cloud client interface 608. The requests sent by the cloud interface device 502 may be put requests in some embodiments; in other embodiments, the cloud interface daemon 604 may translate the requests sent by the cloud interface device 502 into put requests.

As indicated by block 726, responsive to the requests sent by the cloud interface device 502, the cloud interface daemon 604 may communicate, via the object protocol over the one or more networks, with the cloud object store 404 to cause storage of the data objects and metadata corresponding to the incremental modifications as new cloud objects. As indicated by block 728, the cloud interface appliance 402 may update the mapping 406 in view of the data objects and metadata corresponding to the incremental modifications stored in the cloud object store 404.

Referring again more particularly to FIG. 8, the storing of the data objects and metadata corresponding to the incremental modification 303 is illustrated. In accordance with a cloud-based COW process, new cloud objects 414A are allocated for the data objects and metadata corresponding to the incremental modification 303, with the cloud-based instantiation of the incremental modification 303 indicated as incremental modification 303A. The new root node can then be made the root of the modified logical tree 300A-1 with the storing operation to finalize the state of the modified logical tree 300A-1. The modified logical tree 300A-1 may correspond to the logical tree 300A modified by the incremental modification 303A. Thus, utilizing snapshots, such as the exemplary snapshot 301, and uberblocks, such as those corresponding to roots 336, 336-1, the cloud object store 404 may be updated only with respect to a subset of nodes that changed since the last snapshot. And that update of the incremental 303 may hook in to the version of tree 300A in the cloud via the root node so that any part of the whole modified logical tree 300A-1 may be accessed.

With the storing of the incremental modification 303A, blocks of the logical tree 300A (saved as cloud data objects 414) containing active data may not be overwritten in place. The new cloud data objects 414A may be allocated, and modified/new data and metadata may be written to the cloud data objects 414A. The previous version of data may be retained, allowing a snapshot version of the logical tree 300A to be maintained. In some embodiments, any unchanged data may be shared among the modified logical tree 300A-1 and its associated snapshots.

Accordingly, certain embodiments may provide a very efficient incremental-always (also known as incremental forever) backup capability, in addition to the ability to restore optimally (without applying multiple incremental updates) from the cloud. Traditional backup methods in the industry involve pushing copies into the cloud. But certain embodiments according to the present disclosure allow for a cloud-based, copy-on-write file system where only new data objects are written to cloud storage. Cloud storage where only new and modified data needs to be sent provides an extremely effective solution for backing up and restoring from cloud providers. Old data objects need not be modified. These embodiments, along with the consistency model using transaction groups, facilitates cloud storage with incremental forever backup where consistency can always be confirmed.

After a full back-up is initially created (e.g., cloud data objects 414 and logical tree 300A), incremental back-ups (e.g., incremental modification 303A) may be made potentially indefinitely. Every incremental may be merged into the full back up after the incremental is sent so that a full, current backup always exists. Each merging results in single data instance of full backup. Another full back-up may be made periodically to avoid having to gather up a high number of incrementals if that is not desired. With some implementations, multiple versions of full backups may be retained, if desired. Thus, certain embodiments provide for complete control of intervals, snapshots, and backups.

One of the chief problems with writing an object into a cloud and subsequently reading the object from the cloud is that integrity of the object read is not guaranteed. There is a risk of degradation of data incumbent with the cloud storage (e.g., storage loss, transmission failure, bitrot, etc.). Furthermore, with the involvement of multiple versions of objects, there is a risk of reading an undesired version of an object. For example, a previous version of the desired object may be read, such as the most recent version in an instance where an update of the object is incomplete.

Traditional object store architectures rely on copies of data wherein a quorum (i.e., 2 copies) is satisfied initially and additional copies (e.g., a third copy) are updated asynchronously. This presents the possibility that a client could receive a copy of data before all copies been updated, and consequently get an inconsistent view of the data. A typical solution for object store consistency is to ensure that all copies are made prior to the data being available, however ensuring consistency with that solution is typically not realistic or attainable. An object-based approach where the checksum of the object is stored in the object's metadata alongside the object or in a reference database elsewhere would allow validation of the object content but would not validate the correct version of the object. Moreover, solutions that might use object versioning and check from a single location would somewhat defeat the purpose and intent of cloud storage.

However, certain embodiments according to the present disclosure may provide consistency model that can ensure guaranteed integrity in the cloud and that can ensure always-consistent semantics from an eventually consistent object model. For example, certain embodiments may provide fault isolation and consistency through the use of logical trees disclosed herein. With all transactional write operations to the cloud object stores, the checksums in the metadata of the self-describing Merkle tree may be updated. As described above, the storing of checksums separately from the node from which the checksums are calculated ensures that each tree is automatically self-validating. At every tree layer, the node below is referenced by a node pointer that includes a checksum. So, when an object is read out of the cloud, it may be determined whether that object is correct.

Figure 9:
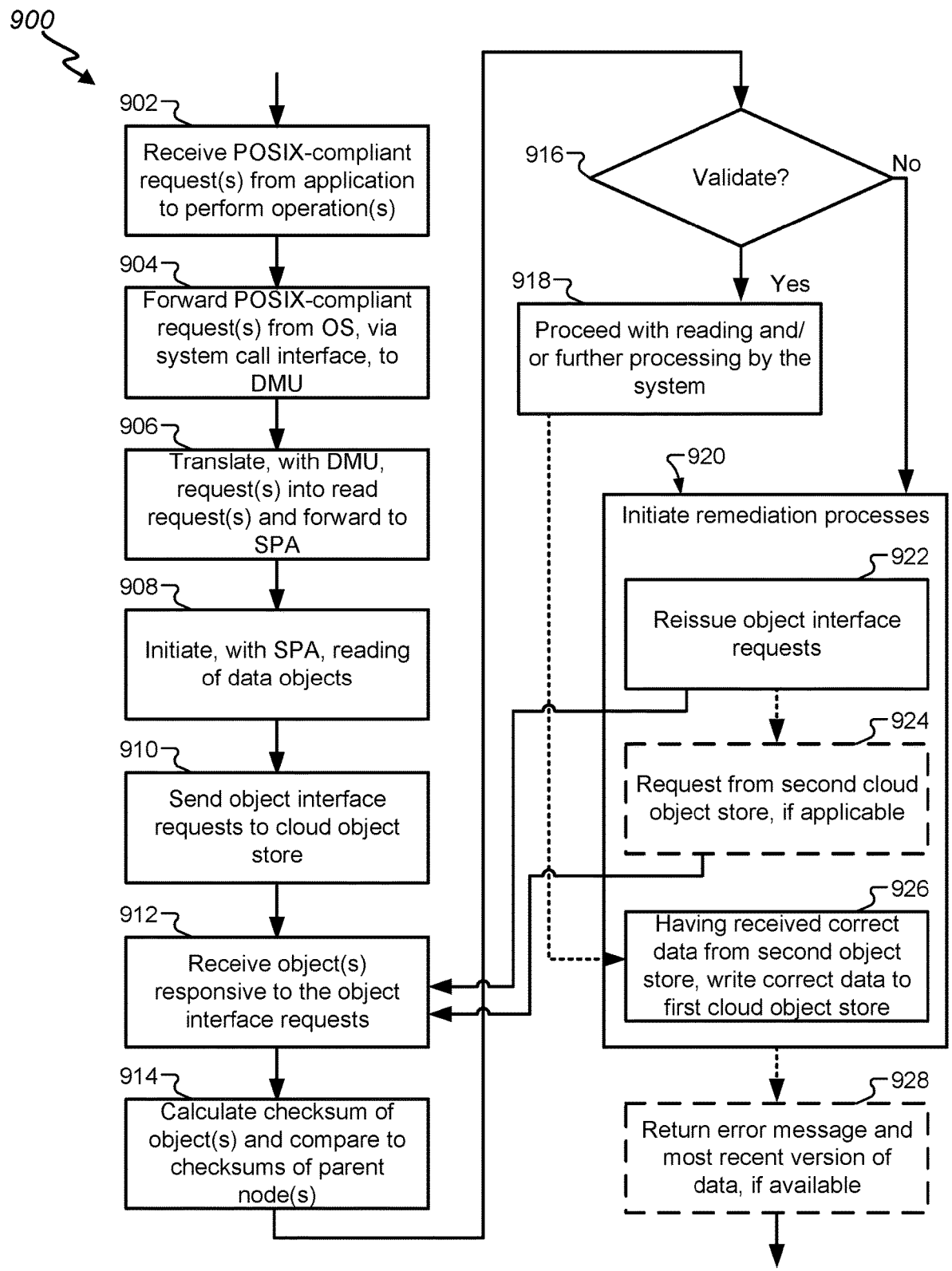
FIG. 9 is a block diagram that illustrates an example method directed to certain features of the hybrid cloud storage system that ensure integrity in the cloud and always-consistent semantics from an eventually consistent object model, in accordance with certain embodiments of the present disclosure.

FIG. 9 is a block diagram that illustrates an example method 900 directed to certain features of the hybrid cloud storage system 400 that ensure guaranteed integrity in the cloud and always-consistent semantics from an eventually consistent object model, in accordance with certain embodiments of the present disclosure. According to certain embodiments, the method 900 may begin as indicated by block 902. However, as clarified above, teachings of the present disclosure may be implemented in a variety of configurations such that the order of certain steps of methods disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 902, a POSIX-compliant request to perform one or more particular operations (i.e., one or more transactions) may be received from the application 202. Such an operation may correspond to reading or otherwise accessing data. As indicated by block 904, the POSIX-compliant request may be forwarded from the operating system, via the system call interface 208, to the DMU 218. As indicated by block 906, the DMU 218 may translate requests to perform operations on data objects directly to requests to perform one or more read operations (i.e., one or more I/O requests) directed to the cloud object store 404. As indicated by block 908, the SPA may receive the I/O request(s) from the DMU 218. Responsive to the request(s), the SPA may initiate reading of one or more data objects from the cloud object store 404.

As indicated by block 910, the cloud interface appliance 402 may receive the I/O request(s) and may send corresponding cloud interface request(s) to the cloud object store 404. In some embodiments, the cloud interface appliance 402 may translate the I/O requests into corresponding object interface requests. The cloud interface device 502 may coordinate the object interface requests using the mapping 406 of cloud storage objects 414 in the cloud object store 404. For example, the cloud interface appliance 402 may identify and request all or a portion of a file stored as cloud data objects in accordance with a logical tree.

As indicated by block 912, the cloud interface appliance 402 may receive data object(s) responsive to the object interface requests. As indicated by block 914, the data object(s) may be checked with a checksum(s) from parent node(s) in the logical tree. In various embodiments, the checking may be performed by the cloud interface appliance 402 and/or the I/O pipeline 224.

Figure 10:
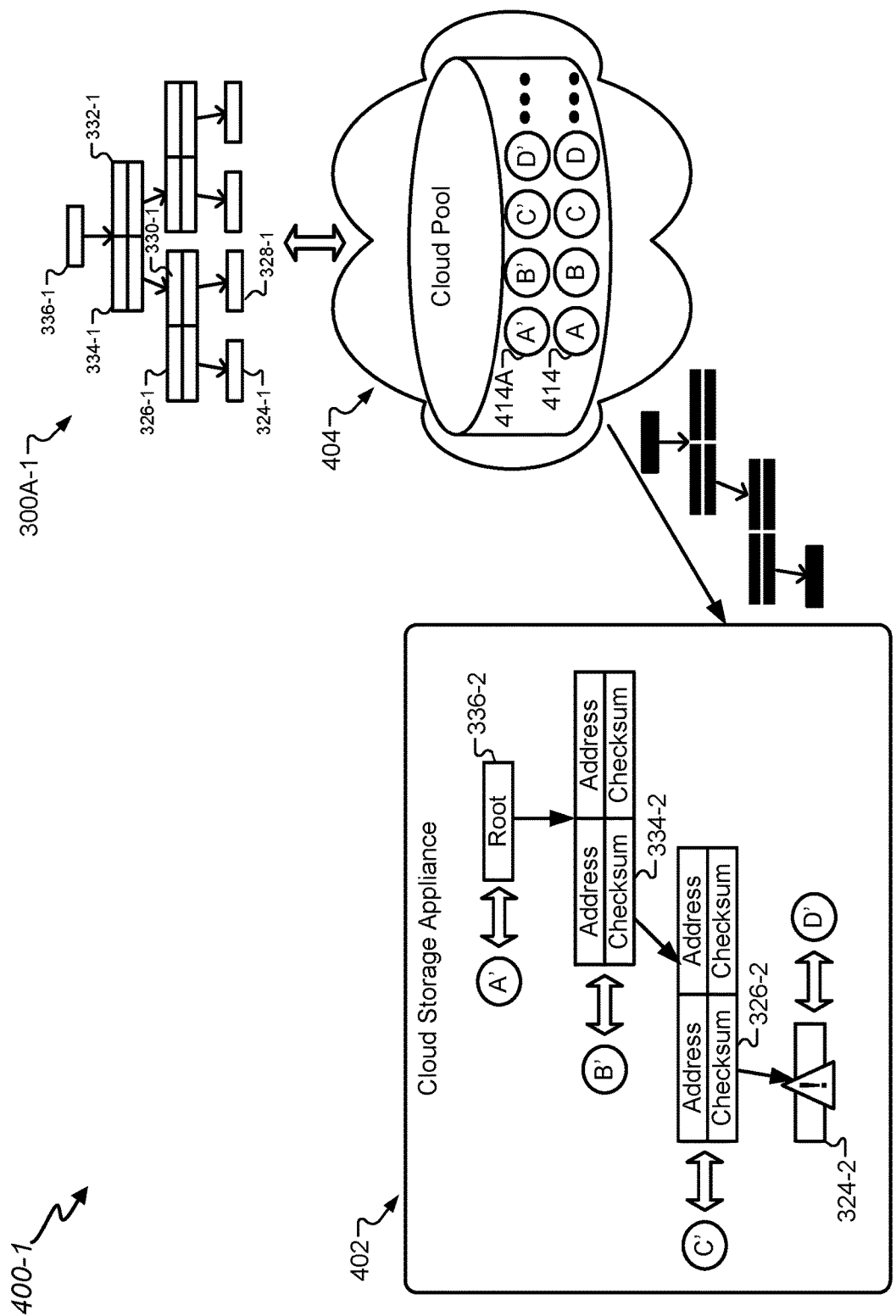
FIG. 10 is a high-level diagram illustrating an example of the cloud interface appliance handling the checking, in accordance with certain embodiments of the present disclosure.

FIG. 10 is a high-level diagram illustrating an example of the cloud interface appliance 402 handling the checking, in accordance with certain embodiments of the present disclosure. Again, in other embodiments, another component of the system 400 may perform the checking. But, in FIG. 10, the cloud interface appliance 402 is depicted as having accessed the cloud object store 404 to read data stored according to the logical tree 300A-1. In the example depicted, the cloud storage appliance 402 is illustrated as having accessed cloud objects 414A corresponding to the logical tree 300A-1. The cloud storage appliance 402 accessed the leaf node 324-2 by way of the addresses of the non-leaf nodes 326-2, 334-2, and the root node 336-2.

As described herein, when reading a node out of the logical tree, the node is read using a pointer of a node in higher level in the logical tree. That pointer includes a checksum for the data that is expected to be read so that, when data is pulled from the cloud, the data may be checked with the checksum. The actual checksum of the data may be calculated and compared to the expected checksum already obtained by the cloud interface appliance 402 and/or the I/O pipeline 224. In the example depicted, the non-leaf node 326-2 includes the checksum for leaf node 324-2.

In some embodiments, a checksum may be received from the cloud data store with one object and the data to be checked with the checksum is received with a different object. The checksum may be received from the cloud data store with the separate object prior to receiving the different object with the data to be checked, according to some embodiments. Some embodiments may employ an iterative object interface request process such that, in response to a particular object interface request, the object with the checksum is received, and, in response to a subsequent object interface request, the object with the data to be checked is received. Further, with some embodiments, the subsequent object interface request may be made using addressing information that was received with the particular object interface request and points to the object with the data to be checked. With some embodiments, instead of an iterative process, a plurality of objects is received from the cloud data store, after which the checking may be performed on the plurality of objects. The integrity of the logical tree can be quickly checked by traversing the logical tree and calculating checksums of child nodes at each level based on parent nodes. In alternative embodiments, the cloud interface appliance 402 and/or the I/O pipeline 224 may obtain the checksum prior to initiating the read operations and/or may obtain the checksum from another source. For example, in such alternative embodiments, the checksum may be retained in the mapping 406, a snapshot of the logical tree, and/or a local data store.

Referring again to FIG. 9, as indicated by block 916, it may be determined whether to validate the data object(s) by the checksum(s) from parent node(s) in the logical tree with the actual checksum(s) of the data object(s). As indicated by block 918, in the case of the data object(s) being validated, the reading and/or further processing operations of the system 400 may proceed, as the data has been determined to be not corrupted and not the incorrect version. As necessary, checking may proceed with additional objects until all objects are check summed and validated by parent object pointer metadata.

In the case of mismatch of actual and expected checksums of the data object(s), an error condition may be identified. This is the case illustrated in FIG. 10, where the actual checksum of the object D' (which corresponds to leaf node 324-2) does not match the checksum specified by the parent node 326-2 (which corresponds to object C'). With an error condition, process flow of FIG. 9 may proceed to block 920. The mismatch of actual and expected checksums may correspond to situations of getting the wrong version of data that is not up to date, degradation of data due to cloud storage failure, bitrot, and/or transmission loss, etc. As indicated by block 920, remediation may be initiated. In some embodiments, the remediation may include reissuing one or more cloud interface requests to the cloud object store 404. Responsive to each reissued request, process flow may return to block 912, where the cloud interface appliance 402 may receive one or more data objects and another iteration of the checking process may proceed.

The reissuance of the one or more cloud interface requests may correspond to requests that the cloud object store 404 try harder to find the correct version of the object requested. With some embodiments, the cloud interface appliance 402 may iteratively go through cloud nodes/devices until the correct version is retrieved. Some embodiments may iteratively check snapshots of previous versions of tree portions that may be stored in the cloud object store 404. Some embodiments may employ a threshold such that the cloud interface appliance 402 may proceed to other remediation measures after the threshold has been satisfied. The threshold may correspond to a number of reissuances of the one or more cloud interface requests. Alternatively or additionally, the threshold may correspond to an limit on the extent of the search of nodes and/or snapshots. For example, the threshold may govern how many nodes and/or how many snapshots are to be searched before the cloud interface appliance 402 turns to a different remediation measure.

Another remediation measure that the cloud interface appliance 402 may employ is the requesting the correct version of the data from another cloud object store in multiple-cloud implementations, as indicated by block 924. Certain embodiments of multiple-cloud storage are described further herein. A record of the second cloud object store may be inspected to determine whether a copy of the data had been stored in the second cloud object store. In some embodiments, the record could correspond to another mapping 406 specific to the second cloud object store. Having determined that a copy of the data had been stored in the second cloud object store, the cloud interface appliance 402 may initiate one or more object interface requests to the second cloud object store in order to retrieve the desired data.

With such embodiments, the request for the object of interest may be made to the second cloud object store after the threshold of reissued requests to the cloud object store 404 has been satisfied without successfully received the correct version. Alternatively, some implementations could resort to the second cloud object store as a first default, rather than reissuing requests to the cloud object store 404. In any case, responsive to the request to the second cloud object store, process flow may return to block 912, where the cloud interface appliance 402 may receive one or more data objects and another iteration of the checking process may proceed. In the case of the correct data being retrieved from the second cloud object store and being validated, the reading and/or further processing operations of the system 400 may proceed, as indicated by block 918. Additionally, having received correct data from the second cloud object store, the system 400 may write the correct data to the cloud object store 404, as indicated by block 926. The writing of the correct data may be effected with a COW procedure to apply an incremental modification, as disclosed with respect to FIG. 7.

In some embodiments, if the correct data is not retrievable through the remediation processes, an error message and a most recent version of the data may be returned, as indicated by block 928. With some instances, the most recent version of the data may not be retrievable. For example, metadata that should point to the data may be corrupted such that the most recent version of the data cannot be referenced and retrieved. In those instances, an error message may be returned without a most recent version of the data. However, when the most recent version of the data is retrievable, it may be returned, as well. Accordingly, with an end-to-end checksum model, certain embodiments may cover end-to-end traversal of the data from the client into the cloud and back again. Certain embodiments may not only provide for check summing of an entire tree and detecting errors, but also the ability to correct portions of the tree through resilvering and data scrubbing.

Figure 11:
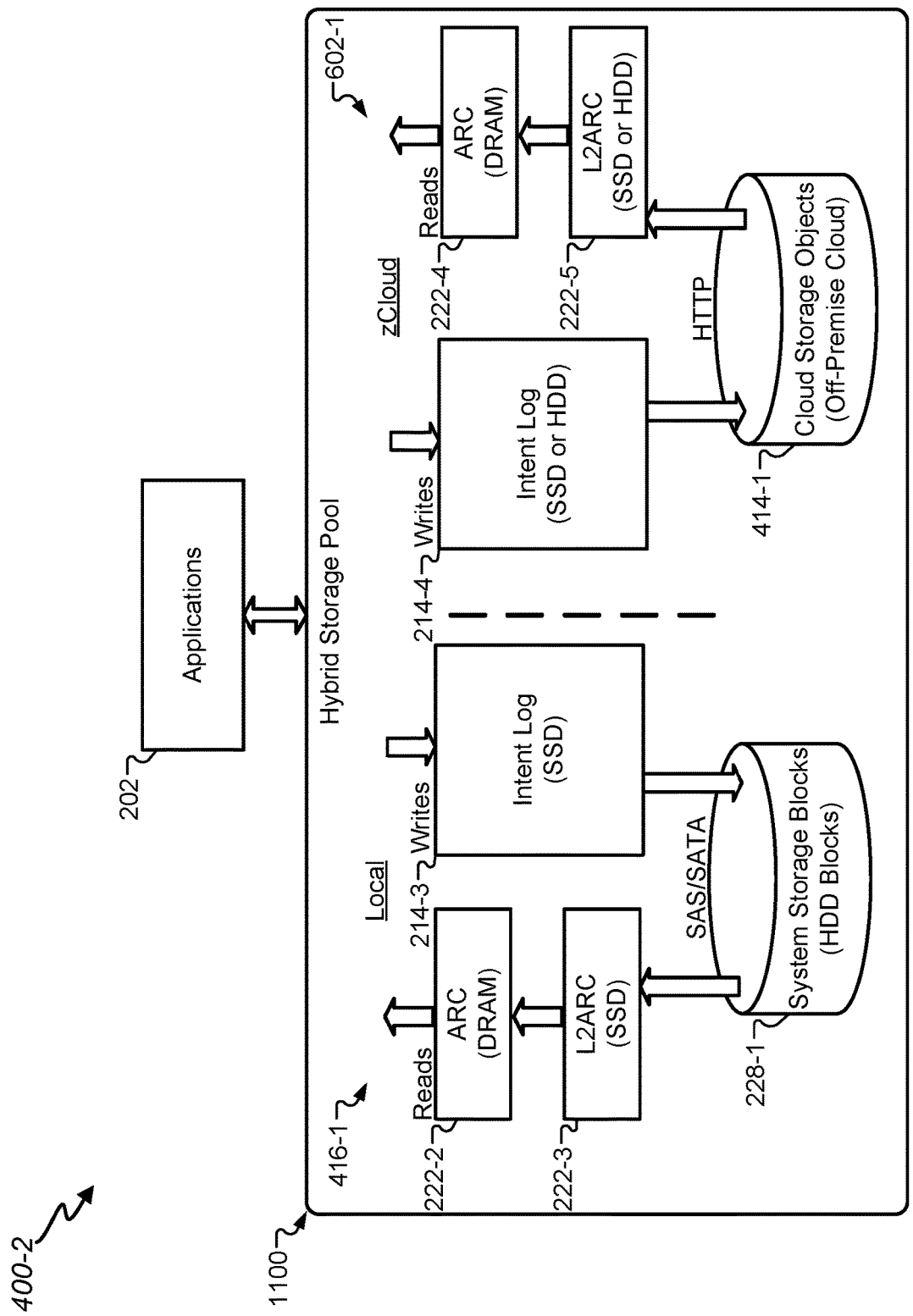
FIG. 11 is a diagram of a simplified example further illustrating features of a hybrid cloud storage system, in accordance with certain embodiments of the present disclosure.

FIG. 11 is a diagram of a simplified example further illustrating features of a hybrid cloud storage system 400-2, in accordance with certain embodiments of the present disclosure. The hybrid cloud storage system 400-2 illustrates how a hybrid storage pool 1100 is at least partially formed of the system storage pool 416 and the virtual storage pool 602-1. Flows for read operations and write operations are illustrated for each of the system storage pool 416 and the virtual storage pool 602-1.

In some embodiments, the ARC 222 may include the ARC 222-2. Read operations of the system storage pool 416 may be facilitated by the ARC 222-2 and system storage blocks 228-1. As indicated, certain embodiments of the ARC 222-2 may be implemented with DRAM. As is also indicated, certain embodiments of the system storage blocks 228-1 may have a SAS/SATA-based implementation. With some embodiments, read operations of the system storage pool 416 may be further facilitated by a L2ARC device 222-3 that may extend the cache size. With some embodiments, the ARC 222 may be referenced as inclusive of the L2ARC device 222-3. As indicated in FIG. 11, certain embodiments of the L2ARC device 222-3 may have a SSD-based implementation. Write operations of the system storage pool 416 may be facilitated by the system storage blocks 228-1 and the intent log 214-3. As indicated, certain embodiments of the intent log 214-3 may have a SSD-based implementation.

To the local system, the virtual storage pool 602-1 may appear and behave as a logical disk. Similar to the system storage pool 416, read operations of the virtual storage pool 602-1 may be facilitated by the ARC 222-4 and the cloud storage objects blocks 414-1. With some embodiments, the ARC 222 may be referenced as inclusive of the ARC 222-4, even though the ARC 222-4 may be implemented with one or more separate devices in some embodiments. As indicated in FIG. 11, certain embodiments of the ARC 222-4 may be implemented with DRAM. In some embodiments, the ARC 222-4 may be the same cache as the ARC 222-2; in other embodiments, the ARC 222-4 may be a separate cache of the virtual storage pool 602-1 that is distinct from the ARC 222-2. As indicated, certain embodiments facilitating the cloud storage objects blocks 414-1 may have an HTTP-based implementation.

With some embodiments, read operations of the virtual storage pool 602-1 may be further facilitated by a L2ARC device 222-5. With some embodiments, the ARC 222 may be referenced as inclusive of the L2ARC device 222-5. In some embodiments, the LSARC device 222-5 may be the same cache as the L2ARC device 222-3; in other embodiments, the LSARC device 222-5 may be a separate cache device of the virtual storage pool 602-1 that is distinct from the L2ARC device 222-3. As indicated, certain embodiments of the L2ARC device 222-5 may have a SSD-based or a HDD-based implementation.

Write operations of the virtual storage pool 602-1 to the cloud storage objects blocks 414-1 may be facilitated by the intent log 214-4. In some embodiments, the intent log 214-4 may be the same as the intent log 214-3; in other embodiments, intent log 214-4 may be a separate and distinct from the intent log 214-3. As indicated, certain embodiments of the intent log 214-4 may have a SSD-based or a HDD-based implementation.

The transition to cloud storage provides several advantages (e.g., cost, scale, and geographic locality), but, when used conventionally, cloud storage comes with some limitations. When application clients are located on premise and not co-resident in the cloud, latency is frequently a significant concern with conventional technologies. However, the hybrid cloud storage system 400 can eliminate that concern. Certain embodiments of the hybrid cloud storage system 400 may provide mirroring features to facilitate performance, migration, and availability.

With the hybrid cloud storage system 400, the differential between latencies of read operations of the system storage pool 416 and read operations of the virtual storage pool 602-1 may be minimized. The ARCs and L2ARC devices of the two pools could be local implementations in some embodiments. And the latencies at the ARCs and L2ARC devices of the two pools may be equivalent or substantially equivalent. For example, typical latencies for read operations of the ARCs may be 0.01 ms or less, and typical latencies for the L2ARCs may be 0.10 ms or less. Latencies of read operations from the cloud storage objects blocks 414-1 may be higher, but the hybrid cloud storage system 400 may intelligently manage both pools to minimize the higher latencies.

Certain embodiments may provide for low-latency, direct cloud access with file system semantics. Certain embodiments may facilitate running from cloud storage while preserving application semantics. Certain embodiments may enable local storage read performance while retaining replicated copies of all data in the cloud. In order to provide those features, certain embodiments may utilize on premise caching devices and leverage the hybrid storage pool caching algorithms. By providing cloud storage with effective caching and file system semantics, cloud storage may be employed for more than backup and restore. The hybrid storage system may use cloud storage "live." Stated otherwise, through the intelligent use of on premise caching devices, the benefit of full performance may be provided to the local system without having to keep full or multiple copies locally.

Figure 12:
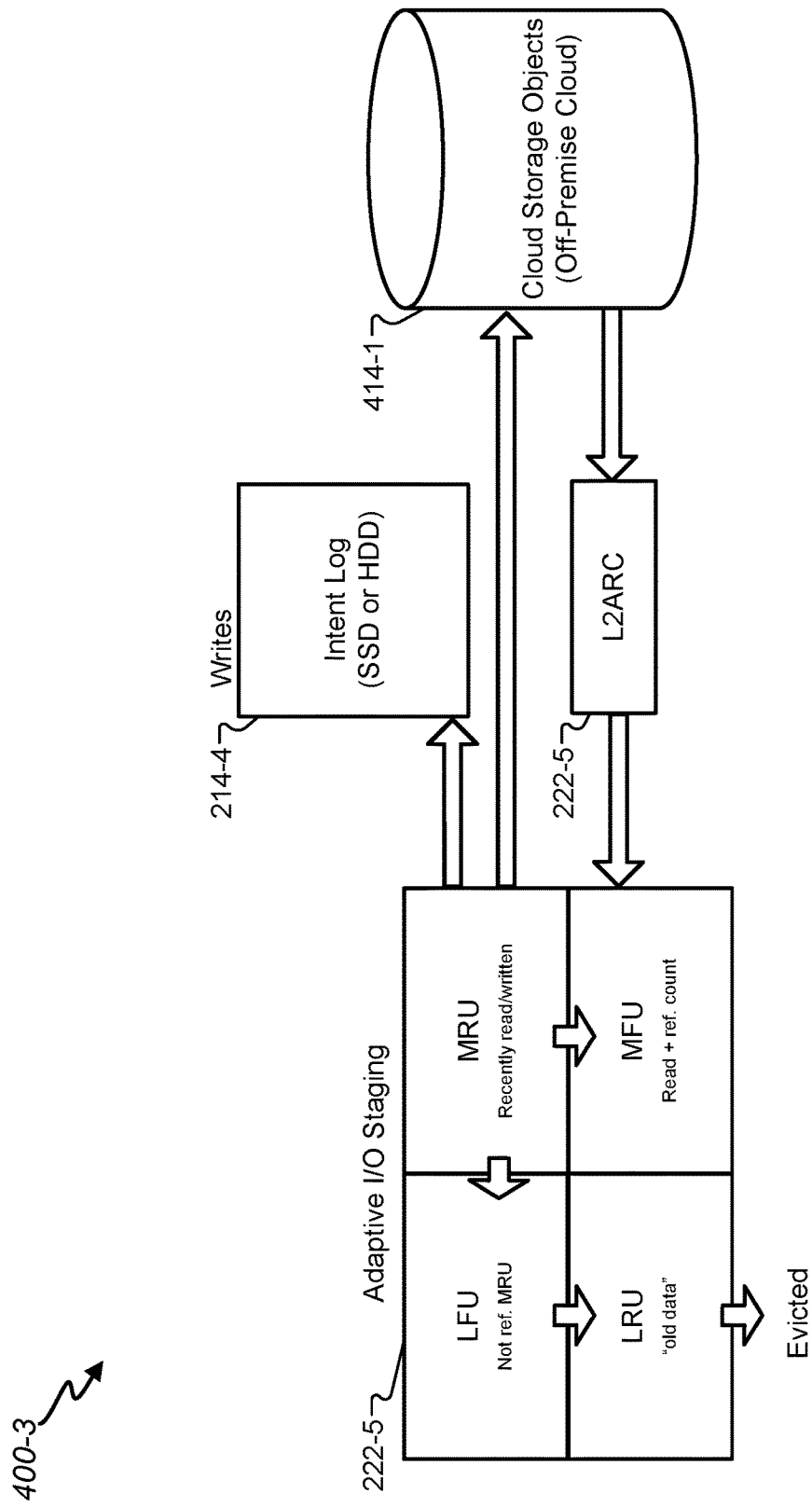
FIG. 12 is a diagram of a simplified example further illustrating features of a hybrid cloud storage system, in accordance with certain embodiments of the present disclosure.

FIG. 12 is a diagram of a simplified example further illustrating features of a hybrid cloud storage system 400-2, in accordance with certain embodiments of the present disclosure. With effective caching devices and algorithms, the hybrid cloud storage system 400-2 may cache at the block level and not at the file level, so accesses to large objects (e.g., a large database) do not require caching of the entire object. In various embodiments, the example depicted may correspond to one or a combination of the virtual storage pool 602-1 and the system storage pool 416.

The hybrid cloud storage system 400-2 may employ adaptive I/O staging to capture most of the objects needed for system operations. The hybrid cloud storage system 400-2 may configure a plurality of cache devices to provide adaptive I/O staging. In the example depicted, adaptive I/O staging is implemented with an ARC 222-5. Yet, in various embodiments, the hybrid cloud storage system 400-2 may be configured to use a plurality of ARCs 222 and/or L2ARCs 222 to provide adaptive I/O staging. While the following description uses an ARC 222 as an example, it should be understood that various embodiments may use a plurality of ARCs 222, as well as one or more L2ARCs 222, to provide the disclosed features.

In some embodiments, the ARC 222-5 may be self-tuning such that the ARC 222-5 may adjust based on the I/O workload. By way of example, in embodiments where the hybrid cloud storage system 400-2 uses cloud storage in a live mode, not merely for back-up and migration, the ARC 222-5 may provide caching algorithms that stage objects according to a precedence order. That precedence order for caching may correspond to most recently used (MRU) objects, most frequently used (MFU) objects, least frequently used (LFU) objects, and least recently used (LRU) objects. With each I/O operation, the ARC 222-5 may determine whether self-adjustment of staged data objects is necessary. Note that, in certain embodiments, the L2ARC 225-5 may work in conjunction with ARC 222-5 to facilitate one or more of the stages. By way of example, the L2ARC 225-5, which may have a higher latency than the ARC 222-5, may be used for one or more of the lower ranked stages, such as the LRU and/or LFU stages. In some embodiments, another component of the hybrid cloud storage system 400-2 may cause the caching in accordance with these embodiments. By way of example, the cloud storage appliance 402 may coordinate the caching and servicing of read and write requests. Further, the cloud storage appliance 402 may include the ARC(s) 222-5, L2ARC(s) 222-5, and/or intent log 214-4 according to some embodiments.

With each I/O operation, the ARC 222-5 may adjust the staging of one or more objects previously staged to some extent. At a minimum, the adjustment may include updating tracking of accesses of at least one object. The adjustment may include demotion to a lower stage, eviction, or promotion to a higher stage. The transition criteria for promotion and demotion may be different for each transition from a current stage to another stage or to eviction. As disclosed herein, the ARC 222-5 may have the ability to evict memory buffers from the cache as a result of memory pressure to maintain a high throughput and/or to meet usage thresholds.

With a given I/O operation, if the one or more objects corresponding to the I/O operation had not already been staged as MRU objects, then the one or more objects may be newly staged as MRU objects. Yet, if the one or more objects corresponding to the I/O operation are already be staged as MRU objects, the ARC 222-5 may apply transition criteria to the one or more objects to determine whether to transition the one or more objects to a different stage. If the transition criteria is not met, no change in staging is necessary with the servicing of the I/O operation.

Figure 13:
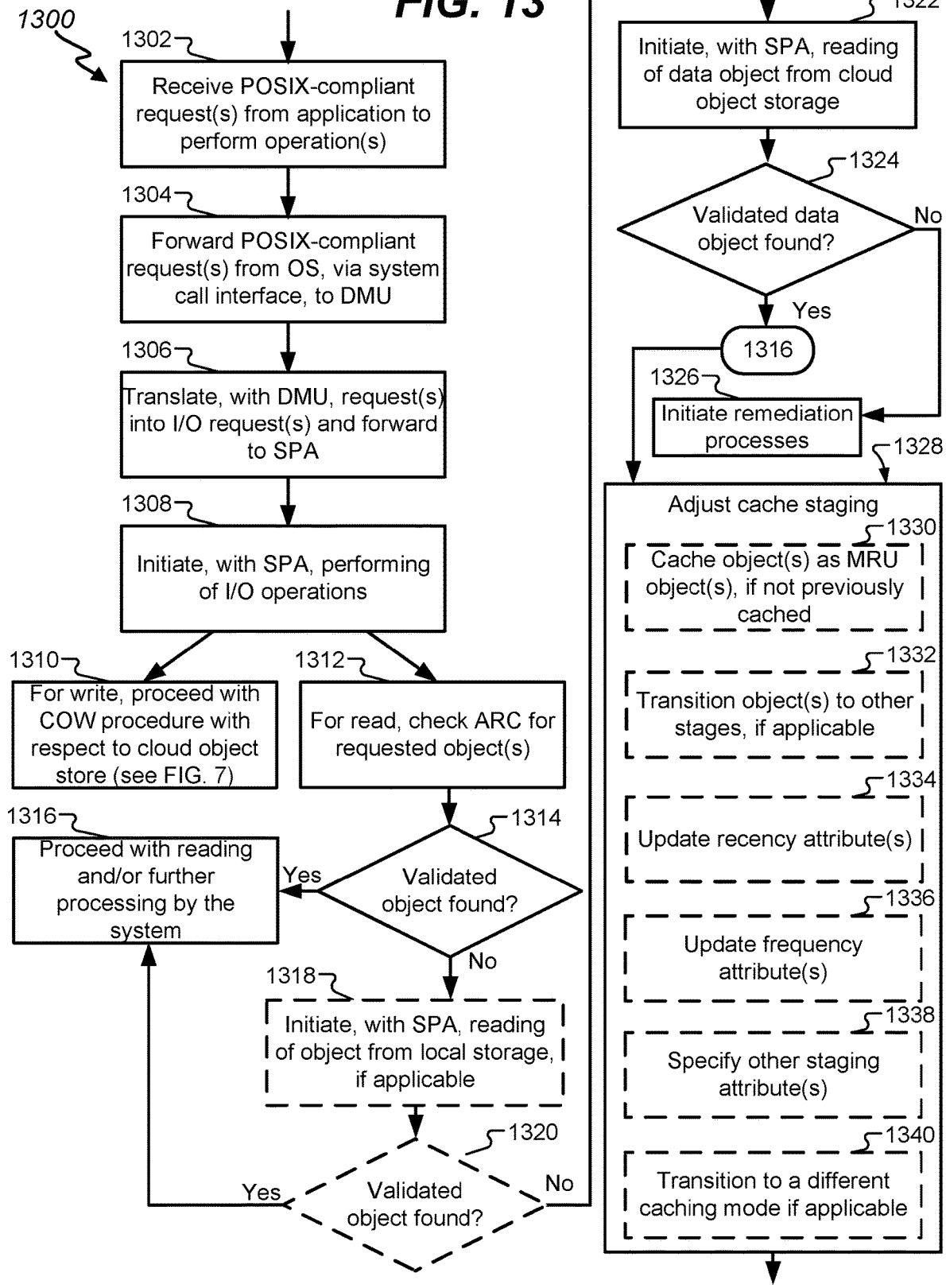
FIG. 13 is a block diagram that illustrates an example method directed to certain features of the hybrid cloud storage system for cache management and cloud latency masking, in accordance with certain embodiments of the present disclosure.

FIG. 13 is a block diagram that illustrates an example method 1300 directed to certain features of the hybrid cloud storage system 400-3 for cache management and cloud latency masking, in accordance with certain embodiments of the present disclosure. According to certain embodiments, the method 1300 may begin as indicated by block 1302. However, as clarified above, certain steps of methods disclosed herein may be shuffled, combined, and/or performed simultaneously or substantially simultaneously in any suitable manner and may depend on the implementation chosen.

As indicated by block 1302, POSIX-compliant request(s) to perform particular operation(s) (i.e., a transaction(s)) may be received from the application 202. Such an operation may correspond to reading, writing, and/or modifying data. As indicated by block 1304, the POSIX-compliant request(s) may be forwarded from the operating system, via the system call interface 208, to the DMU 218. As indicated by block 1306, the DMU 218 may translate requests to perform operations on objects directly to requests to perform I/O operations directed to a physical location within the cloud object store 404. The DMU 218 may forward the I/O requests to the SPA.

As indicated by block 1308, the SPA may receive the I/O requests from the DMU 218. And, responsive to the requests, the SPA may initiate performing I/O operations. As indicated by block 1310, in the case of write operations, the SPA may initiate writing of objects to the cloud object store 404 using a COW procedure. For example, the cloud interface appliance 402 may proceed with the COW procedure disclosed above (e.g., in view of FIG. 7) with respect to the cloud object store 404. As indicated by block 1312, in the case of read operations, the SPA may initiate reading of objects. The ARC 222-5 may be checked for the one or more requested objects. In some embodiments, as indicated by block 1314, it may be determined whether one or more validated data objects corresponding to the I/O request(s) exist in the ARC 222-5. This may include the SPA first determining if one or more objects corresponding to the read request(s) is retrievable from the ARC 222-5. Then, if such one or more objects are retrievable, the object(s) may be checked with one or more checksums from one or more parent nodes in the logical tree. In various embodiments, the checking may be performed by the ARC 222-5, the cloud storage appliance 402, and/or the I/O pipeline 224. As indicated by block 1316, in the case of the data object(s) being validated (or, in some embodiments not employing validation, in the simple case of a hit), the reading and/or further processing operations of the system 400 may proceed.

In some embodiments, as indicated by block 1318, in the case of the data object(s) not being validated (or, in some embodiments not employing validation, in the simple case of no hit), the SPA may initiate reading of one or more objects from the local storage 228. With some embodiments, a pointer to the one or more objects may be cached and used to read the one or more objects from the local storage 228. Some implementations may not check local storage 228 for the one or more objects if such a pointer is not cached. If the one or more objects are retrievable, the one or more objects may be checked with one or more checksums from one or more parent nodes in the logical tree. Again, in various embodiments, the checking may be performed by the ARC 222-5, the cloud storage appliance 402, and/or the I/O pipeline 224. In the case of the object(s) being validated, the process flow may transition to block 1316, and the reading and/or further processing operations of the system 400 may proceed.

As indicated by block 1320, in the case of the data object(s) not being validated (or, in some embodiments not employing validation, in the simple case of no hit), the SPA may initiate reading of the one or more data objects from the cloud object store 404. In various embodiments, the imitating of the reading may be performed by one or a combination of the DMU 218, the ARC 222-5, the I/O pipeline 224, and/or the cloud interface appliance 402. The reading of the one or more objects from the cloud object store 404 may include steps previously disclosed herein, for example, with regard to FIG. 9. Such steps may include one or a combination of issuing I/O request(s) to the cloud interface appliance 402, sending corresponding cloud interface request(s) to the cloud object store 404 using the mapping 406 of cloud storage objects 414, receiving data object(s) responsive to the object interface requests, and the like, which are detailed above. As indicated by block 1324, it may be determined whether a validated object has been retrieved from the cloud object store 404. Again, this may involve steps previously disclosed herein, for example, with regard to FIG. 9, where it is determined whether to validate the data object(s) by the checksum(s) from parent node(s) in the logical tree.

In the case of mismatch of actual and expected checksums of the data object(s), the process flow may transition to block 1326, where remediation processes may be initiated. This may involve steps previously disclosed herein, for example, with regard to FIG. 9, where remediation processes are disclosed. However, in the case of the data being validated, the process flow may transition to block 1316, and the reading and/or further processing operations of the system 400 may proceed.

As indicated by block 1328, having retrieved the one or more objects, the cache staging may be adjusted. In certain instances, the adjustment of cache staging may include newly caching one or more objects as MRU objects, as indicated by block 1330. If the one or more objects corresponding to a given I/O operation had not already been staged as MRU objects, then the one or more objects may be newly staged as MRU objects.

Yet, in certain instances, when the one or more objects corresponding to the I/O operation are already be staged as MRU, MFU, LFU, or LRU objects, the ARC 222-5 may apply transition criteria to the one or more objects to determine whether to transition the one or more objects to a different stage, as indicated by block 1332. However, if the transition criteria is not met, a change in staging may not be necessary with the servicing of the I/O operation.

In some embodiments, the staging of objects may be at least partially a function of recency of access of the objects. As indicated by block 1334, in some embodiments, the adjustment of cache staging may include updating one or more recency attributes. The ARC 222-5 may define a recency attribute for the one or more new objects in order to track recency of access of the one or more objects. The recency attribute may correspond to a time parameter that indicates a last access time corresponding to one or more objects (e.g., by absolute time, system time, time differential, etc.) and/or a sequential parameter that indicates an access count corresponding to the one or more objects against which recency attributes of other objects may be compared.

In various embodiments, the transition criteria may include one or more recency thresholds defined in order for objects to qualify for transition from current stages. For example, the ARC 222-5 may determine if the one or more objects should be transitioned to LFU or LRU stages (or eviction) based at least in part on the value of the recency attribute assigned to the one or more objects. In some embodiments, the recency threshold may be a dynamic threshold, adjusted as a function of recency attributes defined for other objects in one or more stages. For example, the recency threshold may be a function of a lowest value of any recency attribute defined for any objects already staged as MFU objects, when the values of recency attributes defined for the staged objects are sorted in an ascending or descending order.

Additionally or alternatively, in some embodiments, the staging of objects may be at least partially a function of frequency of access of the objects. As indicated by block 1336, in some embodiments, the adjustment of cache staging may include updating one or more frequency attributes. With the particular I/O operation, the ARC 222-5 may increment a frequency attribute defined for the one or more objects in order to track the frequency of access of the one or more objects. The frequency attribute may indicate numbers of accesses over any suitable time period, which could be an absolute time period, an activity-based time period (e.g., a user session, or time since a last amount of access activity that meets a minimum activity threshold), and/or the like.

In various embodiments, the transition criteria may include one or more frequency thresholds defined in order for objects to qualify for transition from current stages. For example, consequent to a change in the value of the frequency attribute, the ARC 222-5 may determine if the one or more objects should be staged as MFU objects (or as objects in another stage). Such a determination may be made based at least in part on comparing the updated frequency attribute to a frequency threshold. In some embodiments, the frequency threshold may be a dynamic threshold, adjusted as a function of frequency attributes defined for other staged objects (e.g., staged as MFU objects or objects in another stage). For example, the frequency threshold may be a function of a lowest value of any frequency attribute defined for any objects already staged as MFU objects, when the values of frequency attributes defined for the staged objects are sorted in an ascending or descending order.

As indicated by block 1338, additionally or alternatively, the adjustment of cache staging may include specifying one or more other staging attributes, according to some embodiments. A staging attribute could indicate an operation type. With some embodiments, the staging of objects may be at least partially a function of operation type. For example, the staging algorithm could employ discrimination of write operations versus read operations so that only objects accessed with a read operation may be staged as MFU objects. In such embodiments, objects referenced with write operations may be initially maintained as MRU objects and be thereafter subject to demotion according to LFU staging criteria. Alternatively, in such embodiments, objects referenced with write operations may be initially maintained as MRU objects and be thereafter subject to demotion according to LRU staging criteria and then be subject to eviction, effectively skipping LFU staging. As another alternative, objects referenced with write operations may be initially maintained as MRU objects and be thereafter subject to eviction, effectively skipping LFU staging and LRU staging. With such alternatives, the ARC 222-5 discriminates write operations to commit cloud objects to the cloud object store 404 as being less likely needed for subsequent read operations, hence allowing such potential operations to incur cloud access latencies should the operations arise.

A staging attribute could indicate a data type. Additionally or alternatively, in some embodiments, the staging of objects may be at least partially a function of data type. For example, some embodiments may accord a higher priority to metadata vis-à-vis data. That higher priority may include retaining all metadata objects, and subjecting data objects to staging. Alternatively, that higher priority may include applying different criteria for staging transition (promotion and/or demotion from current stages) to metadata objects versus data objects. For example, thresholds (e.g., recency, frequency, and/or the like thresholds) defined for data objects to qualify for demotion may be lower (and, hence, more easily satisfied) than thresholds defined for metadata objects to qualify for demotion. Alternatively, other embodiments may accord a higher priority to data vis-à-vis metadata. With some embodiments, a portion of the cloud objects may be defined as always to cached regardless of frequency of use.

A staging attribute could indicate an operation characteristic. Additionally or alternatively, in some embodiments, the staging of objects may be at least partially a function of read operation characteristics. For example, some embodiments may accord a higher priority to read operations having a size characteristic such that the size of objects read satisfies a size threshold. Additionally or alternatively, a higher priority may be accorded to read operations having a sequential characteristic such that the sequence of objects read satisfies a sequence threshold. Accordingly, a large, sequential streaming read operation may be given a higher priority for caching than smaller, more isolated read operations. In that way, higher cloud-access latencies for the large, sequential streaming read operations are avoided.

Certain embodiments of the ARC 222-5 may employ different functions, transition criteria, and/or thresholds for each stage. In some embodiments, the ARC 222-5 may employ a staging scoring system. Some embodiments may score objects with a numerical expression, for example, a staging score. The staging scores may reflect qualifications of the objects with respect to any suitable criteria, such as the transition criteria. For example, a given staging score for an object may be cumulative of scoring according to criteria such as frequency of access, recency of access, operation type, data type, operation characteristics, object size, and/or the like. The given object could be scored with respect to each criterion. For example, relatively greater values of attributes such as frequency attributes, recency attributes, and/or like may be accorded greater scores. Likewise, scores may be assigned in view of the other criteria and priorities. The cumulative staging score for the object may be used, along with the staging scores of other objects stored in the cache, to rank the objects according to a precedence order. Again, the precedence order may be used to transition the objects to different stages and/or toward eviction.

The ARC 222-5 may adapt the stages and the objects stored therein to satisfy one or more cache usage and capacity constraints. For example, given a cache device capacity of, say, 1 TB of DRAM, the ARC 222-5 may adapt the stages and the objects stored therein to maintain a maximum cache usage of 80%. In addition, some embodiments may adapt the stages and the objects stored therein to satisfy one or more speed constraints. For example, the ARC 222-5 may monitor throughput to maintain an acceptable amount of access latencies (e.g., average access latencies) given both local accesses and cloud accesses in order to determine whether more or less caching should be employed to satisfy one or more latency tolerances. In view of such adaption constraints, adaption of the stages and the objects stored therein may include apply the different functions and thresholds for each stage in order to sort the objects in a precedence order. The precedence order may be utilized by the ARC 222-5 to shift stored objects toward eviction in order to meet the adaption constraints.

As indicated by block 1340, in some embodiments, the cache staging adjustment may include transitioning to a different caching mode. Some embodiments may dynamically change modes of operation in order to load balance while meeting usage and latency constraints. An initial or default mode of operation may correspond to operating from the cloud in a live manner such that objects are accessed from cache first, then, if necessary, from the cloud. Some embodiments of the ARC 222-5 may initially (e.g., within a session or time period) cache all objects that are accessed with I/O operations, and then transition to employing staging as cache usage meets one or more thresholds. The transition to staging may be incremental with one or more secondary modes of operation. For example, staging may be initially relegated to MRU and MFU staging, and then expanded to one or more of the other stages as one or more cache usage thresholds (which may be preliminary to, and lower than, the maximum cache usage threshold) are met.

In view of cache usage approaching usage constraints and meeting one or more usage thresholds, certain transition criteria may be applied incrementally with one or more additional modes of operation. For example, objects corresponding to write operations may not be initially discriminated against. Yet, as the cache usage approaches a usage constraint, that discrimination criteria may be applied after one or more usage thresholds are met.

As another example, as the cache usage further approaching a usage constraint and meeting one or more usage thresholds, the hybrid cloud storage system 400-2 may begin to make use of extended cache with one or more L2ARC devices (which may correspond to one or more low-latency Sides) for lower ranked stages (e.g., LRU and/or LFU stages). As still another example, as the cache usage further approaching a usage constraint and meeting one or more usage thresholds, the hybrid cloud storage system 400-2 may begin to make use of local storage 228 in order to conform to latency tolerances with one or more tertiary modes of operation. By way of a more specific example, rather than evicting a large, sequential streaming read operation without provisioning for future low-latency access, the extend of the operation and the frequency of access of the corresponding objects may be sufficient to meet size and frequency thresholds such that the objects are to be transitioned to local storage 228. In this way, the hybrid cloud storage system 400-2 may keep the objects available for local-latency read operations, while freeing up cache capacity for other low-latency access (which could entail other large, sequential read operations) and avoiding paying cloud latencies should the large, sequential read operation be called for again. Such selective utilization of both local storage 228 and cloud storage at the object level may further facilitate masking of cloud latencies while using cache a majority of the time and load balancing between cloud storage and local storage 228 to operate within latency tolerances. In various embodiments, this trifurcated storage adaptation can be initiated as a fallback operational mode or an initial default for certain types of operations have certain characteristics.

Accordingly, certain embodiments may alter caching modes and techniques based at least in part on the characteristics of object access. Certain embodiments may leverage caching features, cloud storage, and local storage 228 to mask latencies for cloud-based operations. In such embodiments, a majority of operations may be serviced from cache with cache hit rates typically exceeding 90% or more, which results in local latencies most of the time. If any local object is missing or corrupt, the cloud copy of the object may be accessed. With some embodiments, reading from the cloud object store 404 may only be necessary when there is no cache hit and the read request cannot be serviced from local storage 228.

In some embodiments, in lieu of the ARC checking, the local storage checking, and/or the cloud object store checking disclosed above, the mapping 406 may be used to identify the location of the one or more objects of interest. As described above, the mapping 406 may include an object directory and may maintain object states that are updated with every I/O operation. Cloud object states may be kept in an index, a table, an index-organized table, and/or the like which may be indexed on a per-object basis. The object states may include object cache states. The object cache states may indicate locations of objects in any one or combination of ARC, L2ARC, adaptive stage, local storage, and/or cloud storage. By utilizing the mapping 406, the cloud interface device 402 may directly identify the location of the one or more objects of interest. In some embodiments, the cloud interface device 402 may only utilize the mapping 406 in the event that there is no hit persuant to the ARC checking.

In some embodiments, in addition or in alternative to the caching, the intelligent pool management include keeping a mirror that continuously syncs with the cloud object storage 404. At least partially by supporting cloud object data stores as virtual devices, certain embodiments may provide mirroring between local and cloud storage. Mirroring cloud storage with local storage may enable local storage read performance while retaining replicated copies of all data in the cloud. Through the use of the mirror, the benefit of full performance may be provided to the local system without having to keep multiple copies locally. If any local data is missing or corrupt, the cloud copy of the data may be accessed. The synchronous mirroring cloud and local devices may facilitate higher levels of performance.

Figure 14:
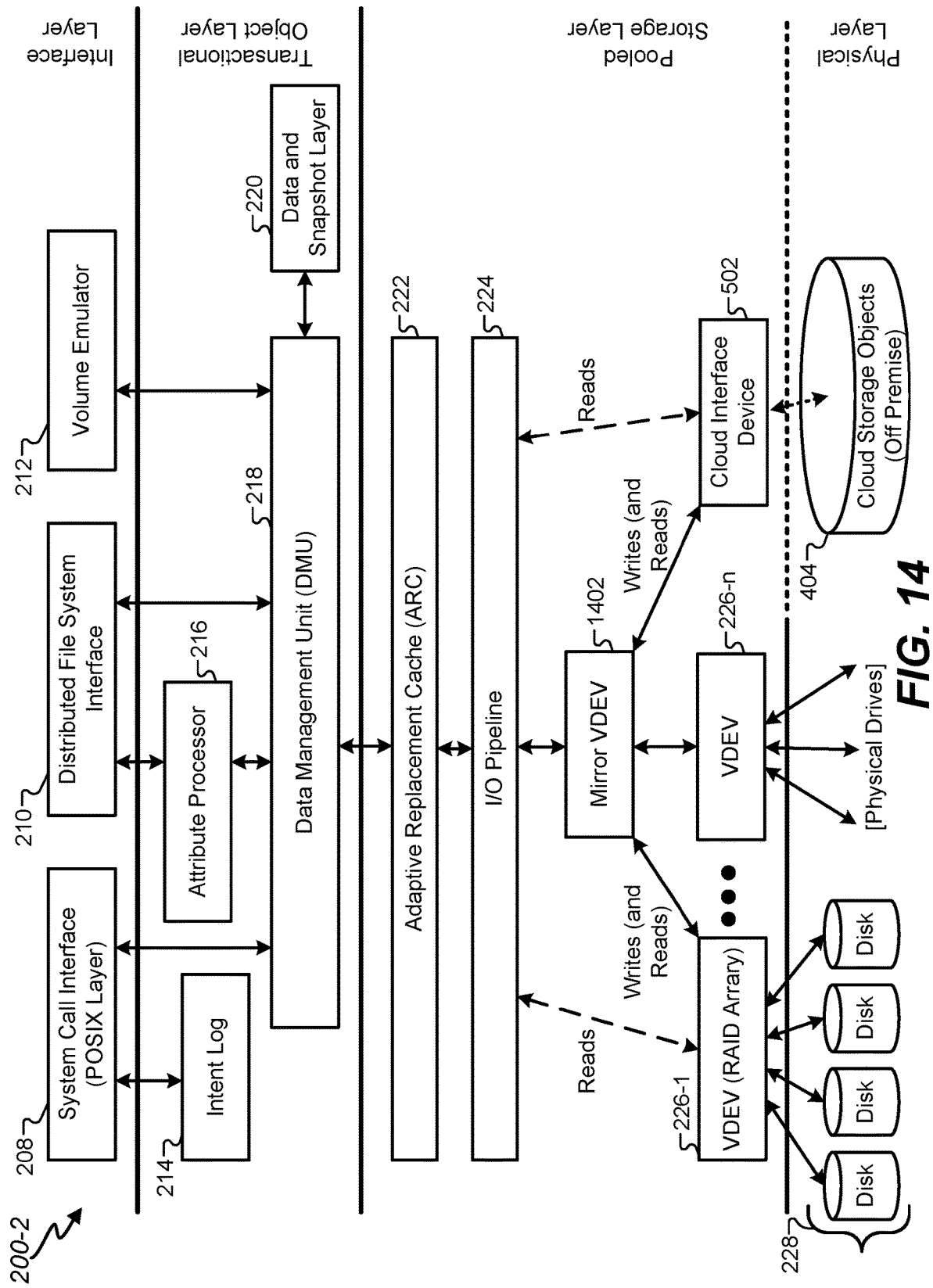
FIG. 14 illustrates an instance of an example network file system of the hybrid cloud storage system to facilitate synchronous mirroring, in accordance with certain embodiments of the present disclosure.

To facilitate such synchronous mirroring, certain embodiments may include a mirror VDEV. FIG. 14 illustrates an instance of an example network file system 200-2 of the hybrid cloud storage system 400 to facilitate synchronous mirroring, in accordance with certain embodiments of the present disclosure. The file system 200-2 may correspond to the file system 200-1, but with mirror management integrated directly into a ZFS control stack. Beyond that which is disclosed with respect to the file system 200-1, the file system 200-2 may include a mirror VDEV 1402 that facilitates cloud copies of data but local access times/speeds to read the data.

In some embodiments, the mirror VDEV 1402 may correspond to one or more VDEVs of another VDEV type of a device driver interface inside a ZFS file system architecture. The ZFS may communicate directly with the mirror VDEV 1402, which may be at a virtual device layer directly above a driver layer of the file system 200-2 and which, in some embodiments, correspond to an abstraction of the device driver interface inside the ZFS architecture. The file system 200-2 may create the mirror VDEV 1402 to be a funnel for I/O operations. In some embodiments, the mirror VDEV 1402 may be a point with which other components of the file system 200-2 may communicate primarily. For example, in some embodiments, communications from the transactional object layer may go through the mirror VDEV 1402 to the physical layer. More specifically, communications from the DMU 218 may be directed to the I/O pipeline 224 and to the mirror VDEV 1402. Responsive to such communications, the mirror VDEV 1402 may direct communications to other VDEVs, such as the VDEV 226 and the cloud interface device 502. As such, the mirror VDEV 1402 may coordinate I/O operations with respect to local storage 228 and cloud object storage 404.

In some embodiments, the mirror VDEV 1402 may only coordinate write operations with respect to local storage 228 and cloud object storage 404 such that read operations need not go through the mirror VDEV 1402. With such embodiments, the other VDEVs, such as the VDEV 226 and the cloud interface device 502, may bypass the mirror VDEV 1402 for read operations. In alternative embodiments, the mirror VDEV 1402 may coordinate all I/O operations.

Advantageously, the mirror VDEV 1402 may coordinate write operations so that each write operation is synchronously performed with respect to local storage 228 via one or more VDEVs 226 and with respect to the cloud object store 404 via the cloud interface device 502. This synchronous mirroring of each I/O operation is performed at the object level, not the file level. The data replications with each I/O operation enables the hybrid cloud storage system 400 to achieve local storage read performance that masks latencies for cloud access. As a default, the hybrid cloud storage system 400 may read from local storage 228 in order to avoid paying cloud latencies for the vast majority of read operations. Only when the hybrid cloud storage system 400 determines that local data is missing or corrupt does the hybrid cloud storage system 400 need to access the cloud object store 404 to read a cloud copy of the desired data. Such exceptions may be performed on an object basis so that the latency for cloud access is minimized.

Figure 15:
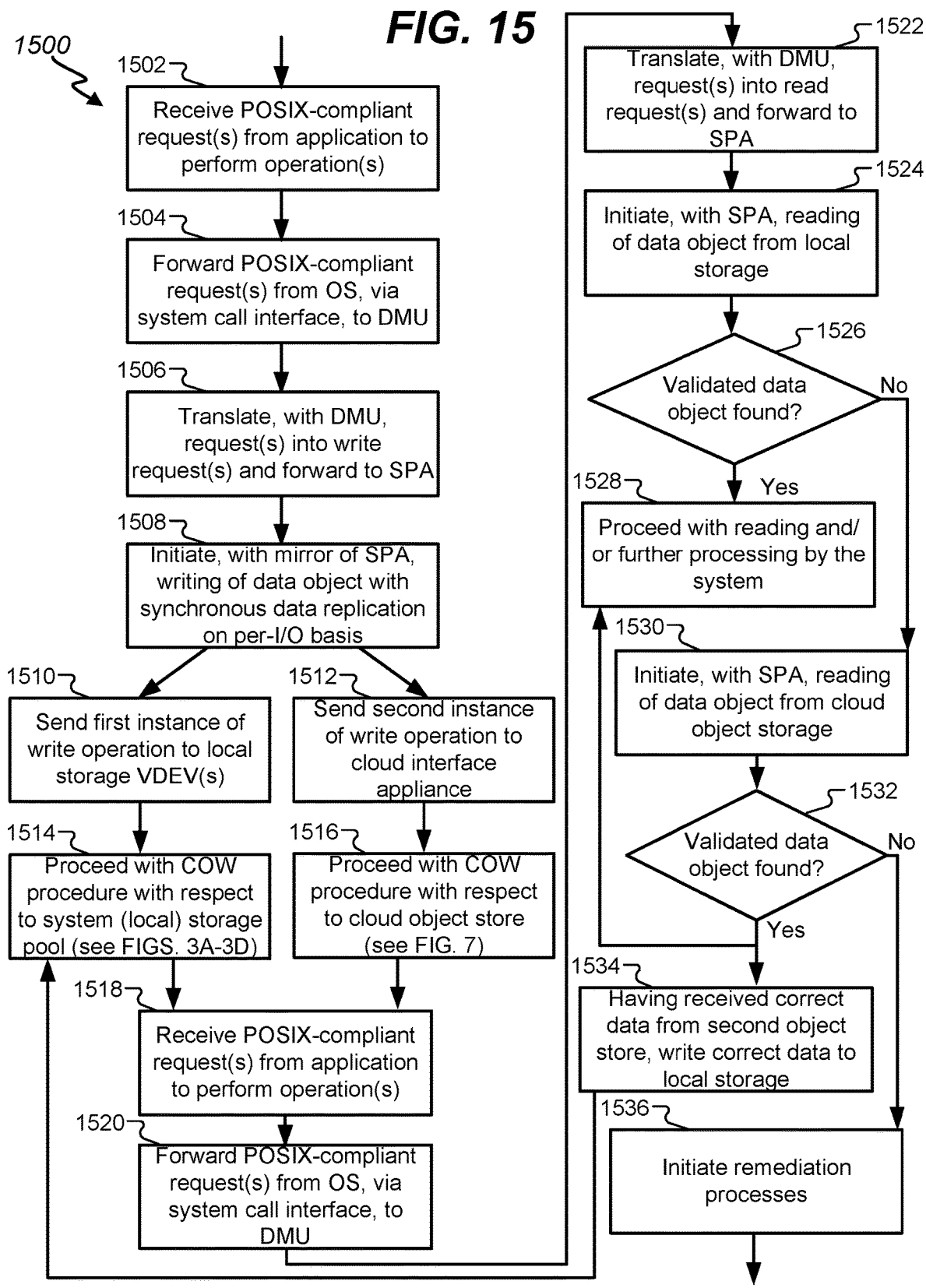
FIG. 15 is a block diagram that illustrates an example method directed to certain features of the hybrid cloud storage system for synchronous mirroring and cloud latency masking, in accordance with certain embodiments of the present disclosure.

FIG. 15 is a block diagram that illustrates an example method 1500 directed to certain features of the hybrid cloud storage system 400 for synchronous mirroring and cloud latency masking, in accordance with certain embodiments of the present disclosure. According to certain embodiments, the method 1500 may begin as indicated by block 1502. However, as clarified above, certain steps of methods disclosed herein may be shuffled, combined, and/or performed simultaneously or substantially simultaneously in any suitable manner and may depend on the implementation chosen.

As indicated by block 1502, POSIX-compliant request(s) to perform particular operation(s) (i.e., a transaction(s)) may be received from the application 202. Such an operation may correspond to writing and/or modifying data. As indicated by block 1504, the POSIX-compliant request(s) may be forwarded from the operating system, via the system call interface 208, to the DMU 218. As indicated by block 1506, the DMU 218 may translate requests to perform operations on data objects directly to requests to perform write operations (i.e., I/O requests) directed to a physical location within the system storage pool 416 and the cloud object store 404. The DMU 218 may forward the I/O requests to the SPA.

The mirror VDEV 1402 of the SPA may receive the I/O requests (e.g., by way of the ARC 222 and the I/O pipeline 224). As indicated by block 1508, the mirror VDEV 1402 may initiate writing of a data object with synchronous replication on a per-I/O operation basis. One part of the mirror VDEV 1402 may point to local storage, and one part of the mirror VDEV 1402 may point to the cloud interface device 502 of the cloud storage appliance 402. As indicated by block 1510, the mirror VDEV 1402 may direct a first instance of the write operation to one or more of the VDEVs 226. In some embodiments, as indicated by block 1514, the COW procedure disclosed above (e.g., in view of FIGS. 3A-3D) may proceed in order to write the data object to the local system storage.

As indicated by block 1512, the mirror VDEV 1402 may direct a second instance of the write operation to the cloud interface device 502 of the cloud storage appliance 402. In some embodiments, as indicated by block 1516, the COW procedure disclosed above may proceed in order to write the data object to the local system storage. For example, the method 1500 may transition to block 712 or another step of the method 700.

With each write operation synchronously performed with respect to local storage 228 and with respect to the cloud object store 404, the hybrid cloud storage system 400 may thereafter intelligently coordinate read operations in order to achieve local storage read performance that masks latencies for cloud access. At any suitable time after consummation of the replicative data storage, the hybrid cloud storage system 400 may coordinate such read operations. Referring again to FIG. 15, as indicated by block 1518, a POSIX-compliant request to perform one or more particular operations (i.e., one or more transactions) may be received from the application 202. Such an operation may correspond to reading or otherwise accessing data. As indicated by block 1520, the POSIX-compliant request may be forwarded from the operating system, via the system call interface 208, to the DMU 218. As indicated by block 1522, the DMU 218 may translate requests to perform operations on data objects directly to requests to perform one or more read operations (i.e., one or more I/O requests) directed to the local storage 228. The SPA may receive the I/O request(s) from the DMU 218. As indicated by block 1524, responsive to the request(s), the SPA may initiate reading of one or more data objects from the local storage 228. In some embodiments, the ARC 222 may be checked first for a cached version of the one or more data objects and, absent a cached version being found, an attempt to read the one or more data objects from the local storage 228 may then be made.

As indicated by block 1526, it may be determined whether one or more validated data objects corresponding to the I/O request(s) exist. This may include the SPA first determining if one or more objects corresponding to the one or more I/O request(s) are retrievable from the local storage 228. Then, if such one or more objects are retrievable, the object(s) may be checked with a checksum(s) from parent node(s) in the logical tree. In various embodiments, the checking may be performed by one or more of the VDEVs 226, the mirror VDEV 1402, and/or the I/O pipeline 224. As indicated by block 1528, in the case of the data object(s) being validated, the reading and/or further processing operations of the system 400 may proceed, as the data has been determined to be not corrupted and not the incorrect version.

However, in the case of the SPA determining that validated data objects corresponding to the I/O request(s) does not exist, process flow may transition to block 1530. Such a determination could correspond to an absence of retrievable data objects corresponding to the one or more I/O request(s), in which case an error condition may be identified. Similarly, such a determination could correspond to mismatch of actual and expected checksums of the data object(s) corresponding to the one or more I/O request(s), in which case an error condition may also be identified. In either case, the SPA may initiate reading of the one or more data objects from the cloud object store 404, as indicated by block 1530. In various embodiments, the initiating of the reading may be performed by one or a combination of the DMU 218, the mirror VDEV 1402, the I/O pipeline 224, and/or the cloud interface appliance 402.

The reading of the one or more data objects from the cloud object store 404 may include steps previously disclosed herein, for example, with regard to FIG. 9. Such steps may include one or a combination of issuing I/O request(s) to the cloud interface appliance 402, sending corresponding cloud interface request(s) to the cloud object store 404 using the mapping 406 of cloud storage objects 414, receiving data object(s) responsive to the object interface requests, and the like, which are detailed above. As indicated by block 1532, it may be determined whether a validated data object has been retrieved from the cloud object store 404. Again, this may involve steps previously disclosed herein, for example, with regard to FIG. 9, where it is determined whether to validate the data object(s) by the checksum(s) from parent node(s) in the logical tree.

In the case of the data being validated, the process flow may transition to block 1528, and the reading and/or further processing operations of the system 400 may proceed. Further, as indicated by block 1534, the correct data may be written to the local system storage. In various embodiments, the correction process may be performed by one or a combination of the DMU 218, the mirror VDEV 1402, the I/O pipeline 224, and/or the cloud interface appliance 402. In some embodiments, the process flow may transition to block 1514, where a COW procedure may proceed in order to write the correct data to the local system storage.

However, in the case of mismatch of actual and expected checksums of the data object(s), the process flow may transition to block 1536, where remediation processes may be initiated. This may involve steps previously disclosed herein, for example, with regard to FIG. 9, where remediation processes are disclosed. For example, the remediation processes may include reissuing one or more cloud interface requests, requesting the correct version of the data from another cloud object store, and/or the like.

Advantageously, when an amount of data maintained by the hybrid cloud storage system 400 exceeds a certain amount, it may become more cost-benefit optimal to transition from a mirroring mode disclosed above to a caching mode in accordance with embodiments disclosed with respect to FIGS. 12 and 13. Certain embodiments may make that transition automatically. The hybrid cloud storage system 400 may begin with mirroring techniques, proceeding until one or more thresholds are reached. Such thresholds could be defined in terms of storage usage. For example, when the usage of local storage capacity reaches a threshold percentage (or absolute value, relative value, etc.), the hybrid cloud storage system 400 may transition to adaptive I/O staging. In that way, the hybrid cloud storage system 400 may balance the load imparted on the local storage by shifting operational modes. Then, the hybrid cloud storage system 400 may the most relevant X amount of data (e.g., 10 TB, and/or the like) and shunt the rest of the data to the cloud storage. This load balancing may allow for fewer storage devices, while accommodating increasing amounts of data storage.

Figure 16:
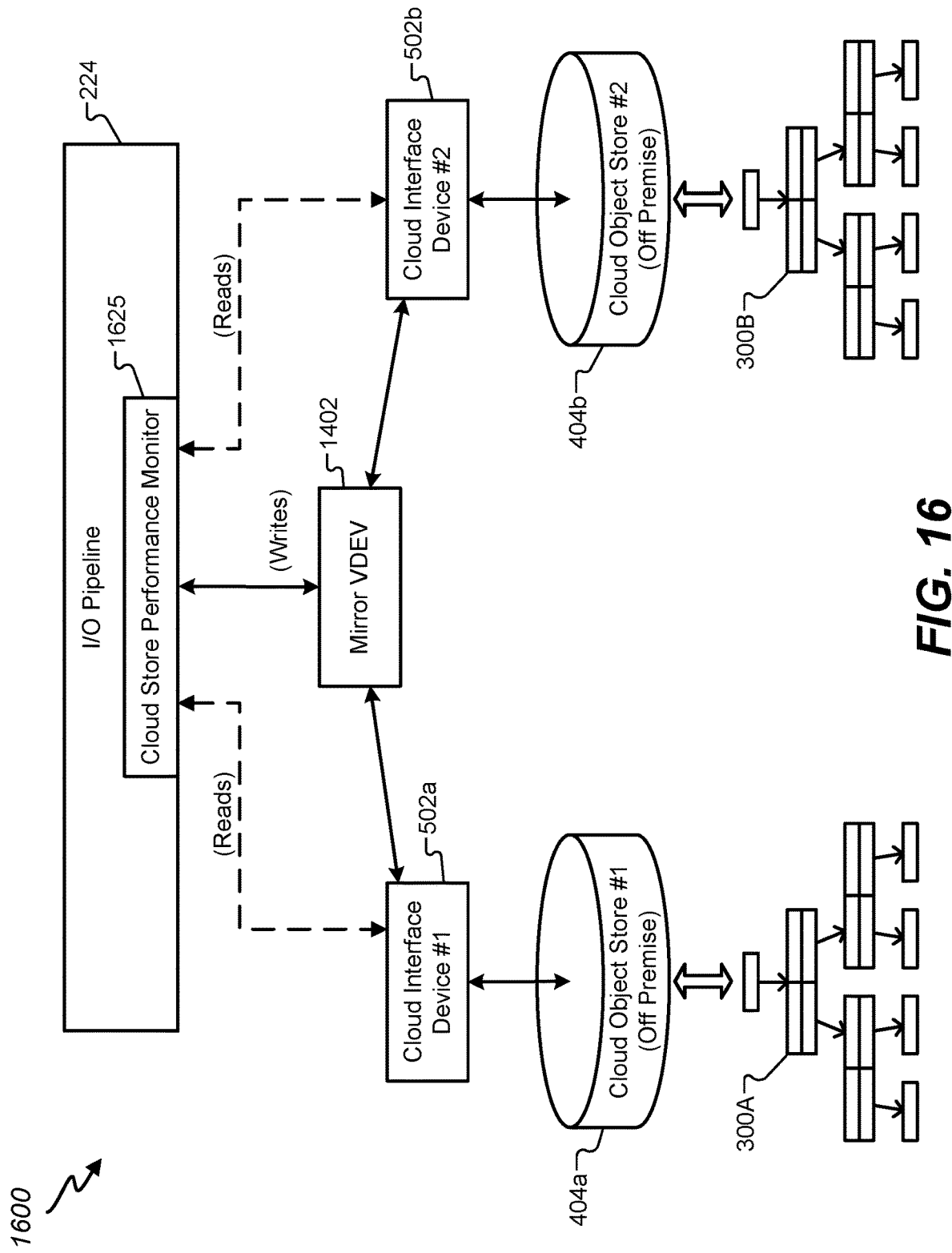
FIG. 16 illustrates an instance of certain layers of an example network file system configured to facilitate synchronous mirroring across multiple cloud data object stores, in accordance with certain embodiments of the present disclosure.

Referring now to FIG. 16, another example of a network file system 1600 is depicted. As discussed below in more detail, this example network file system 1600 may be configured to support synchronous mirroring across multiple cloud data object stores 404, which may be operated by different cloud providers. Although only certain components of the file system 1600 are depicted in this example, such as components within the pool storage layer (e.g., virtual device layer) and the physical storage layer, it should be understood that the file system 1600 in this example may correspond to one or more of the embodiments of ZFS file systems discussed above, such as file system 200-1 and/or file system 200-2. For example, as in file system 220-2, file system 1600 may include a mirror VDEV 1402 configured to support synchronous replication (or mirroring) and storage of a logical tree 300 corresponding to a snapshot of a file system storage of the data and the metadata of the file system 1600. As in file system 200-2, file system 1600 may support mirror management integrated directly into a ZFS control stack, in which the mirror VDEV 1402 may facilitate multiple cloud copies of data.

As discussed above, mirror VDEV 1402 may be implemented as a virtual device within a virtual device layer of a ZFS file system architecture, which may be directly above a driver layer. In some embodiments, the mirror VDEV 1402 may correspond to an abstraction of the device driver interface inside the ZFS architecture. The file system 1600 may create the mirror VDEV 1402 to be a funnel for I/O operations, and/or the mirror VDEV 1402 may be a point through which other components of the file system 1600 may communicate. As shown in this example, communications from the transactional object layer (e.g., the data management unit 218 (not shown)) may go through the I/O pipeline 224, to the mirror VDEV 1402, and then to the physical layer. Responsive to such communications, the mirror VDEV 1402 may direct communications to other VDEVs 226 and/or to cloud interface devices 502. As such, the mirror VDEV 1402 may coordinate I/O operations with respect to local data object stores 228 and cloud object stores 404.

Network file systems such as example file system 1600 may be used to implement various techniques of mirroring data between cloud storages of multiple different cloud providers. For example, as discussed below, a set of data objects storing a complete tree hierarchy of logical data blocks representing the file data and metadata of the ZFS file system 1600, may be mirrored between multiple different cloud object stores 404. As shown in this example, a first logical tree hierarchy 300A may be stored in a first cloud object store 404a of a first cloud provider, while an identical mirrored instance of the same tree hierarchy 300B is stored in a second cloud object store 404b of a second cloud provider.

In various embodiments, the mirroring techniques described herein may be used for cloud replication, cloud migration, cloud-based deployment (e.g., dev-test) environments, and various other purposes. For example, cloud replication may provide disaster recovery and safeguard the ZFS file system against cloud store failures. Cloud migration may provide the ZFS file system 1600 with the ability to evaluate and change between cloud stores/cloud providers, for example, based on cloud store performance, price, reliability, etc. As discussed below, because such migrations may be initiated and performed mostly (or entirely) within the lower levels of the ZFS file system architecture (e.g., within the pooled storage layer and the physical storage layers), the cloud migration may be performed entirely transparently with respect to the interface layer and all applications built upon the ZFS file system 1600.

Further, as discussed below, because such migrations may be performed by mirror the same tree hierarchy of logical data blocks that includes both file data and metadata (e.g., in contrast to simple file-by-file migration), it may be assured that the file system data may be migrated between different cloud providers without losing any file system data or attributes. That is, even if the different cloud object stores 404a, and 404b support different native sets of attributes for the data objects stored therein, the organization, storage, and migration of the file system data as a tree hierarchy of logical data blocks including both blocks having file data and/or separate corresponding metadata, may assure that migration may be performed between the different cloud object stores 404a, and 404b without losing or altering any of the file data or corresponding metadata during the migration/replication process. Additionally, the particular file system attributes and other extended attributes (e.g., file system version history, etc.) may be expressly stored within the logical data blocks of the tree hierarchy, and thus will not be lost during migration or replication between different cloud object stores 404a, and 404b having different characteristics. Further, for similar reasons, DMU objects such as ZFS file system objects, clone objects, CFS volume objects, and snapshot objects created using different instances of the tree hierarchy residing in different cloud object stores 404a, and 404b, may be identical regardless of the cloud object store 404 from which they were generated.

Additionally, data mirroring between cloud providers may enable straightforward creation of cloud-based deployment environments including identical hierarchies of logical data blocks. Thus, such deployment environments may be used to create working environments within a cloud data object store 404, allow application developers to build and test new applications/capabilities within the cloud-based deployment environments, and then (e.g., after testing and verification of the new functionality) migrate the cloud-based deployment environments over into the primary storage system of the ZFS file system 1600 (e.g., a local data object store or cloud data object store).

Further, the examples described herein of mirroring the data object storage of the ZFS file system 1600 across multiple cloud providers may use synchronous replication techniques, which may assure fully synchronized copies of the data upon the completion of each transaction. Additionally, the architectures of the file systems described herein may allow for efficient synchronous replication across multiple cloud data object stores, whereby the mirror VDEV 1402 may transmit data modifications to the multiple cloud data object stores, and need not wait for confirmations indicating successful data writes from all of the cloud data object stores. For example, when performing write operations on a file system 1600 with cloud data mirroring, and when the file system 1600 supports the various synchronization, data recovering, and/or verification techniques described herein, the mirror VDEV 1402 may be assured that as long as the write operation is successful at least one of cloud data stores 404, the synchronization, data recovering, and/or verification features of the file system 1600 will complete the write operation at any other cloud data stores 404 where the write operation may be unsuccessful. Further, after the initial migration or replication between multiple cloud data object stores 404, certain embodiments of the file system 1600 may provide for check summing of the multiple instances of the entire hierarchy tree (e.g., 300A, 300B, . . . ) within the cloud data object stores (e.g., 404a, 404b, . . . ).

As described in more detail below, examples of cloud data mirroring may include replicating and/or migrating a first instance of a logical tree hierarchy 300A from one cloud object store 404a, to an identical second instance of the logical tree hierarchy 300B at another cloud object store 404b. The mirror VDEV 1402 may coordinate the cloud data mirroring by initiating the retrieval of the data objects from the cloud object store 404a storing the logical tree hierarchy 300A, followed by initiating the creation and writing of an identical set of data objects on the cloud object store 404b which store an identical instance of the logical tree hierarchy 300B. Further, as discussed below, after the initial cloud data mirroring, the mirror VDEV 1402 also may coordinate read and/or write operations originating from the application layer of the file system 1600.

In some embodiments, the constraints of cloud data mirroring may require that the same mapping of the logical blocks of the tree hierarchy to the cloud data objects must be used for each cloud object store 404 mirroring cloud data with any other cloud object store 404. That is, the same configuration of logical blocks containing file data and/or logical blocks containing metadata, and the same arrangement of those logical blocks into the physical data objects stored within the cloud object store 404, may be used with each cloud object store 404 (and/or within local data object stores that also may perform mirroring of the data of the file system 1600). However, in other embodiments, cloud data mirroring techniques may be implemented without the same mirroring constraints. In such embodiments, different cloud object stores 404a and 404b may store different numbers, sizes, and/or configurations of physical data objects, as long as the physical data objects on each different cloud object store 404 stores the same tree hierarchy of logical data blocks representing the file system 1600.

Finally, as shown in the example the file system 1600, the mirror VDEV 1402 might only coordinate write operations with respect to cloud data object stores 404 (and/or with respect local storage 228 in some cases), such that read operations need not go through the mirror VDEV 1402. In such embodiments, when coordinating write operations originating at the application layer, the mirror VDEV 1402 may coordinate the write operations so that each write operation is synchronously performed with respect to the multiple cloud object stores 404, using the corresponding cloud interface devices 502. For read operations, an upstream component (e.g., the I/O pipeline 224, DMU 218, etc., may bypass the mirror VDEV 1402 for read operations and route the read operation directly to one of the cloud interface devices 502 for execution of the read operation at one of the cloud object stores 404. As shown in this example, a cloud store performance monitor component 1625 may be used to receive/determine cloud store performance data, and route read operations to a particular cloud object store 404 based on the performance data. For example, the cloud store performance monitor 1625 (which may be implemented within the I/O pipeline, the DMU 218, as a separate virtual device 226 within the device layer, or elsewhere within the file system 1600), may evaluate and analyze a number of previous read operations executed by each of the mirrored cloud object stores 404. Based on the evaluation of the performance of the cloud object stores 404 in performing previous read operations, the cloud store performance monitor 1625 may perform a real-time selection of the most performant of the cloud object store 404, and may route the read operation to that cloud object store 404. Although these examples relate to embodiments wherein the mirror VDEV 1402 does not coordinate read operations with respect to cloud data object stores 404 (and/or with respect local storage 228), in other embodiments, the mirror VDEV 1402 may coordinate both read and write I/O operations originating from the application layer of the file system 1600.

Figure 17:
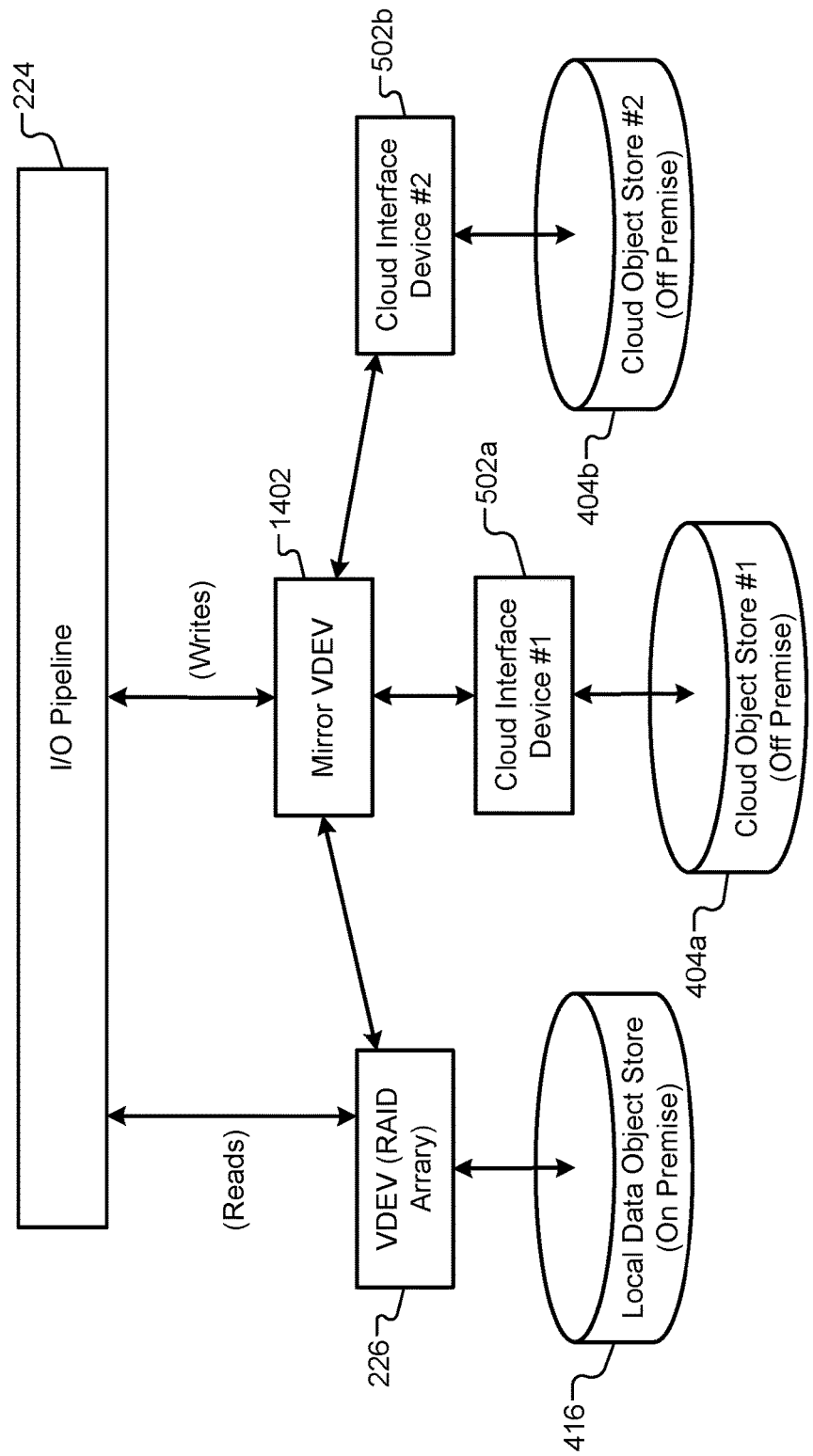
FIG. 17 illustrates an instance of certain layers of an example network file system configured to facilitate synchronous mirroring across multiple cloud data object stores and/or local data object stores, in accordance with certain embodiments of the present disclosure.

Referring now to FIG. 17, yet another example of a network file system 1700 is shown. The network file system 1700 in this example may be implemented in a manner similar (or identical) to the file system 1600 discussed above. As in the above example, file system 1700 may be configured to support synchronous mirroring across multiple (e.g., 2 or more) cloud data object stores 404. Additionally, in this example, file system 1700 may support synchronous mirroring across both the cloud data object stores 404 as well as across a separate local data object store 416. Thus, the file system 1700 in this example may include similar components to various embodiments of ZFS file systems discussed above, such as the example network file system 200-2 of the hybrid cloud storage system 400. As in that example, file system 1700 may be configured to support synchronous mirroring between one or more cloud data object stores and a local data store 416 stored on the premises (e.g., within the same data center) with the remaining file system 1700 components. While the illustrative tree hierarchies have not been shown in this example, both the local data store 416 and each separate cloud store 404 may store an identical set of data blocks containing the logical block tree hierarchy for the file system 1700. Additionally, communications from the DMU 218 may be directed to the I/O pipeline 224 and to the mirror VDEV 1402, and responsive to such communications, the mirror VDEV 1402 may direct communications to the VDEV(s) 226 and the cloud interface device 502 to perform data operations on the various back-end data stores. Thus, the mirror VDEV 1402 may coordinate I/O operations with respect to both the local storage 228 and cloud data object stores 404. Thus, the cloud data mirroring techniques and examples discussed above may be performed similarly (or identically) in file system 1700 to support migration, replication, and other synchronous mirroring techniques between one or more cloud object stores 404 and a local data store 416.

In some embodiments, the synchronous mirror techniques used in file system 1700 may include storing the same configuration of logical blocks containing file data and/or logical blocks containing metadata, and the same arrangement of those logical blocks into the physical data objects stored, within each cloud object store 404 and also within the local data store 416. However, in other embodiments, the cloud object store(s) 404 may store different numbers, sizes, and/or configurations of physical data objects from the physical data objects stored within the local data store 416, as long as the cloud object store(s) 404 and the local data store 416 stores the same tree hierarchy of logical data blocks corresponding to the file system 1700.

As noted above, the synchronous mirroring of each I/O operation may be performed at the object level, not the file level. The data replications with each I/O operation may enable the file system 1700 to achieve local storage read performance that masks latencies for cloud access. Thus, as shown in this example, the file system 1700 may read from the local data store 416 in order to avoid cloud latencies for the vast majority of read operations. Only when the file system 1700 determines that local data within data store 416 is missing or corrupt, does the file system 1700 need to access one of the cloud object stores 404 to read a cloud copy of the desired data. Such exceptions may be performed on an object basis so that the latency for cloud access is minimized. Thus, as shown in this example, the file system 1700 in some embodiments need not include a cloud store performance monitor 1625 to analyze cloud store performance with respect to various types of read operations, as discussed above. Rather, in this example, all read operations may bypass the mirror VDEV 1402 and be providing directly to the VDEV 226 configured to access the local data object store 416. However, as in the above example, the mirror VDEV 1402 in file system 1700 also may be used to coordinate write operations with respect to the cloud data object stores 404, and the local data store 416). When coordinating write operations originating at the application layer, the mirror VDEV 1402 may coordinate the write operations so that each write operation is synchronously performed with respect to the multiple cloud object stores 404 using the corresponding cloud interface devices 502, and the local data store 416 using the appropriate VDEV 226.

Figure 18:
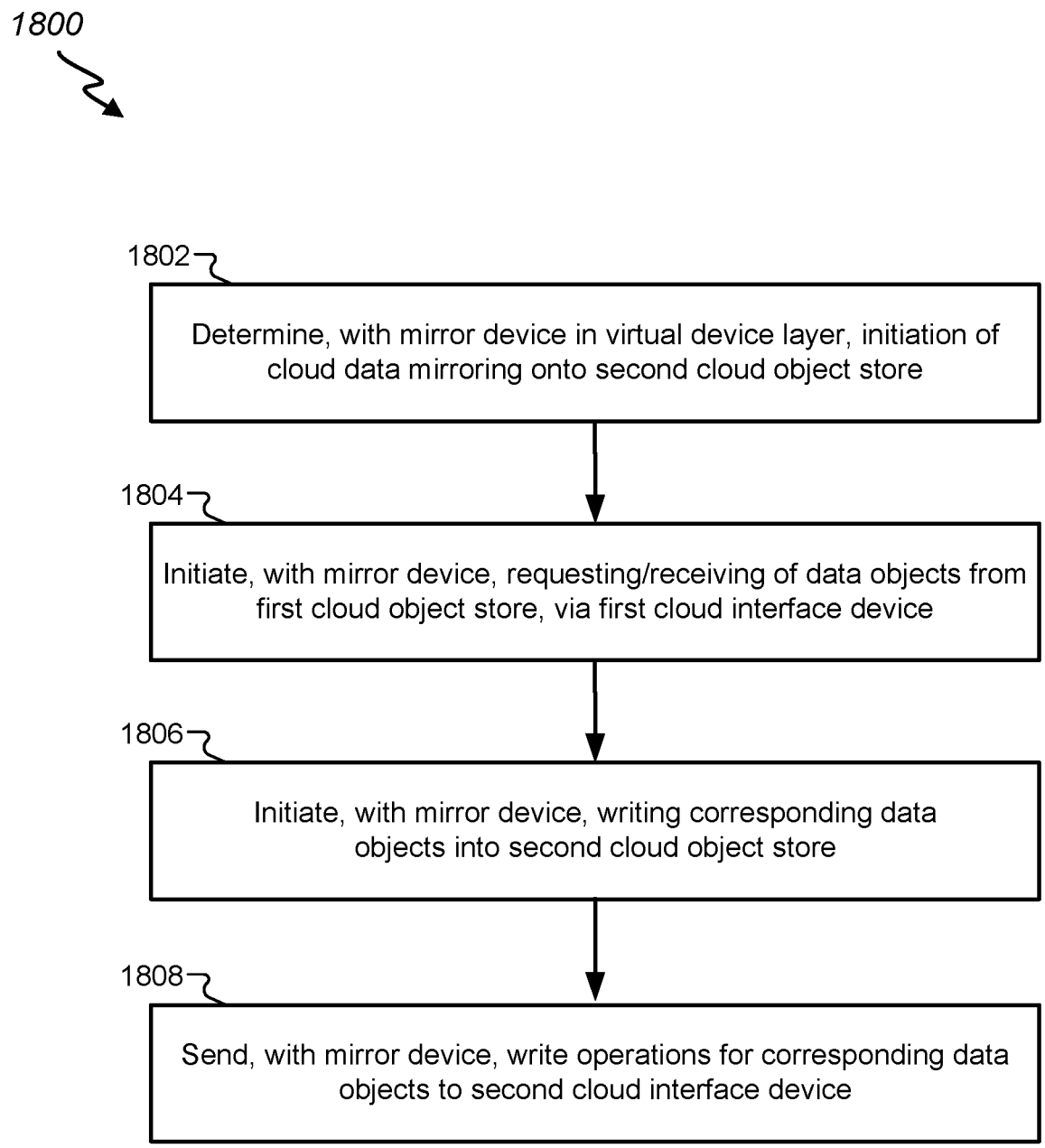
FIG. 18 is a block diagram that illustrates an example method directed to synchronous mirroring of data from a network file system, across multiple cloud data object stores, in accordance with certain embodiments of the present disclosure.

Referring now to FIG. 18, a block diagram is shown illustrating an example process of synchronous mirroring of data from a network file system across multiple cloud data object stores. The synchronous mirroring process described in this example may correspond to a cloud data migration, replication, and/or creation of a temporary cloud-based deployment (e.g., dev-test) environment, as discussed above. Further, the steps in this example process are described in terms of synchronous mirroring of file system data from one cloud object store 404a to another cloud object store 404b, as shown in file system 1600. However, in other examples, similar or identical techniques may be used for synchronous mirroring of file system data from a cloud object store 404 to a local data store 416, or vice versa.

The steps in this process may be performed, for example, by the components in file system 1600 and/or file system 1700, discussed above, such as a mirror VDEV 1402, an I/O pipeline 224, and/or a DMU 218, in conjunction with the various cloud interface devices 502 and other VDEVs 226. For example, as discussed above, a mirror VDEV 1402 may coordinate a cloud data migration and/or replication process by initiating the retrieval of the particular data objects within a first cloud object store 404a storing a logical tree hierarchy, followed by initiating the creation and writing of an identical set of data objects on a second cloud object store 404b, thereby storing an identical instance of the logical tree hierarchy. However, in other embodiments, the steps described below may be performed partially or entirely by file system components other than the mirror VDEV 1402, such as the I/O pipeline 224 and/or the DMU 218. It should also be understood that the process features described herein are not limited to the particular embodiments of file systems (e.g., 1600 and 1700) described above, but may be performed on the various other computing environments supported herein.

In block 1802, a mirror VDEV 1402 within a file system 1600 having (at least) one cloud object store 404a storing the file system data, may detect a second cloud object store 404b onto which the file system data is to be mirrored. As discussed above, the determination to initiate a synchronous mirroring to a second cloud object store 404b in block 1802 may correspond to the initiation of a cloud data migration between two cloud object stores 404a and 404b, the initiation of a cloud data replication onto a secondary back-up cloud object store 404b, and/or the creation of a temporary deployment environment on a second cloud object store 404b.

The determination in block 1802 may correspond to an instruction received via a file system administrator and/or various automated determinations performed by the mirror VDEV 1402 software. For instance, the mirror VDEV 1402 may be configured to monitor the available cloud interface devices 502 and/or the current sets of data objects stored with each associated cloud object store 404, and may automatically initiate a cloud-to-cloud synchronous mirroring based on the detection of certain states or events. As an example, if the mirror VDEV 1402 detects potential performance or reliability issues associated with a first cloud object store 404a (e.g., upcoming scheduled maintenance, system errors, approaching cloud storage size limits, etc.), then the mirror VDEV 1402 may automatically initiate a migration or replication of the data from first cloud object store 404a to a second cloud object store 404b in block 1802. In such examples, the automated processes performed by the mirror VDEV 1402 to determine that a synchronized mirroring process is to be initiated may include an analysis of multiple available cloud data object stores 404, and the selection of a particular cloud data object store 404b to be the recipient in the migration/replication process, based on storage availability, price, performance, and/or other factors. Additionally or alternatively, the determination in block 1802 may correspond to a request or instruction received via an administrative user interface to initiate a synchronized mirroring process between a first cloud object store 404a storing a tree hierarchy of file system data, and a second cloud object store 404b.

In block 1804, the mirror VDEV 1402 may initiate the requesting and receiving of data objects from the first cloud object store 404a, via the first cloud interface device 502a. For example, the mirror VDEV 1402 may transmit one or more data object requests to the first cloud interface device 502a, which may receive the request(s) and send corresponding cloud interface request(s) to the cloud object store 404a. In some embodiments, the first cloud interface device 502a may coordinate the requests using the mapping of cloud storage objects in the cloud object store 404a. For example, the cloud interface device 502a may identify and request all or a portion of the file system data stored as cloud data objects in accordance with the logical tree hierarchy. In response to the requests, the cloud interface device 502a may receive data object(s) responsive to the object interface requests, and may return the data object(s) to the mirror VDEV 1402.

In block 1806, the mirror VDEV 1402 may initiate the writing of the data objects received in block 1804, into the second cloud object store 404b. For example, the mirror VDEV 1402 may determine a sequence of object creation commands and/or write operations to initiate the creation of an identical set of data objects, storing the identical sets of data (e.g., the various logical blocks with file data and/or separate metadata corresponding to the file system). In block 1806, the mirror VDEV 1402 may send the determined create/write operations to the cloud interface device 502b associated with the second cloud object store 404b into which the migration and/or replication copy of the logical tree hierarchy is to be created. In some embodiments, the various steps in this example may be performed simultaneously rather than in the order discussed above. For example, one part of the mirror VDEV 1402 may point to the cloud interface device 502a of the first cloud object store 404a, while another part of the mirror VDEV 1402 may point to the cloud interface device 502b of the first cloud object store 404b, after which a rapid sequence of read-in/write-out operations may be performed to generate the mirrored copy of the file system data from the first cloud object store 404b, to the second cloud object store 404b.

The synchronous mirroring performed via the operations in blocks 1802-1808 may be performed at the object level, not the file level. That is, in various embodiments, steps 1804 and 1808 do not correspond to retrievals and storage of files. Rather, each of the data objects stored on the first cloud object store 404a may be retrieved, copied, and stored on the second cloud object store 404b as an identical data object, where each of the data objects stores one or more logical data blocks corresponding to file data or separately stored metadata. Thus, at the completion of blocks 1802-1808 in this example, the first and second cloud object stores 404a and 404b may store the same configuration of logical blocks containing file data and/or logical blocks containing metadata, and the same arrangement of those logical blocks into the identical sets of data objects stored within their respective physical storage systems.

Figure 19:
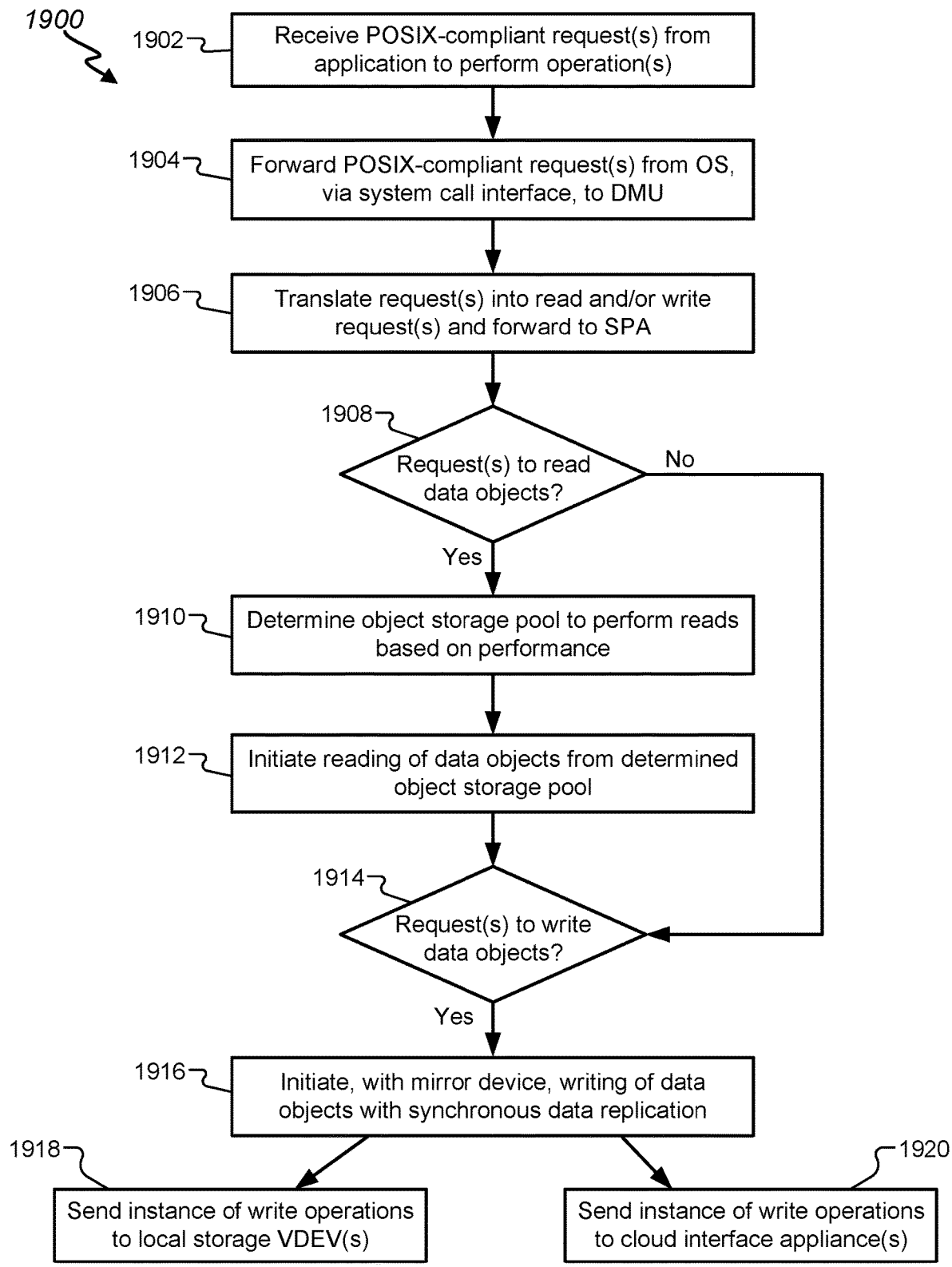
FIG. 19 is a block diagram that illustrates an example method directed to receiving and processing requests by a network file system configured to support synchronous mirroring of data from the file system across multiple cloud data object stores and/or local data object stores, in accordance with certain embodiments of the present disclosure.

Referring now to FIG. 19, a block diagram is shown illustrating an example process of receiving and processing requests by a network file system supporting synchronous mirroring of the file system data across multiple cloud data object stores 404 and/or local data object stores 416. The requests in the example may correspond to requests for retrieval, modification, and/or deletion of file data and/or corresponding metadata attributes of the files within the file system 1600. This example process are described below in terms of synchronous mirroring of file system data between multiple cloud object stores 404 and/or between cloud object stores 404 and a local data store 416, as illustrated above in file systems 1600 and 1700. Thus, the steps in this process may be performed, for example, by a mirror VDEV 1402 in conjunction with the various cloud interface devices 502 and other VDEVs 226. However, in other embodiments, the steps described below may be performed partially or entirely by file system components other than the mirror VDEV 1402, such as the I/O pipeline 224 and/or the DMU 218. It should also be understood that the process features described herein are not limited to the particular embodiments of file systems (e.g., 1600 and 1700) described above, but may be performed on the various other computing environments supported herein.

In block 1902, the file system 1600 (or 1700, etc.) may receive a POSIX-compliant request(s) to perform particular operation(s), for example, retrieving file data, writing and/or modifying data, etc. The request in block 1902 may be received from an application, via the application layer or interface layer of the file system 1600. In block 1904, the POSIX-compliant request(s) may be forwarded from the operating system, via a system call interface 208, to the DMU 218. In block 1906, the DMU 218 may translate requests to perform operations on data objects directly to requests to perform read and/or write operations (e.g., I/O requests) directed to a physical location within one or more cloud object store 404 and/or a local system storage 416. The DMU 218 then may forward the I/O requests to one or more components within the SPA, for example, the I/O pipeline 224 (and/or the mirror VDEV 1402).

In block 1908, the I/O pipeline 224 may determine whether the translated request(s) require any read operations to be performed within the cloud object stores 404 and/or the local system storage 416. For example, retrievals from an application of file data, file properties, and similar requests received from the application may require read operations to be performed on the back-end physical storage systems.

In such cases (1908:Yes), in block 1910, the I/O pipeline 224 may determine which object storage pool (and thus which corresponding back-end physical storage system) to perform the require read operations. For example, as discussed above in reference to file system 1600, the I/O pipeline 224, DMU 218, etc., may bypass the mirror VDEV 1402 for read operations and route the read operation directly to one of the cloud interface devices 502 for execution. For instance, block 1910 may include receiving and evaluating performance data for multiple cloud object stores 404, using a cloud store performance monitor component 1625 and/or similar components. For instance, the cloud store performance monitor 1625 may evaluate and analyze a number of previous read operations executed by each of the mirrored cloud object stores 404, and based on the evaluation may select a most performant cloud object store 404 to handle the read operation(s). In other examples, a similar cloud store performance monitor component 1625 may perform the determination in block 1910 based on other cloud object store characteristics, such as price, reliability, current processing load, etc., instead of or in addition to basing the determination on the performance of the available cloud object stores 404 storing the requested data.

In other embodiments, for example, as discussed above in reference to file system 1700, the I/O pipeline 224 may be configured to route most (or all) read operations directly to the VDEV 226 configured to access the local data object store 416, in order to avoid the cloud latencies that may exist for the majority of read operations. For example, only when the I/O pipeline 224 determines that local data within data store 416 is missing or corrupt, may the I/O pipeline 224 route the read request to one of the cloud object stores 404. Such exceptions may be performed on an object basis so that the latency for cloud access is minimized.

In block 1912, the I/O pipeline 224 may initiate reading of one or more data objects from the back-end object store determined in block 1910 (e.g., 404a, 404b, 416, etc.). In some embodiments, the ARC 222 may be checked first for a cached version of the one or more data objects and, absent a cached version being found, an attempt to read the one or more data objects from the local object store 416, or the determined cloud object store 404 may then be made. In various embodiments, the initiating of the reading in block 1912 may be performed by one or a combination of the DMU 218, the mirror VDEV 1402, the I/O pipeline 224, and/or the cloud interface device 502 or VDEV 226 corresponding to the selected object store.

In block 1914, the I/O pipeline 224 may determine whether the translated request(s) require any write operations to be performed within the cloud object stores 404 and/or the local system storage 416. For example, the creation of modification of files, updating of file attributes, and similar requests received from the application may require write operations to be performed on the back-end physical storage systems. It should be noted that although the determination of read operations in block 1908 is performed before the determination of write operations in block 1914 in this example, the order of these determinations and the subsequent related blocks may be reversed, or may be performed in parallel in other examples.

In block 1916, the I/O pipeline 224 may initiate writing of one or more data objects with synchronous data replication on a per-I/O operation basis to each of the back-end object stores (e.g., a local object store 416 and/or or cloud object stores 404). The I/O pipeline 224 may pass the determine write operations to the mirror VDEV 1402, which may coordinating write operations originating at the application layer so that each write operation is synchronously performed with respect to the multiple cloud object stores 404 using the corresponding cloud interface devices 502, and the local data store 416 using the appropriate VDEV 226.

For instance, as indicated by block 1918, the mirror VDEV 1402 may direct a first instance of the write operation to one or more of the VDEVs 226. In some embodiments, the COW procedure disclosed above (e.g., in view of FIGS. 3A-3D) may proceed in order to write the data object to the local data store 416. Additionally, as indicated by block 1920, the mirror VDEV 1402 may direct a second instance of the write operation to a cloud interface device 502 of a cloud storage appliance 404. Although only two instance of the write operation are shown in this embodiment, the tree hierarchy of file system data may be synchronously mirrored across additional data object stores (e.g., multiple cloud object stores 404), and thus additional instance of the write operation may be initiated in other embodiments.

Figure 20:
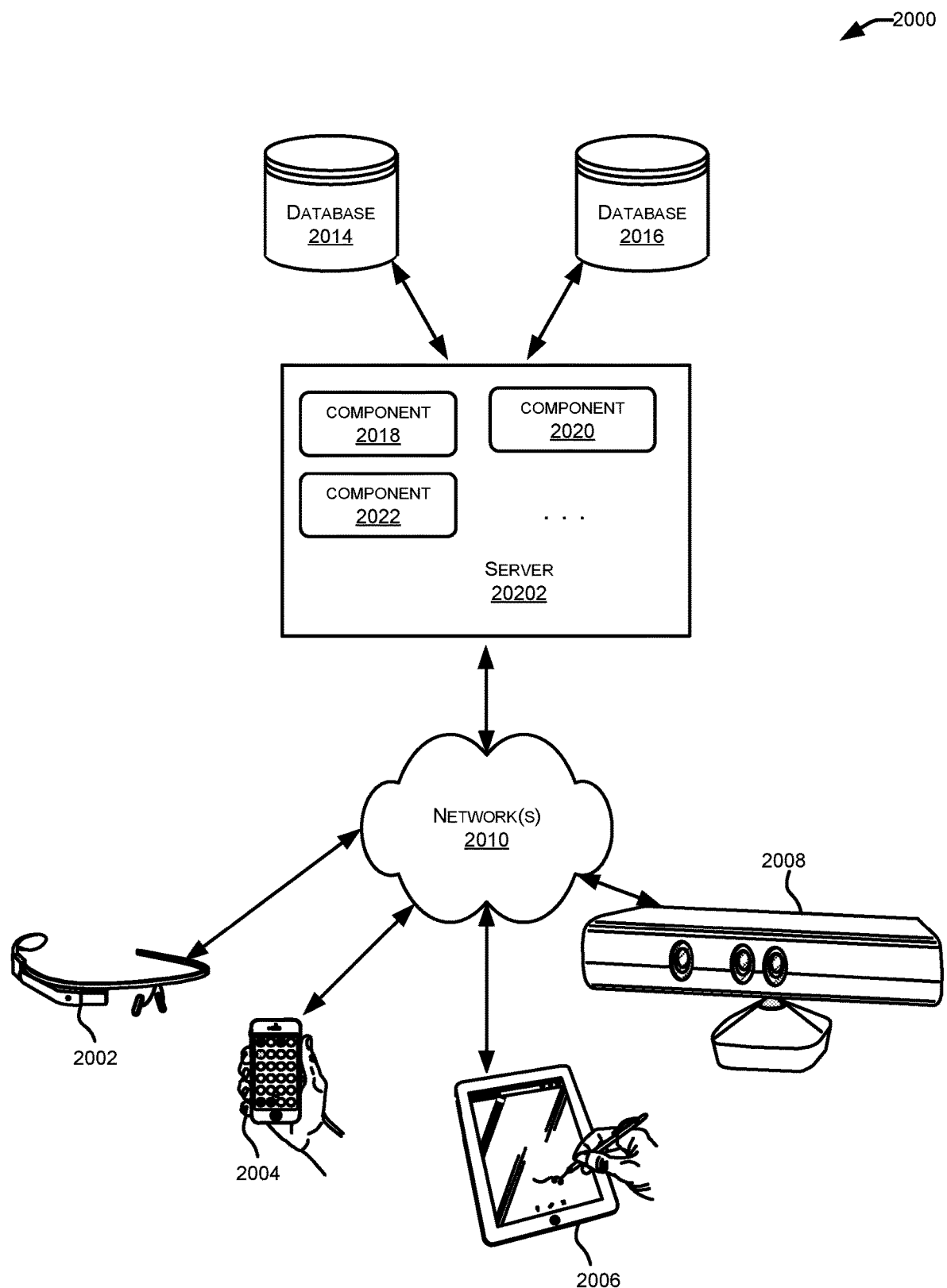
FIG. 20 depicts a simplified diagram of a distributed system for implementing certain embodiments in accordance with present disclosure.

FIG. 20 depicts a simplified diagram of a distributed system 2000 for implementing certain embodiments in accordance with present disclosure. In the illustrated embodiment, distributed system 2000 includes one or more client computing devices 2002, 2004, 2006, and 2008, which are configured to execute and operate a client application such as a web browser, proprietary client (e.g., Oracle Forms), or the like over one or more network(s) 2010. Server 2012 may be communicatively coupled with remote client computing devices 2002, 2004, 2006, and 2008 via network 2010.

In various embodiments, server 2012 may be adapted to run one or more services or software applications provided by one or more of the components of the system. In some embodiments, these services may be offered as web-based or cloud services or under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in the figure, the software components 2018, 2020 and 2022 of system 2000 are shown as being implemented on server 2012. In other embodiments, one or more of the components of system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The embodiment shown in the figure is thus one example of a distributed system for implementing an embodiment system and is not intended to be limiting.

Client computing devices 2002, 2004, 2006, and/or 2008 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2002, 2004, 2006, and 2008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2010.

Although exemplary distributed system 2000 is shown with four client computing devices, any number of client computing devices may be supported. Other devices, such as devices with sensors, etc., may interact with server 2012.

Network(s) 2010 in distributed system 2000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2010 can be a local area network (LAN), such as one based on Ethernet, Token-Ring and/or the like. Network(s) 2010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2012 may be adapted to run one or more services or software applications described in the foregoing disclosure. For example, server 2012 may correspond to a server for performing processing described above according to an embodiment of the present disclosure.

Server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2012 may include one or more applications to analyze and consolidate data feeds and/or event updates received from users of client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2012 may also include one or more applications to display the data feeds and/or real-time events via one or more display devices of client computing devices 2002, 2004, 2006, and 2008.

Distributed system 2000 may also include one or more databases 2014 and 2016. Databases 2014 and 2016 may reside in a variety of locations. By way of example, one or more of databases 2014 and 2016 may reside on a non-transitory storage medium local to (and/or resident in) server 2012. Alternatively, databases 2014 and 2016 may be remote from server 2012 and in communication with server 2012 via a network-based or dedicated connection. In one set of embodiments, databases 2014 and 2016 may reside in a storage-area network (SAN). Similarly, any necessary files for performing the functions attributed to server 2012 may be stored locally on server 2012 and/or remotely, as appropriate. In one set of embodiments, databases 2014 and 2016 may include relational databases, such as databases provided by Oracle, that are adapted to store, update, and retrieve data in response to SQL-formatted commands.

Figure 21:
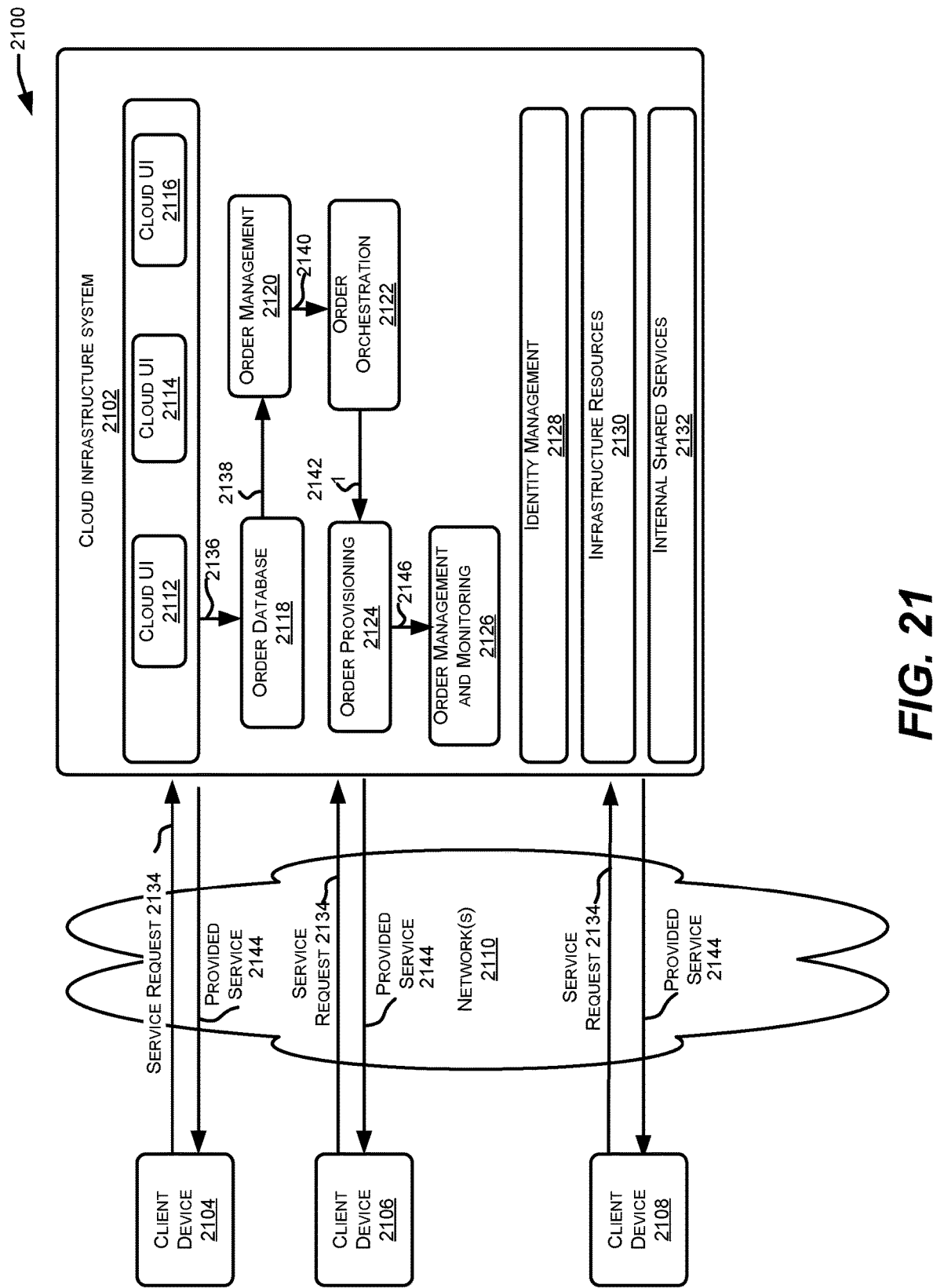
FIG. 21 is a simplified block diagram of one or more components of a system environment by which services provided by one or more components of a system may be offered as cloud services, in accordance with certain embodiments of the present disclosure.

FIG. 21 is a simplified block diagram of one or more components of a system environment 2100 by which services provided by one or more components of a system may be offered as cloud services, in accordance with certain embodiments of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application (e.g., Oracle Forms), or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for 2002, 2004, 2006, and 2008. Although exemplary system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially-available protocols, including those described above for network(s) 2010. Cloud infrastructure system 2102 may comprise one or more computers and/or servers that may include those described above for server 2012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services (e.g., owned by Oracle) and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system Y02 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform. In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2102, and the like.

In certain embodiments, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In exemplary operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order.

At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2100 and the physical implementation layer that is used to provision the resources for providing the requested services. Order orchestration module 2122 may thus be isolated from implementation details, such as whether or not services and resources are actually provisioned on the fly or pre-provisioned and only allocated/assigned upon request.

At operation 2144, once the services and resources are provisioned, a notification of the provided service may be sent to customers on client devices 2104, 2106, and/or 2108 by order provisioning module 2124 of cloud infrastructure system 2102. At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2100 may include an identity management module 2128. Identity management module 2128 may be configured to provide identity services, such as access management and authorization services in cloud infrastructure system 2100. In some embodiments, identity management module 2128 may control information about customers who wish to utilize the services provided by cloud infrastructure system 2102. Such information can include information that authenticates the identities of such customers and information that describes which actions those customers are authori22ed to perform relative to various system resources (e.g., files, directories, applications, communication ports, memory segments, etc.). Identity management module 2128 may also include the management of descriptive information about each customer and about how and by whom that descriptive information can be accessed and modified.

Figure 22:
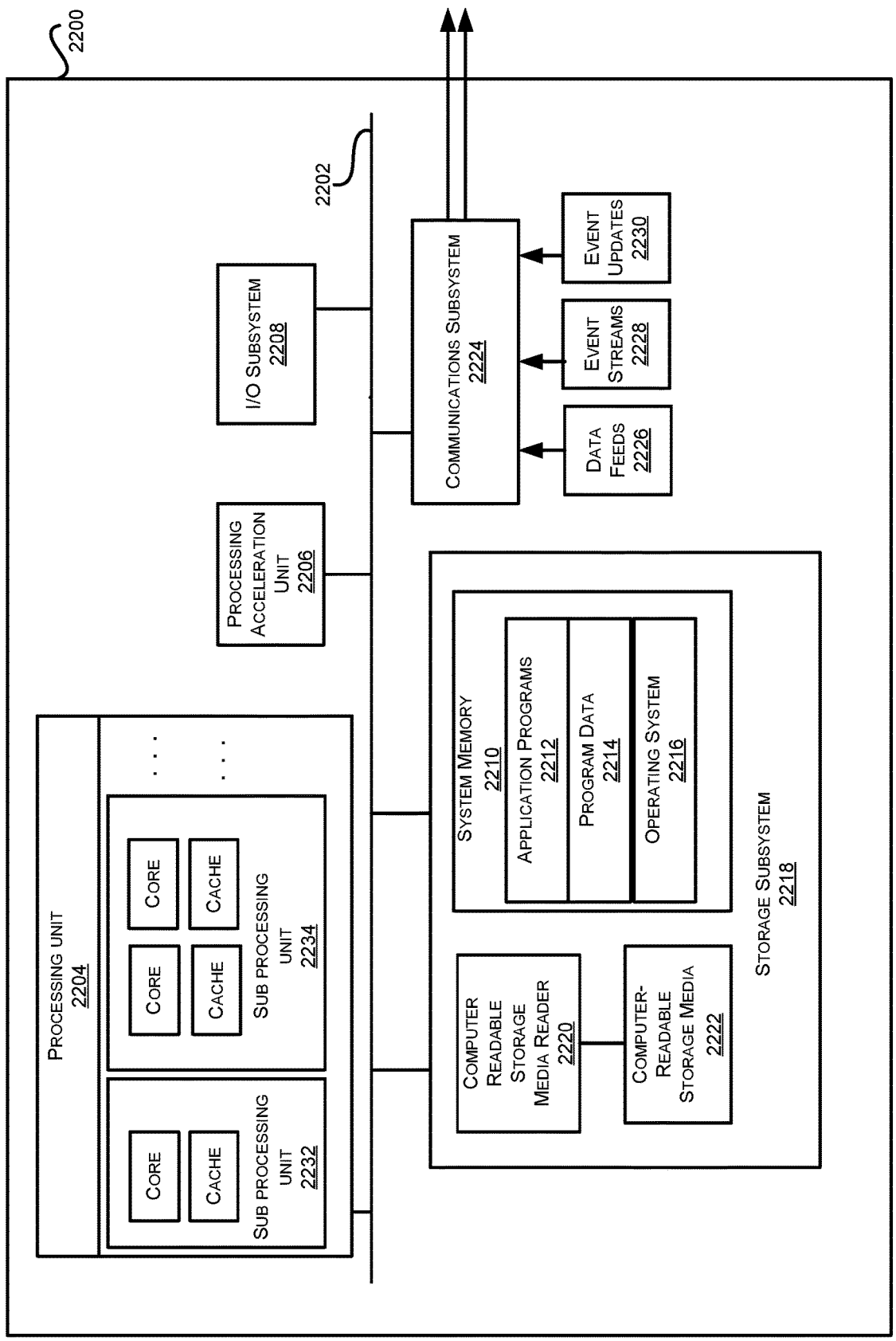
FIG. 22 illustrates an exemplary computer system, in which various embodiments of the present invention may be implemented.

FIG. 22 illustrates an exemplary computer system 2200, in which various embodiments of the present invention may be implemented. The system 2200 may be used to implement any of the computer systems described herein. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like. In some embodiments, the processing acceleration unit 2206 may include or work in conjunction with an acceleration engine such as that disclosed herein to improve computer system functioning.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 2260 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs. Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® ZO OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present invention.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as ZG, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200. By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method comprising:
    identifying, at a mirror device operating at a virtual device layer of an object-based file system, a first cloud object store of a first cloud interface device and a second cloud object store of a second cloud interface device within the virtual device layer of the object-based file system, wherein the first cloud object store supports a first native set of attributes of data objects stored therein, and the second cloud object store supports a different second native set of attributes of data objects stored therein;
    retrieving, by the mirror device and via the first cloud interface device, a first set of cloud storage objects stored in the first cloud object store, the first cloud interface device storing a first instance of a tree hierarchy, wherein the tree hierarchy includes a mapping of logical data blocks corresponding to the first set of cloud storage objects;
    storing, by the mirror device and via the second cloud interface device, a second instance of the tree hierarchy in the second cloud object store, wherein the first instance and the second instance of the tree hierarchy are identical;
    using, by the mirror device and via the second cloud interface device, the second instance of the tree hierarchy to create a second set of cloud storage objects to be stored in the second cloud object store; and
    causing at least one read operation to be performed with respect to the tree hierarchy, wherein the at least one read operation comprises receiving at least one cloud storage object from either the first cloud object store or the second cloud object store.

2. The method of claim 1, wherein the logical data blocks corresponding to the first set of cloud storage objects include metadata corresponding to each cloud storage object of the first set of cloud storage objects.

3. The method of claim 1, further comprising:
    retrieving performance data corresponding to the first cloud object store and the second cloud object store; and
    causing, based on the performance data, the at least one read operation to be performed on the first cloud object store instead of the second cloud object store.

4. The method of claim 3, wherein the performance data includes a number of previous read operations executed by each of the first cloud object store and the second cloud object store.

5. The method of claim 1, further comprising performing a checksum operation on the first and second instances of the tree hierarchy to validate that the first and second instances of the tree hierarchy are identical.

6. The method of claim 1, wherein causing at least one read operation to be performed with respect to the tree hierarchy further comprises bypassing the mirror device when the at least one read operation is performed to receive the at least one cloud storage object from either the first cloud object store or the second cloud object store.

7. The method of claim 1, further comprising:
    detecting, by the mirror device, a write operation performed on at least one cloud storage object of the first set of cloud storage objects;
    updating, by the mirror device, the first and second instances of the tree hierarchy in accordance with the write operation; and
    causing, by the mirror device, another write operation to be performed on at least one cloud storage object of the second set of cloud storage objects based on the updated second instance of the tree hierarchy.

8. A mirror device configured to operate at an object-based file system, the mirror device comprising:
    a processing unit comprising one or more processors; and
    memory coupled with and readable by the processing unit and storing therein a set of instructions which, when executed by the processing unit, causes the mirror device to:
    identify a first cloud object store of a first cloud interface device and a second cloud object store of a second cloud interface device within a virtual device layer of the object-based file system, wherein the first cloud object store supports a first native set of attributes of data objects stored therein, and the second cloud object store supports a different second native set of attributes of data objects stored therein;
    retrieve a first set of cloud storage objects stored in the first cloud object store, the first cloud interface device storing a first instance of a tree hierarchy, wherein the tree hierarchy includes a mapping of logical data blocks corresponding to the first set of cloud storage objects;
    store a second instance of the tree hierarchy in the second cloud object store, wherein the first instance and the second instance of the tree hierarchy are identical;
    use the second instance of the tree hierarchy to create a second set of cloud storage objects to be stored in the second cloud object store; and
    cause at least one read operation to be performed with respect to the tree hierarchy, wherein the at least one read operation comprises receiving at least one cloud storage object from either the first cloud object store or the second cloud object store.

9. The mirror device of claim 8, wherein the logical data blocks corresponding to the first set of cloud storage objects include metadata corresponding to each cloud storage object of the first set of cloud storage objects.

10. The mirror device of claim 8, the memory storing therein additional instructions which, when executed by the processing unit, causes the mirror device to:
    retrieve performance data corresponding to the first cloud object store and the second cloud object store; and
    cause, based on the performance data, the at least one read operation to be performed on the first cloud object store instead of the second cloud object store.

11. The mirror device of claim 10, wherein the performance data includes a number of previously read operations executed by each of the first cloud object store and the second cloud object store.

12. The mirror device of claim 8, the memory storing therein additional instructions which, when executed by the processing unit, causes the mirror device to perform a checksum operation on the first and second instances of the tree hierarchy to validate that the first and second instances of the tree hierarchy are identical.

13. The mirror device of claim 8, wherein causing at least one read operation to be performed with respect to the tree hierarchy further comprises bypassing the mirror device when the at least one read operation is performed to receive the at least one cloud storage object from either the first cloud object store or the second cloud object store.

14. The mirror device of claim 8, the memory storing therein additional instructions which, when executed by the processing unit, causes the mirror device to:
   detect a write operation performed on at least one cloud storage object of the first set of cloud storage objects;
   update the first and second instances of the tree hierarchy in accordance with the write operation; and
   cause another write operation to be performed on at least one cloud storage object of the second set of cloud storage objects based on the updated second instance of the tree hierarchy.

15. A computer-program product tangibly embodied in a non-transitory machine-readable storage medium, including instructions configured to cause one or more data processors to perform actions including comprising:
   identifying a first cloud object store of a first cloud interface device and a second cloud object store of a second cloud interface device within a virtual device layer of an object-based file system, wherein the first cloud object store supports a first native set of attributes of data objects stored therein, and the second cloud object store supports a different second native set of attributes of data objects stored therein;
   retrieving a first set of cloud storage objects stored in the first cloud object store, the first cloud interface device storing a first instance of a tree hierarchy, wherein the tree hierarchy includes a mapping of logical data blocks corresponding to the first set of cloud storage objects;
   storing, by a mirror device and via the second cloud interface device, a second instance of the tree hierarchy in the second cloud object store, wherein the first instance and the second instance of the tree hierarchy are identical;
   using the second instance of the tree hierarchy to create a second set of cloud storage objects to be stored in the second cloud object store; and
   causing at least one read operation to be performed with respect to the tree hierarchy, wherein the at least one read operation comprises receiving at least one cloud storage object from either the first cloud object store or the second cloud object store.

16. The computer-program product of claim 15, wherein the logical data blocks corresponding to the first set of cloud storage objects include metadata corresponding to each cloud storage object of the first set of cloud storage objects.

17. The computer-program product of claim 15, including further instructions configured to cause the one or more data processors to perform:
   retrieving performance data corresponding to the first cloud object store and the second cloud object store; and
   causing, based on the performance data, the at least one read operation to be performed on the first cloud object store instead of the second cloud object store.

18. The computer-program product of claim 15, including further instructions configured to cause the one or more data processors to perform a checksum operation on the first and second instances of the tree hierarchy to validate that the first and second instances of the tree hierarchy are identical.

19. The computer-program product of claim 15, wherein causing at least one read operation to be performed with respect to the tree hierarchy further comprises bypassing the mirror device when the at least one read operation is performed to receive the at least one cloud storage object from either the first cloud object store or the second cloud object store.

20. The computer-program product of claim 15, including further instructions configured to cause the one or more data processors to perform:
   detecting, by the mirror device, a write operation performed on at least one cloud storage object of the first set of cloud storage objects;
   updating, by the mirror device, the first and second instances of the tree hierarchy in accordance with the write operation; and
   causing, by the mirror device, another write operation to be performed on at least one cloud storage object of the second set of cloud storage objects based on the updated second instance of the tree hierarchy.

* * * * *

UNITED STATES PATENT AND TRADEMARK OFFICE
CERTIFICATE OF CORRECTION

PATENT NO. : 11,308,033 B2
APPLICATION NO. : 16/748420
DATED : April 19, 2022
INVENTOR(S) : Maybee et al.

It is certified that error appears in the above-identified patent and that said Letters Patent is hereby corrected as shown below:

In the Drawings

On sheet 2 of 22, in FIG. 2, under Reference Numeral 226-1, Line 1, delete "Arrary)" and insert -- Array) --, therefor.

On sheet 2 of 22, in FIG. 2, under Reference Numeral 226-2, Line 1, delete "Arrary)" and insert -- Array) --, therefor.

On sheet 5 of 22, in FIG. 5, under Reference Numeral 226-1, Line 1, delete "Arrary)" and insert -- Array) --, therefor.

On sheet 14 of 22, in FIG. 14, under Reference Numeral 226-1, Line 1, delete "Arrary)" and insert -- Array) --, therefor.

In the Specification

In Column 9, Line 48, delete "j ournaling." and insert -- journaling. --, therefor.

In Column 14, Line 54, delete "N FS," and insert -- NFS, --, therefor.

In Column 17, Line 42, delete "tranisition" and insert -- transition --, therefor.

In Column 26, Line 21, delete "LSARC" and insert -- L2ARC --, therefor.

In Column 26, Line 23, delete "LSARC" and insert -- L2ARC --, therefor.

In Column 33, Line 33, delete "persuant" and insert -- pursuant --, therefor.

In Column 51, Line 43, delete "authori22ed" and insert -- authorized --, therefor.

Signed and Sealed this
Thirteenth Day of December, 2022

Katherine Kelly Vidal
*Director of the United States Patent and Trademark Office*

In Column 53, Line 52, delete "ZO" and insert -- Z0 --, therefor.

In Column 54, Line 40, delete "magneto resistive" and insert -- magnetoresistive --, therefor.